United States Patent [19]

Bengal et al.

[11] Patent Number: 5,854,824
[45] Date of Patent: Dec. 29, 1998

[54] CONNECTIVITY SCANNER

[75] Inventors: Ofer Bengal, Herzliva; David Pincu, Holon, both of Israel

[73] Assignee: Rit Technologies Ltd., Tel Aviv, Israel

[21] Appl. No.: 521,599

[22] Filed: Aug. 30, 1995

[30] Foreign Application Priority Data

Sep. 4, 1994 [IL] Israel ......................................... 110859

[51] Int. Cl.$^6$ .............................. H04M 1/24; H04M 3/08; H04M 3/22

[52] U.S. Cl. ................................... 379/34; 379/1; 379/10; 379/12; 379/22; 370/241; 370/245; 370/248

[58] Field of Search .................................. 379/1–2, 6, 9, 379/10, 12, 14–18, 20–21, 23–26, 31, 34, 19, 22, 28–30, 32–33, 8; 370/349, 350, 352, 357, 241, 242, 244, 245, 250, 248, 251

[56] References Cited

U.S. PATENT DOCUMENTS

| 4,156,119 | 5/1979 | Matthews | 200/51.03 |
|---|---|---|---|
| 4,724,435 | 2/1988 | Moses et al. | 370/352 |
| 4,833,708 | 5/1989 | Goodrich | 379/327 |
| 4,953,194 | 8/1990 | Hansen et al. | 379/25 |
| 4,980,913 | 12/1990 | Skret | 380/23 |
| 5,175,765 | 12/1992 | Perlman | 380/30 |
| 5,475,732 | 12/1995 | Pester, III | 379/34 |

FOREIGN PATENT DOCUMENTS

| 494513 | 7/1992 | European Pat. Off. . | |
| 504537 | 9/1992 | European Pat. Off. . | |
| 0520876 | 12/1992 | European Pat. Off. | H04L 12/40 |
| 575100 | 12/1993 | European Pat. Off. . | |
| 2680067 | 2/1993 | France . | |
| 2236398 | 4/1991 | United Kingdom . | |
| WO 92/17961 | 10/1992 | WIPO . | |
| WO 93/12605 | 6/1993 | WIPO | H04M 3/28 |
| WO 94/15303 | 7/1994 | WIPO | G06F 15/16 |

OTHER PUBLICATIONS

Remote Test Unit, Model 105A, Micro Computer Systems.
Remote Test Unit, Model 107A/F, Micro Computer Systems.
Bretschneider G. et al., "Sonder–Und Datenleitungen Schnell IM Griff", Telcom Report, vol. 14, No. 5, Sep. 1991, pp. 274–275.
Aura Ganz et al., "Implementation Schemes of Multihop Lightwave Networks", Nov. 1993, pp. 133–137.

*Primary Examiner*—Curtis A. Kuntz
*Assistant Examiner*—Binh K. Tieu
*Attorney, Agent, or Firm*—Ladas & Parry

[57] ABSTRACT

An interconnection monitoring system for use with a multiple node wired network, the system comprising a plurality of transmitters, each located at a node of the network for transmitting a transmission from the node and a plurality of receivers, each located at a node of the network, for receiving a transmission at the node, the plurality of transmitters being operative to transmit along the network a signal bearing an identification code identifying the node from which a transmission takes place, the plurality of receivers being operative to receive transmissions from a plurality of nodes, bearing the identification codes and thus indicating the interconnection status of the nodes.

31 Claims, 10 Drawing Sheets

CONNECTIVITY SCANNER

FIELD OF THE INVENTION

The present invention relates to devices for monitoring telecommunications systems.

BACKGROUND OF THE INVENTION

Conventional telephone networks include a multiplicity of interconnection nodes appearing at multiple levels deployed at various locations. FIG. 1 illustrates a typical conventional telephone network.

The network of FIG. 1 includes 10,000 telephone lines. A regional telephone exchange 10 is associated with a main distribution frame (MDF) 11 including, for example, 10,000 input connections 12, here designated as "level A" and 20,000 output connections 13, which define a second level, termed herein "level B".

The main distribution frame output is connected via a plurality of multi-pair cables 14 to a plurality of cross-connection (CC) cabinets 20, typically 50 in number, each having, for example, 400 input pairs 21 which define a third level which is termed herein "level C". The cross-connection cabinets have a multiplicity of output pairs 22, typically 600 in number, which define a fourth level termed herein "level D".

Each cross-connection cabinet services a plurality of distribution boxes 30. Typically ten distribution boxes are provided for each cross-connection cabinet, each distribution box typically having sixty input pairs 32 which define a fifth level termed herein "level E". The subscriber side, also known as the output side, of the distribution box typically has 120 output pairs 34, which define a sixth level which is termed herein "level F".

The telephone network of FIG. 1 defines a multiplicity of nodes on the various levels described above. The nodes include:

a. Level A nodes which are at the input pairs 12 of the main distribution frame (MDF) 11. Each Level A node comprises a physical connection point at which a telephone line coming from an exchange 10 is connected to the input side of the MDF 11.

b. Level B nodes which are at the output pairs 13 of the MDF 11. Each Level B node comprises a physical connection point at which the output side of the MDF 11 connects to an MDF end of an individual pair within a multi-pair cable 14. Multi-pair cable 14 typically comprises 2000 cable pairs connecting an MDF to a plurality of cross-connection cabinets dispersed throughout the area served by the MDF. Therefore, each cable pair has an MDF end and a cross-connection cabinet end.

c. Level C nodes which are at the input pairs 21 of the cross-connection (CC) cabinets 20. Each Level C node comprises a physical connection point at which the cross-connection cabinet end of an individual cable pair within multi-pair cable 14 is connected to an individual input pair 21 of an individual cross-connection cabinet 20.

d. Level D nodes which are at the output pairs 22 of the cross-connection cabinets 20. Each Level D node comprises a physical connection point at which an output pair 22 of an individual cross-connection cabinet 20 connects to an individual cable pair within a multi-pair cable 24. Each multi-pair cable 24 typically comprises 100–200 cable pairs which connect an individual cross-connection cabinet output pair to an individual input pair of a distribution box 30. Therefore, each cable pair within multi-pair cable 24 has a cross-connection cabinet end and a distribution box end.

e. Level E nodes which are at the input pairs 32 of the distribution boxes (DB) 30. Each Level E node comprises a physical connection point at which the distribution box end of an individual cable pair within multi-pair cable 24 connects to an individual input pair 32 of an individual distribution box 30.

f. Level F nodes which are at the output pairs 34 of the distribution boxes 30. Each Level F node comprises a physical connection point at which an individual output pair 34 of an individual distribution box 30 is connected to a cable pair which forms part of a drop cable 35 corresponding to an individual subscriber line.

Reference is now made to FIG. 2 which is a pictorial illustration of a prior art individual cross-connection frame. A "cross-connection frame" is a general term referring to a CC or MDF or DB. Generally speaking, the term "cross-connection frame" refers to the physical location at which input pairs coupled to an upstream, higher level, cross-connection frame or exchange are selectably connected to output pairs coupled to a downstream, lower level, cross-connection frame or to a subscriber line.

Each cross-connection frame preferably is connected to:

a. at least one cable 100 which includes a first multiplicity of incoming cable pairs, connecting the cross-connection frame to a higher-level cross-connection frame or an exchange; and b. at least one cable 105, which includes a second multiplicity of outgoing cable pairs connecting the cross-connection frame to a plurality of lower-level cross-connection frames or subscriber lines.

Each cross-connection frame preferably includes:

a. an input connection block array 110 including a first multiplicity of input blocks 120 typically corresponding in number to the maximum anticipated number of incoming cable pairs in cable 100 and being respectively permanently connected thereto;

b. an output connection block array 130 including a second multiplicity of output blocks 140 which typically exceeds the number of input blocks 120. The output blocks 140 typically correspond in number to the maximum anticipated number of outgoing cable pairs in cable 105 and are respectively permanently connected thereto; and e. a plurality of jumper cable pairs 160, each of which selectably interconnects a pair of contacts within an individual input block 120 to a pair of contacts within an individual output block 140.

Each of jumper cable pairs 160 thus interconnects an input cable pair forming part of cable 100 with an output cable pair forming part of cable 105.

FIG. 3 illustrates parts of a conventional input block 120 and of a conventional output block 140 which are interconnected by a jumper cable. The input block 120 and the output block 140 each typically includes a plurality of pairs of conventional contact sets, such as 10 pairs of insulation displacement contact sets.

For simplicity, only one contact set 320 is shown in input block 120 and one contact set 321 is shown in output block 140. Each of contact sets 320 and 321 includes a plurality of conventional interconnected contacts 330 and 331 respectively, such as 2, 3 or 4 interconnected contacts. In FIG. 3, for example, there are shown two interconnected contacts 330 per contact set in the input block 120 and three interconnected contacts 331 per contact set in the output block 140.

In FIG. 3 a wire 342, forming part of cable 100, is connected to one contact 330 of set 320. The other contact 330 of set 320 is connected to one end of a wire 344, forming part of jumper cable 160, whose opposite end is connected to a contact 331 of set 321 in output block 140. Another contact 331 in set 321 is connected to one end of a wire 346, which forms part of cable 105.

To "connect" a subscriber, technicians typically provide three jumper cable pairs 347, 348 and 349. As shown in FIG. 1, the first jumper cable pair 347 connects an individual A node to an individual B node, in an MDF assigned to service the subscriber. The second jumper cable pair 348 connects an individual C node to an individual D node, in a cross-connection cabinet assigned to service the subscriber. The third jumper cable pair 349 connects an individual E node to the subscriber's F node in the distribution box assigned to service the subscriber.

The numbers of nodes per level specified above may vary from network to network. However, they exemplify a flexible network structure which allows for unpredictable and nonuniform demand for telephone lines. In the above example, the B:A interconnection has a flexibility factor of 20,000/10,000=2. The B:C interconnection is fixed. The D:C interconnection has a flexibility factor of 600/400=1.5. The F:E interconnection is fixed. The E:F interconnection has a flexibility factor of 120/60=2.

Therefore, there are three types of flexible interconnections in a typical telephone network, which are termed herein the A:B, C:D and E:F interconnections.

To maintain a telephone network, records of flexible interconnections are kept which indicate, for the A:B interconnections, which A node is connected to which B node, and similarly for the C:D and E:F interconnections. These records are often inaccurate because technicians sometimes do not interconnect the levels as instructed whereas the records are based on the interconnection instructions as given. Also, during repairs, the technician may need to change the connections and may neglect to report these changes.

For each subscriber line, the telephone company conventionally maintains a routing record including the following information:

a. Telephone line number;
b. The physical locations of the nodes assigned to the telephone line on each of levels A–F. The information stored to identify a physical location of a node typically comprises:
  i. A cross-connect identifier, which is the identity of the cross-connection frame in which the node is located; and
  ii. A pair number within the cross-connection frame.

Applicant/Assignee's Published European Application No. 93304514.8-2211 (Publication No. 0575100) describes a LAN connectivity scanner system operative to monitor connectivity of a local area network.

Published French Application No. 2680067 (National Registration No. 9109809) describes an optical device for monitoring connectivity of a multi-junction system which has applications for telecommunications.

Micro Computer Systems, Inc. 3708 Alliance Drive, Greensboro, N.C. 27407-2030, markets test equipment known as Remote Test Unit (Models 105A, 107A/F) which tests connectivity of active telephone lines.

Published UK Patent Application GB 2236398A (Application No. 8922025.5) describes a self documenting patch panel which documents the connections between input and output ports of a patch panel. The method of operation includes providing each input port with an input polling terminal and each output port with an output polling terminal and connecting an input polling terminal to an output polling terminal when the corresponding input and output ports are connected. A polling signal is sent to each input terminal in turn and the output terminal at which the polling signal is received is detected and is associated with the input terminal at which the polling signal originated.

Various types of shoe assemblies or connection blocks are known for use in telecommunications cross-connection blocks for over-voltage protection and line testing. A wide variety of these devices are commercially available from Krone of Germany.

SUMMARY OF THE INVENTION

The present invention seeks to provide improved apparatus for monitoring routing of a cabling plant used for telecommunications, power, signaling, and other uses.

There is thus provided in accordance with a preferred embodiment of the present invention an interconnection monitoring system for use with a multiple node wired network, the system comprising a plurality of transmitters, each located at a node of the network for transmitting a transmission from the node and a plurality of receivers, each located at a node of the network, for receiving a transmission at the node, the plurality of transmitters being operative to transmit along the network a signal bearing an identification code identifying the node from which a transmission takes place, the plurality of receivers being operative to receive transmissions from a plurality of nodes, bearing the identification codes and thus indicating the interconnection status of the nodes.

Preferably, the plurality of receivers includes a plurality of memories for storing at least part of the transmissions received thereby.

In accordance with a preferred embodiment of the present invention, at least some of the plurality of transmitters and the plurality of receivers are configured as transceivers.

Preferably, the system also includes a central unit operative to synchronize the operation of the plurality of transmitters. The central unit preferably is operative to synchronize the operation of the plurality of transmitters on a hierarchical basis.

In accordance with one embodiment of the present invention, the network is a communications network and the plurality of transmitters are operative to transmit over the communications network in a manner which does not substantially interfere with communications thereover.

In accordance with another embodiment of the present invention, the network is a non-communications network and the plurality of transmitters are operative to transmit over the non-communications network in a manner which does not substantially interfere with the operations of the non-communications network.

For example, the network may be an electrical power supply network and the plurality of transmitters may be operative to transmit over the power supply network in a manner which does not substantially interfere with the power supply operations of the power supply network.

In accordance with a preferred embodiment of the present invention, the network is a telephone network and the plurality of transmitters are operative to transmit over the telephone network in a manner which does not substantially interfere with telephone communications thereover.

In accordance with an embodiment of the invention, the telephone network includes a main distribution frame, a plurality of cross-connect cabinets and a plurality of distribution boxes; and the plurality of transmitters and the plurality of receivers are located in at least one of the main distribution frames, a plurality of cross-connect cabinets and a plurality of distribution boxes.

In accordance with an embodiment of the invention, the telephone network includes a main distribution frame, a plurality of cross-connect cabinets and a plurality of distribution boxes; and the plurality of transmitters and the plurality of receivers are located in the main distribution frame, in plural ones of the plurality of cross-connect cabinets and in plural ones of the plurality of distribution boxes.

Preferably, the main distribution frame, plurality of cross-connect cabinets and plurality of distribution boxes comprise connection blocks to which network wires and patch wires are connected; and the plurality of transmitters and the plurality of receivers are connected to the connection blocks by means of auxiliary wires.

In accordance with a preferred embodiment of the present invention, the auxiliary wires are punched down on the connection blocks adjacent to the network wires. Alternatively or additionally, the auxiliary wires may form an integral part of the connection blocks.

Preferably, the main distribution frame, plurality of cross-connect cabinets and plurality of distribution boxes comprise connection blocks to which network wires and patch wires are connected; and the plurality of transmitters and the plurality of receivers are connected to the connection blocks by means of auxiliary wires fixedly connected to shoes mounted onto the connection blocks.

Preferably, the shoes are permanently fixed to the connection blocks. Alternatively, the shoes are removably mounted onto the connection blocks.

In accordance with one embodiment of the present invention, at least some of the plurality of receivers and the plurality of transmitters are portable.

Preferably, the shoes include visible indicators which are responsive to received signals from the plurality of transmitters.

In accordance with a preferred embodiment of the present invention, the plurality of transmitters provides in-band transmissions. Alternatively or additionally, the plurality of transmitters provides out-of-band transmissions.

Preferably, the plurality of transmitters provides information regarding the operational status of at least one of the main distribution frame, plurality of cross-connect cabinets and plurality of distribution boxes.

In accordance with a preferred embodiment of the present invention, the plurality of transmitters provides information regarding the electrical parameters of the network. Alternatively or additionally, the plurality of transmitters provides information regarding faults in the network.

Further in accordance with a preferred embodiment of the present invention there is provided a wired network comprising an interconnection monitoring system of the type described hereinabove.

Additionally in accordance with a preferred embodiment of the present invention there is provided an interconnection monitoring method for use with a multiple node wired network, the method comprising: providing a plurality of transmitters, each located at a node of the network for transmitting a transmission from the node, providing a plurality of receivers, each located at a node of the network, for receiving a transmission at the node, causing the plurality of transmitters to transmit along the network a signal bearing an identification code identifying the node from which a transmission takes place, and causing the plurality of receivers to receive transmissions from a plurality of nodes, bearing the identification codes and thus indicating the interconnection status of the nodes.

In accordance with a preferred embodiment of the present invention, the method also includes storing at least part of the received transmissions.

Preferably, at least some of the plurality of transmitters and the plurality of receivers operate as transceivers.

In accordance with a preferred embodiment of the present invention, the method also includes synchronizing the operation of the plurality of transmitters. Preferably, the synchronizing operates on a hierarchical basis.

BRIEF DESCRIPTION OF THE DRAWINGS

The present invention will be understood and appreciated from the following detailed description, taken in conjunction with the drawings in which.

Figure 6:
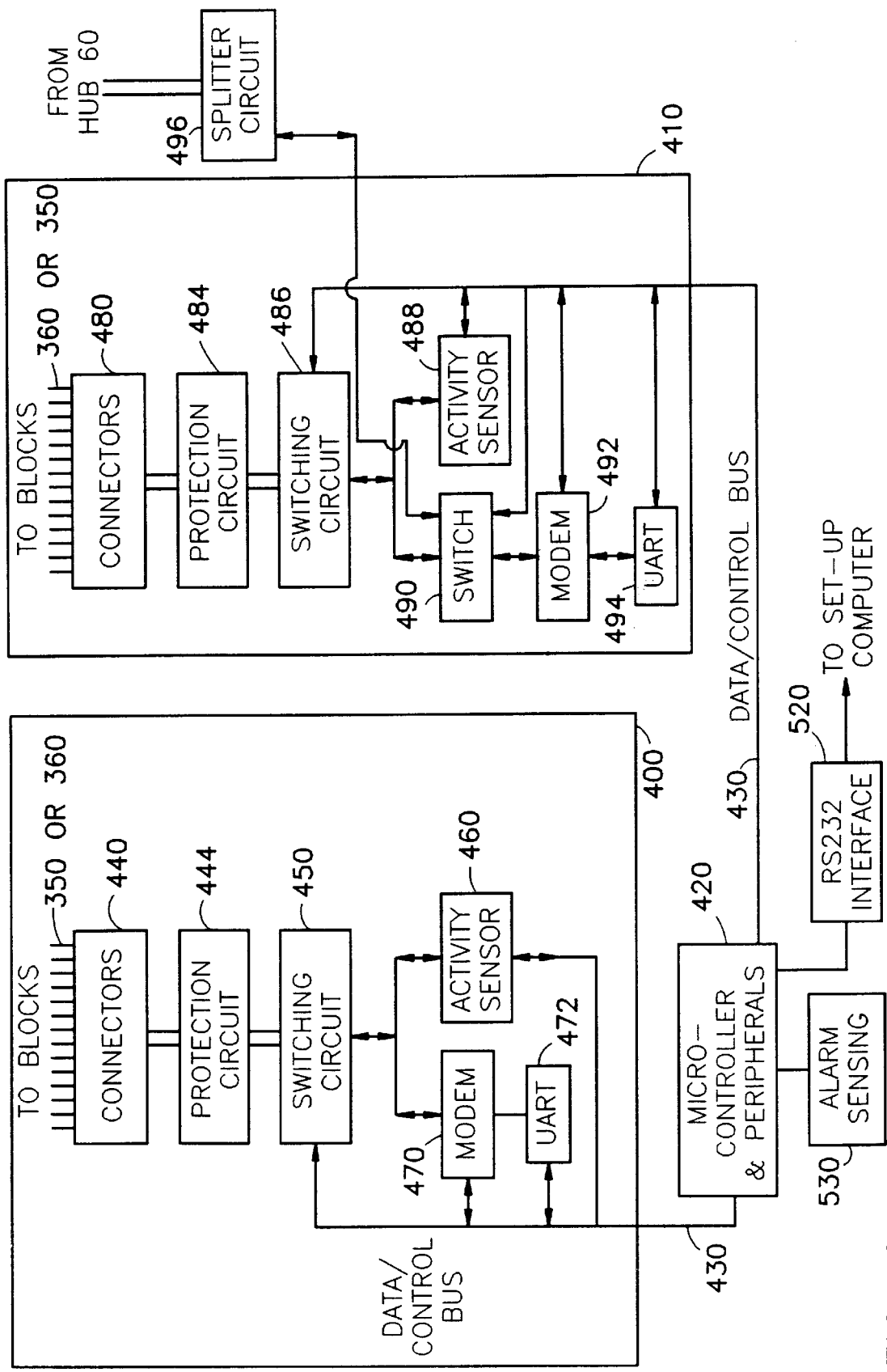
FIG. 6 is a simplified functional block diagram of a scanner constructed and operative in accordance with a preferred embodiment of the present invention and useful in the apparatus of FIG. 4.
Figure 7:
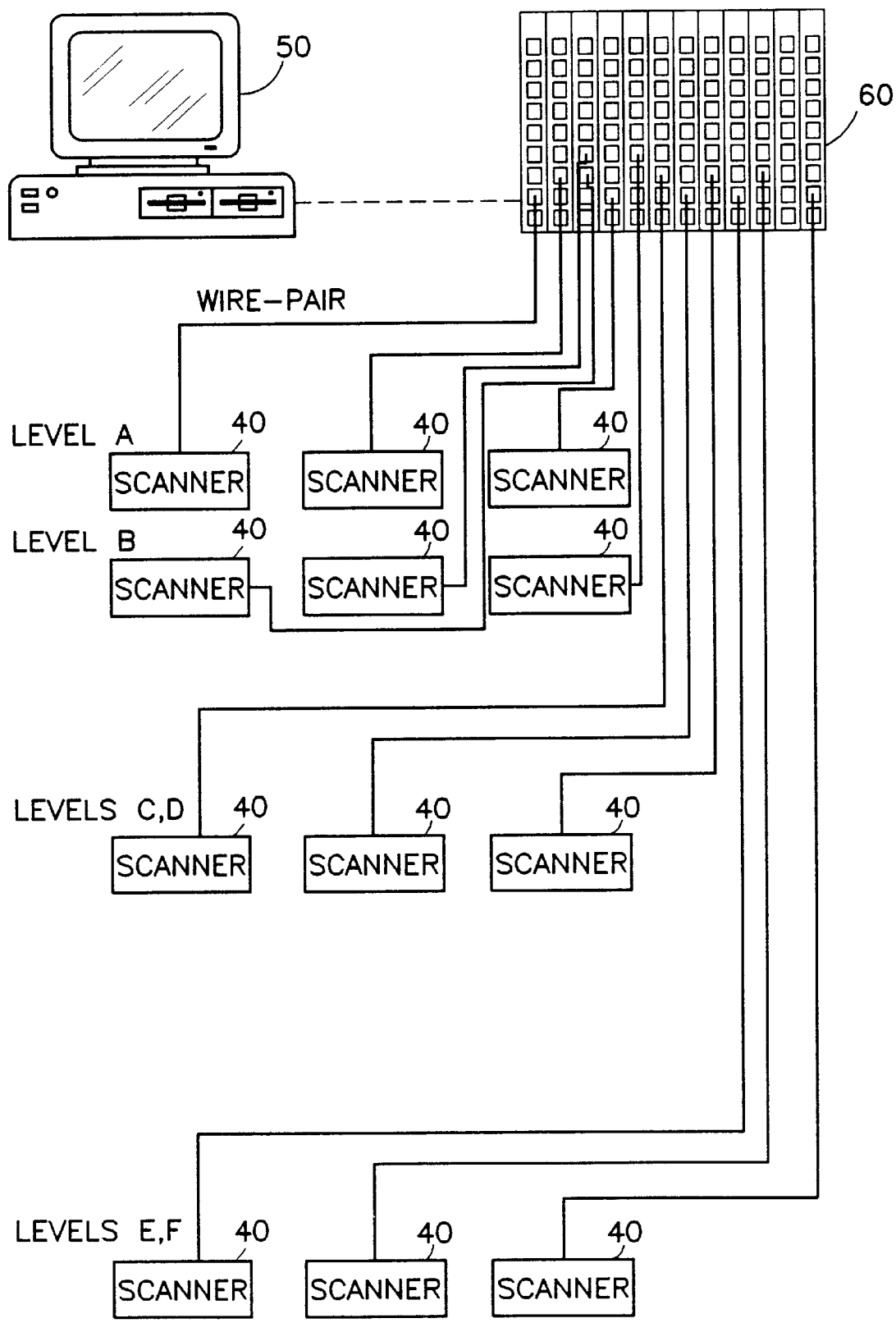
FIG. 7 is a simplified diagram of power and communication links of a central control unit residing in the regional telephone exchange of FIG. 4.

Attached herewith are the following appendices which aid in the understanding and appreciation of one preferred embodiment of the invention shown and described herein:

Appendix A is a detailed description of the scanner of FIG. 6 including a scanner application software specification and net lists for the hardware components thereof;

Appendix B is a detailed description of the application software of control station 50, forming part of the apparatus of FIG. 7;

Appendix C is a net list of a power and communication hub, forming part of the apparatus of FIG. 7; and Appendix D is a detailed description of a preferred set-up method, in which each scanner sensing wire is associated in the computer memory of the control station with an individual block which it will then monitor.

DETAILED DESCRIPTION OF PREFERRED EMBODIMENTS

Figure 4:
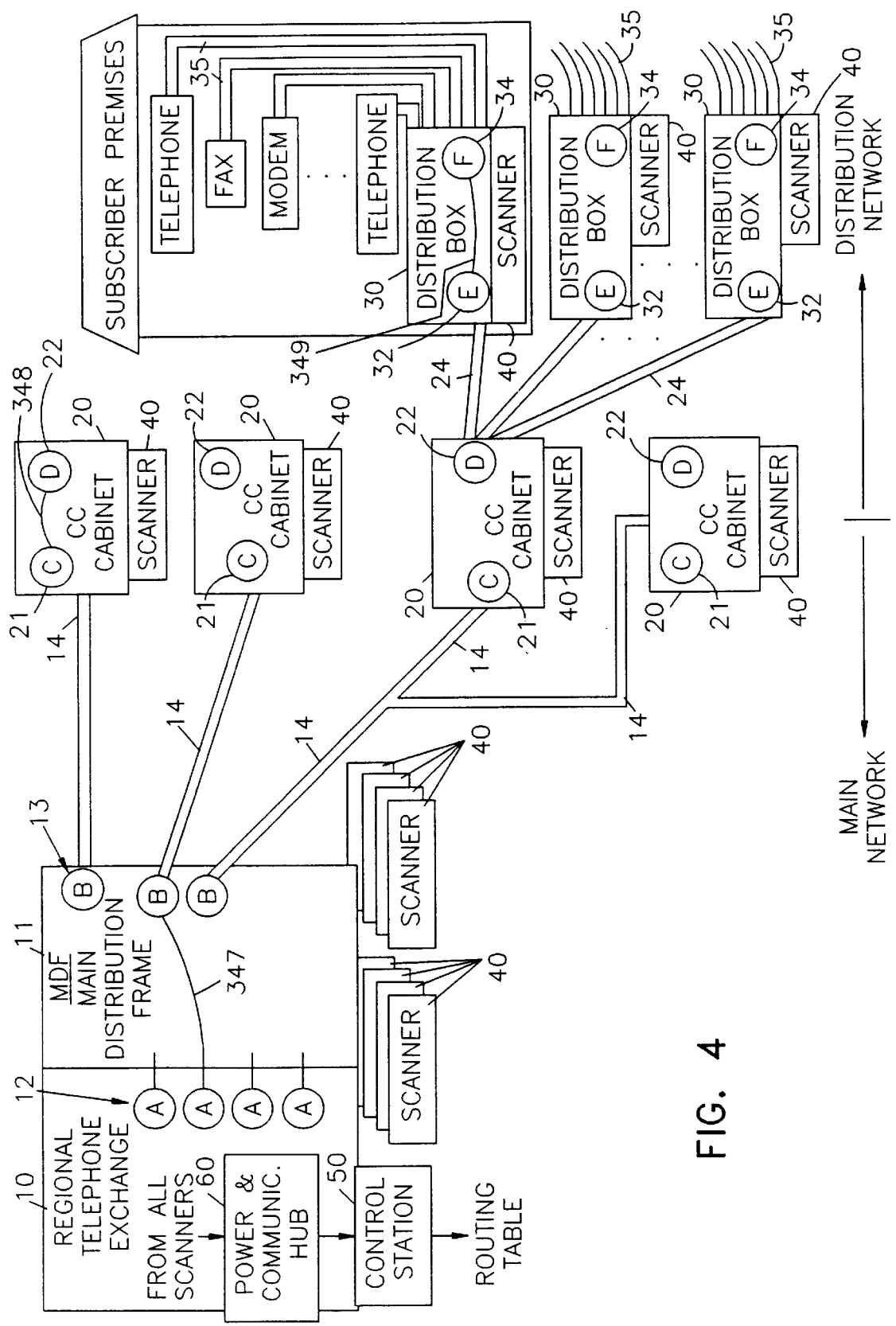
FIG. 4 is a simplified block diagram of a telephone network the connections of which are automatically monitored in accordance with a preferred embodiment of the present invention.

Reference is now made to FIG. 4 which illustrates a telephone network the connections of which are automatically monitored in accordance with a preferred embodiment of the present invention.

Figure 1:
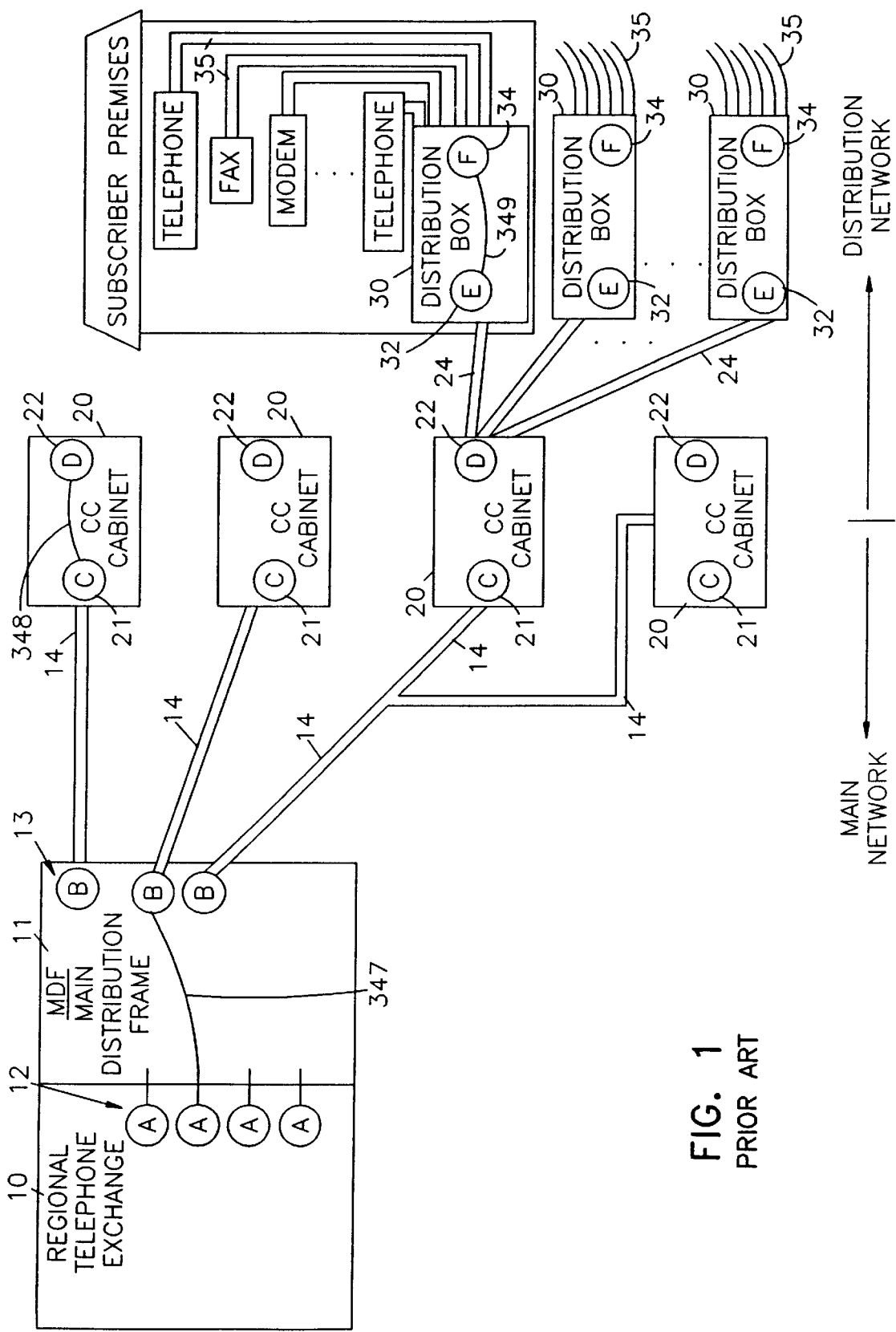
FIG. 1 is a simplified block diagram of a conventional prior art telephone network.

The apparatus of FIG. 4 is operative to monitor routing in a telecommunications system similar to the prior art telephone network of FIG. 1. For convenience, the reference numerals of FIG. 1 are employed to denote conventional components of the telephone network.

The present invention includes a plurality of scanners 40 each of which is operative to monitor a multiplicity of nodes on one or more levels and to report the connectivity status of each node to a control station 50 via a power and communication hub 60. The control station 50 is operative to accumulate the connectivity information from all of the scanners 40 and to generate periodically or on demand a routing table indicating the connectivity status of all nodes in the system. A preferred connection scheme between the control station 50, hub 60 and scanners 40 at all levels of the system is described in detail below with reference to FIG. 7.

The control station 50 is preferably operative to synchronize operation of the scanners 40. Typically, the control station 50 commands all scanners at a particular level (A, B, C, D, E or F, as shown in FIGS. 4 and 7) to enter a Tx (transmitting) mode. All scanners at all remaining levels are commanded to go into an Rx (Receiving) mode. This ensures that, for every multi-level link, i.e. a link which spans more than two levels, the scanner at one of the levels is transmitting and the scanners at all other levels are receiving.

Each Rx mode scanner searches for a synchronization signal, by scanning all of its nodes within the time interval for which each Tx mode scanner transmits a synchronization signal over an individual node. Upon detection of a synchronization signal, the scanner in Rx mode awaits receipt of transmitting scanner identification information from the same link and stores this information, which is subsequently reported to control station 50.

Scanners 40 are preferably also operative to provide alarm indications which relate to events in the MDF 11, CC Cabinets 20 and Distribution Boxes 30 or their vicinity.

Figure 3:
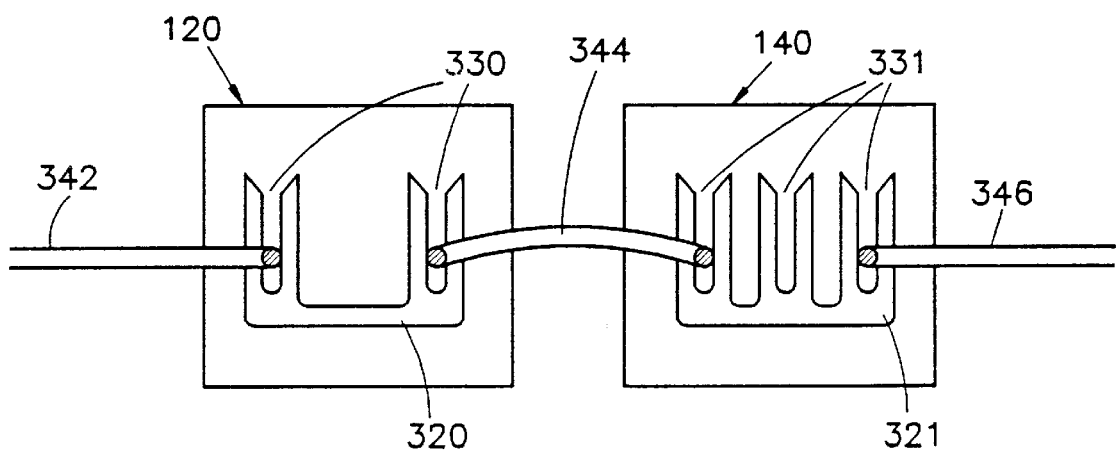
FIG. 3 is an illustration of a pair of individual contact sets interconnected by a conventional jumper cable or patch wire in accordance with the prior art.
Figure 5:
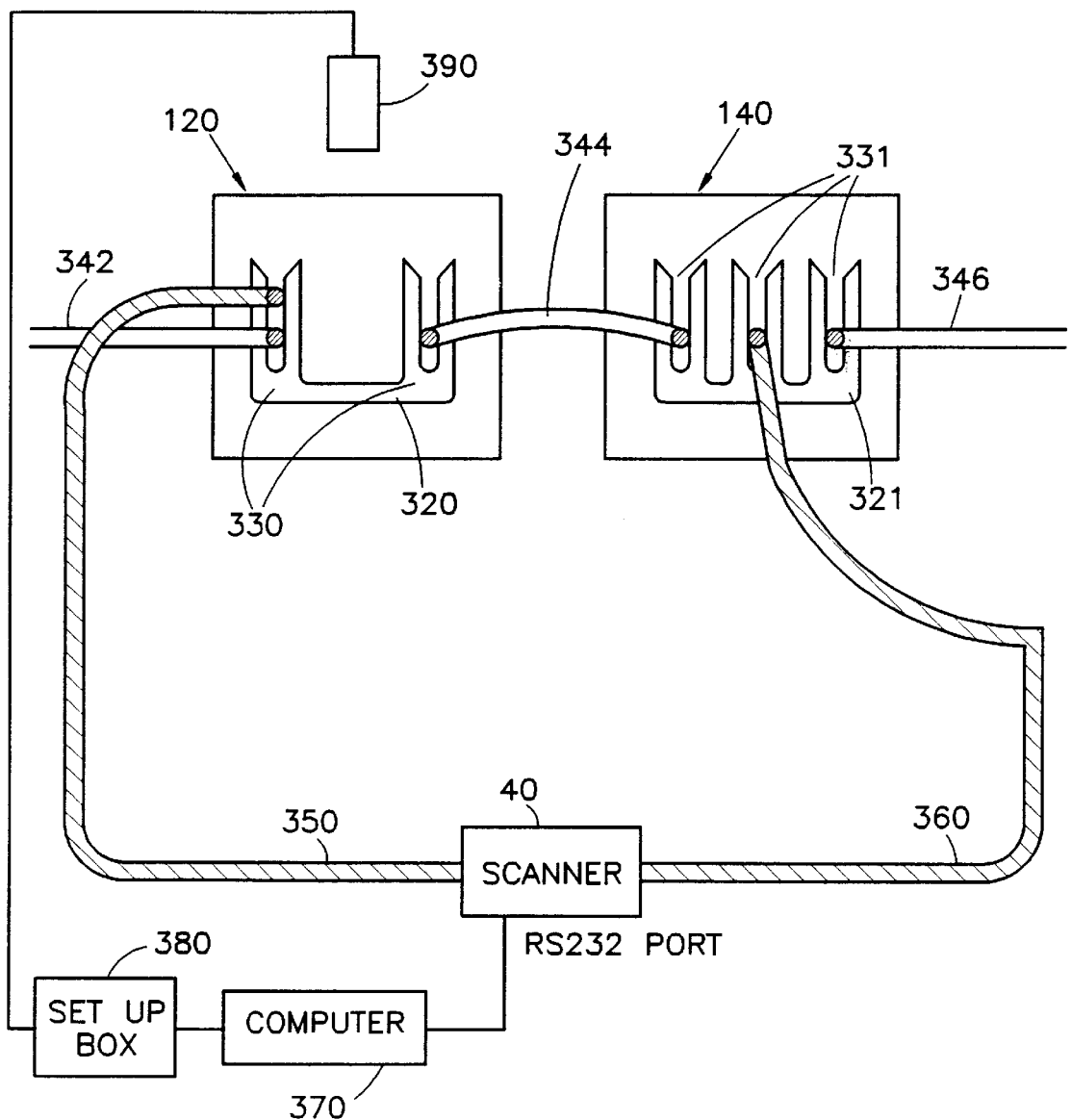
FIG. 5 is a simplified illustration of the physical connection between a scanner and its corresponding termination block in the apparatus of FIG. 4.

FIG. 5 is a simplified illustration of a preferred method for physically connecting a scanner to a corresponding termination block. For simplicity, the reference numerals of prior art FIG. 3 are employed to denote the conventional components of the telephone network.

At least one scanner 40, functionally described below with reference to FIG. 6, is provided per cross-connection frame which it is desired to monitor. The scanner 40 may be connected as follows:

a. Connecting, as shown in FIG. 5, for each contact set 320 of each input block 120 being monitored, one end of an input scanning wire 350 to the contact 330 which is being used to connect input wire 342 to that contact set and connecting the other end of the input scanning wire 350 to an input of scanner 40.

Alternatively, the input scanning wire 350 may be connected to a third contact 330 (not shown), i.e. a contact not being used to connect to an input wire and not being used for a jumper cable wire; and b. Connecting, for each contact set 321 of each output block 140 being monitored, one end of an output scanning wire 360 to the contact 331 which is being used to connect that contact set to output wire 346 and connecting the other end of the output scanning wire 360 to another input of scanner 40. This connection is not shown in FIG. 5.

Alternatively, as shown in FIG. 5, the output scanning wire 360 may be connected to a third contact 331, i.e. a contact not being used to connect the output wire and not being used for a jumper cable.

It is appreciated that, alternatively, the scanner may be employed to monitor only input blocks, rather than input blocks and output blocks. In this case, the input scanning wires 350 and the output scanning wires 360 are connected to input blocks. Similarly, if only output blocks are being monitored, the input and output scanning wires 350 and 360, respectively, are connected to output blocks.

Figure 8A:
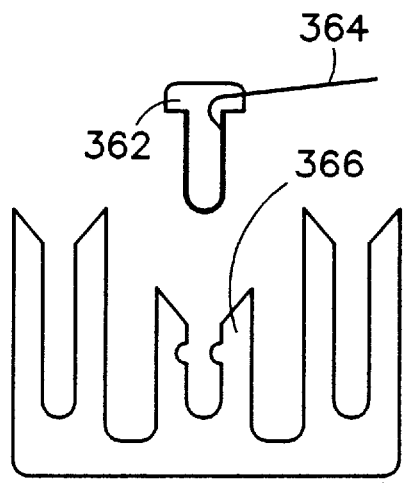
FIGS. 8A, 8B and 8C are illustrations of three interconnection structures useful in the apparatus of FIG. 4.
Figure 8B:
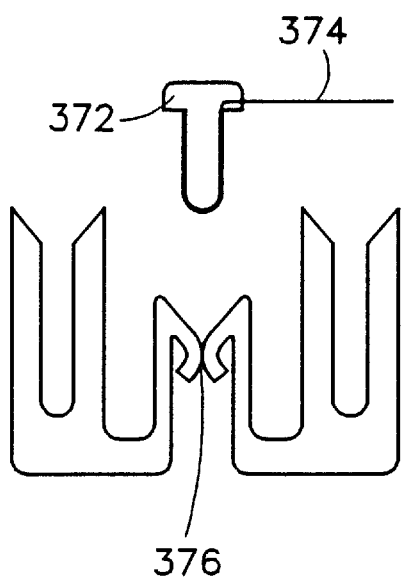
Figure 8C:
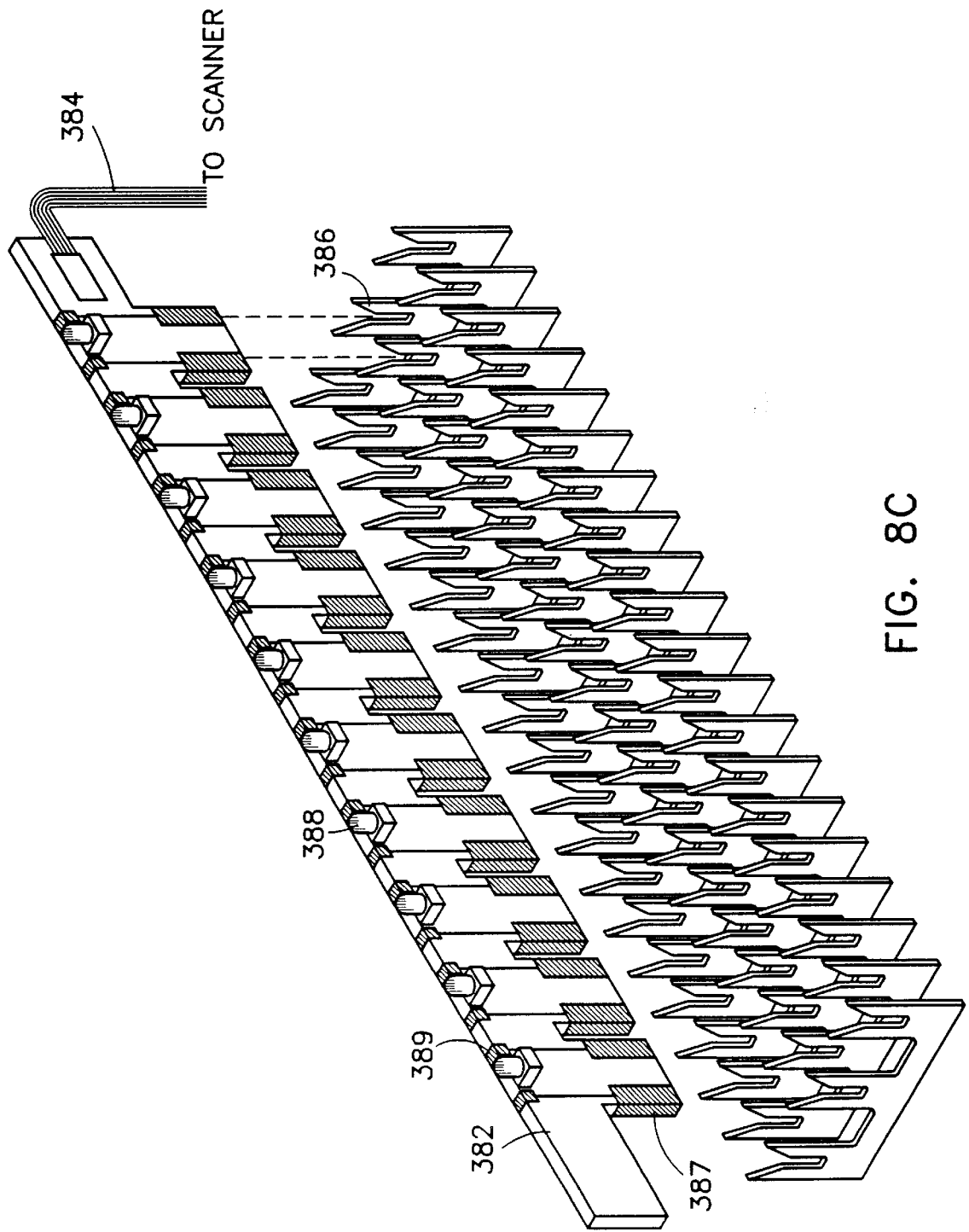

Reference is now made to FIGS. 8A–8C, which illustrate alternative connection techniques useful for physically connecting a scanner to a corresponding termination block.

FIG. 8A illustrates connection of a metallic shoe element 362, which is connected to an input or output scanning wire 364, to a contact 366 specially configured to conform to the configuration of shoe 362. Shoes 362 and contacts 366 of this type are known in the prior art. It is noted that shoes 362 may simultaneously contact a plurality of contacts 366.

FIG. 8B illustrates connection of a printed circuit board element 372, which is connected to an input or output scanning wire 374, to an interruptible double contact 376, specially configured to conform to the configuration of printed circuit board element 372. Printed circuit board elements 372 and contacts 376 of this type are known in the prior art. Printed circuit board elements 372 may simultaneously contact a plurality of contacts 376.

FIG. 8C illustrates a printed circuit board assembly 382 of novel construction, which connects multiple input or output scanning wires 384 to multiple conventional contacts 386, via contacts 387. Conventional contacts 386 need not be specially configured to conform to the configuration of assembly 382. Alternatively contacts of the type indicated by reference numerals 366 (FIG. 8A) or 376 (FIG. 8B) may be employed.

In accordance with a preferred embodiment of the present invention, printed circuit board element 382 may also include visual indicators, such as LEDs 388 to identify particular nodes requiring attention by a technician for connection, disconnection or maintenance.

Figure 9:
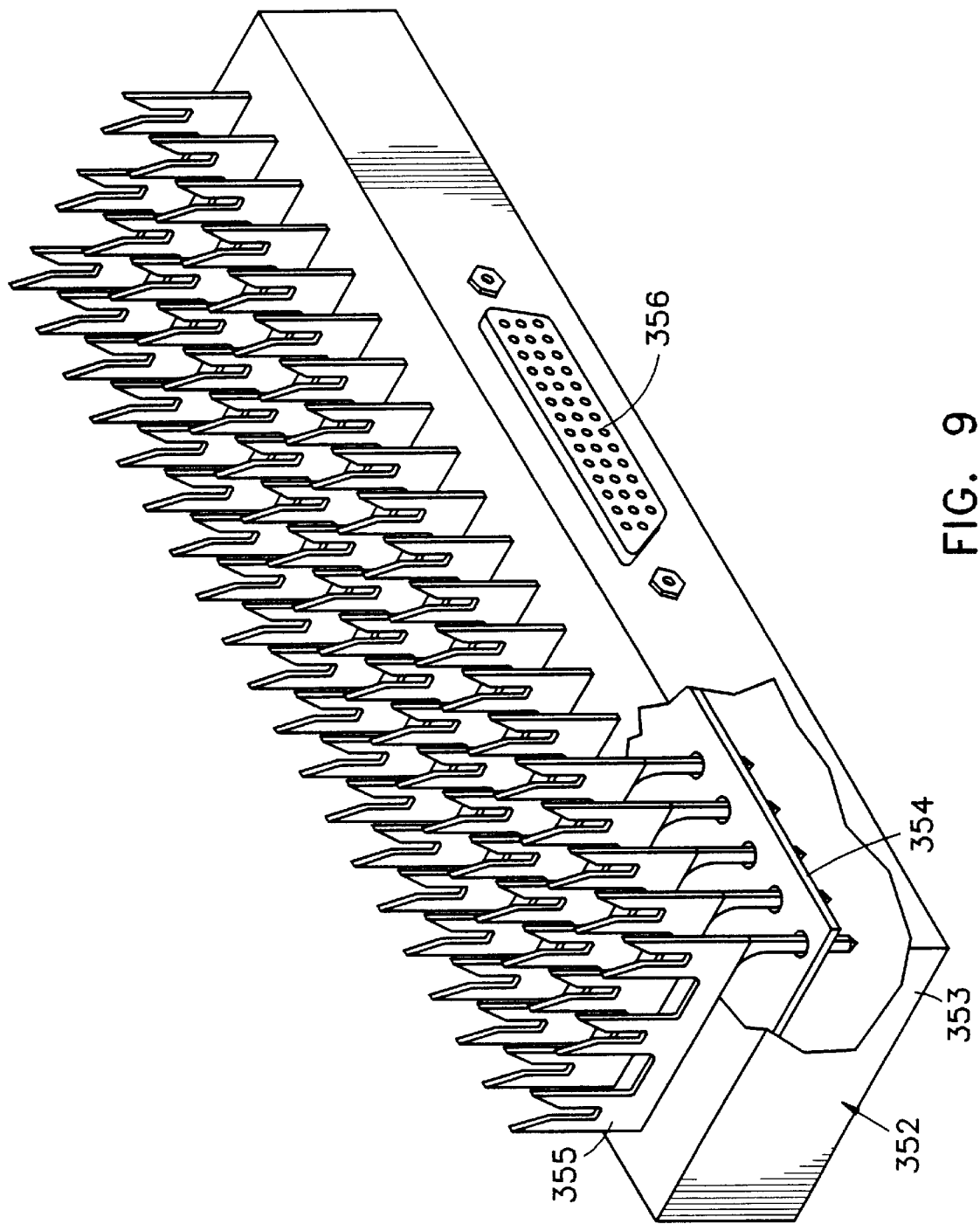
FIG. 9 is a partially cut-away simplified pictorial illustration of a connection block constructed and operative in accordance with a preferred embodiment of the present invention.
Figure 7:
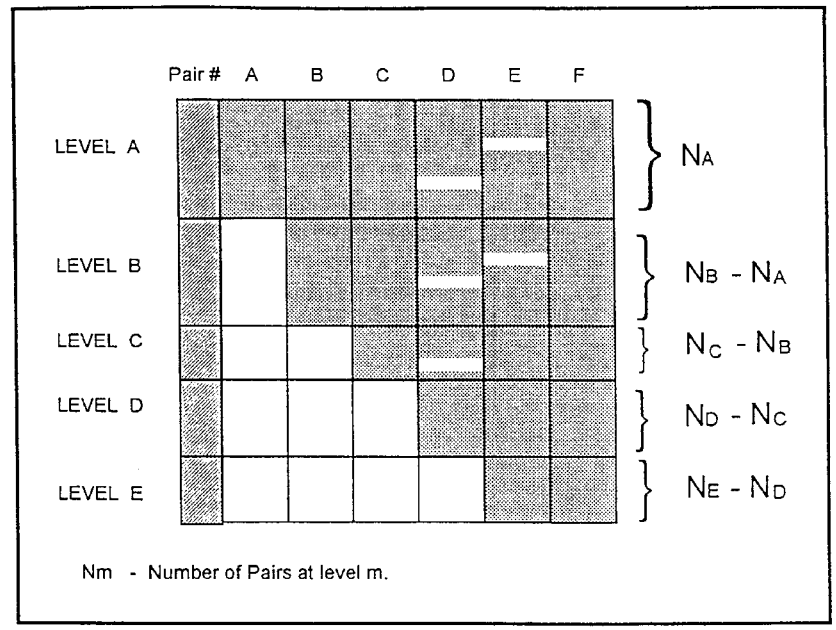

Additionally, the printed circuit board assembly 382 may include monitoring terminals 389, coupled to contacts 387, to enable monitoring equipment to be attached thereto for monitoring given nodes, without requiring removal of the assembly 382 from contact with contacts 386. Reference is now made to FIG. 9, which illustrates a novel connection block 352 constructed and operative in accordance with a preferred embodiment of the present invention. The connection block 352 comprises a housing 353 which surrounds a printed circuit board 354 onto which are mounted an array of conventional contacts 355. The printed circuit board 354 connects each of the conventional contacts 355 to a corresponding contact within a standard DB-25 connector 356, which may be readily and removably connected to a scanner 40.

Returning now once again to FIG. 5, it is noted that once the scanner 40 has been installed within a cross-connection frame, a set-up procedure may be employed to create an information table which associates each scanner input or output with the corresponding individual cross-connection frame connection point to which it is connected.

Preferably, this information table is accumulated by a portable computer 370, termed herein a set-up computer, and is subsequently transferred to the control station 50. A preferred set-up method is as follows:

a. Set-up computer 370 is connected via its RS232 port to an RS232 interface 520 (FIG. 6) of the scanner 40.
b. Set-up box 380 is connected to a multi-pair set-up adapter 390 and to set-up computer 370. The multi-pair set-up adapter 390 may be of the type illustrated in any of FIGS. 8A–8C and is operative to removably connect the set-up box 380 and computer 370 to a multiplicity of contacts 330 and 331 within respective blocks 120 and 140.
c. The software of set-up computer 370, which is described in detail in Appendix D, prompts the user to connect the multi-pair set-up adapter 390 to a specified block in the cross-connection frame. The operator is asked to enter the cross-connection frame identifier and the capacity of the cross-connection frame.
d. The set-up computer 370 instructs the set-up box to sequentially transmit a predetermined Tx signal over the contacts 330 and 331 corresponding to the pairs now undergoing the set-up process. At the same time, scanner 40 is instructed to enter the Rx mode in order to receive and store the Tx signals sent by the set-up box. Once the set-up box has finished transmitting over all the pairs undergoing set-up, the set-up computer instructs the scanner to send the identity of the ports on which the set-up box signals were received. These identities are accumulated and eventually transferred to the control station 50.
e. The software of the set-up computer 370 then prompts the user to repeat steps c. onward for each of the remaining blocks in the cross-connection frame until the connectivity status of each of the blocks has been accumulated.

It is appreciated that the scanners 40 are retrofittable to existing networks. According to one embodiment of the present invention, a scanner is permanently installed in each cross-connection frame. Alternatively, some of the cross-connection frames may not be provided with a permanent scanner. Instead, a single portable scanner or small number of portable scanners may be employed to sequentially monitor some or all of the cross-connection cabinets and distribution boxes.

In accordance with this embodiment of the invention, a technician conveys the portable scanner from one cross-connection frame to another. At each frame, the portable scanner may be temporarily connected to the frame in a manner similar to the manner in which the set-up computer is connected (FIG. 5). Alternatively, the connection may employ the apparatus of any of FIGS. 8A–8D.

Two modes of operation using a portable scanner are envisioned:

In one mode of operation, here termed a "network test mode", the portable scanner, once installed, communicates with the control station 50 in accordance with a predetermined protocol, requests that all other scanners at other levels be transferred to the Rx mode and obtains permission to transmit a signal to the other scanners. The operation of the scanner in this mode is identical to the operation of a permanent scanner as described hereinabove.

In another mode of operation, here termed a "local test mode", the portable scanner, once installed, need not communicate with the control station 50, but rather communicates with different levels within the single cross-connection frame to which it is connected. The portable scanner may store the local test results for eventual download.

FIG. 6 is a simplified functional block diagram of a scanner constructed and operative in accordance with a preferred embodiment of the present invention. The scanner of FIG. 6 includes two switching transceivers 400 and 410 each of which functions either as a transmitter or as a receiver as commanded by a microcontroller 420 via a data/control bus 430. This architecture allows the scanner to monitor two levels within an individual cross-connection frame even when one of the two levels is transmitting and the other of the two levels is receiving.

Transceiver 400 comprises a plurality of connectors 440 to which the input wires 350 or output wires 360 (FIG. 5) are connected. All wires connected to connectors 440 are of the same type, i.e. either all input wires or all output wires.

Connectors 440 are coupled via suitable protection circuitry 444 to a switching circuit 450, the operation of which is controlled by microcontroller 420 via bus 430. Switching circuit 450 is operative to selectably connect any pair of wires 350 or 360, as the case may be, to an activity sensor 460 and via a modem 470 to a UART, asynchronous receive/transmit circuit 472. Circuitry 460, 470 and 472 are also coupled to microcontroller 420 via bus 430.

Transceiver 410 comprises a plurality of connectors 480 to which the input wires 350 or output wires 360 (FIG. 5) are connected. All wires connected to connectors 480 are of the same type, i.e. either all input wires or all output wires.

Connectors 480 are coupled via suitable protection circuitry 484 to a switching circuit 486, the operation of which is controlled by microcontroller 420 via bus 430. Switching circuit 486 is operative to selectably connect any pair of wires 350 or 360, as the case may be, to an activity sensor 488 and via a switch 490 and a modem 492 to a UART, asynchronous receive/transmit circuit 494. Circuitry 488, 490, 492 and 494 are also coupled to microcontroller 420 via bus 430.

Each transceiver 400 or 410 performs the following two operations:

a. Receiving operation—The transceiver scans all lines connected to it by activating switching circuit 450 or 486, which connects each line in turn to activity sensor 460 or 488. If the activity sensor 460 or 488 detects a signal on the line, this is reported to the microcontroller 420 which activates modem 470 or 492 to determine if the signal is a valid Tx signal. If so, further switching does not take place until the contents of the valid Tx signal is transferred to the microcontroller 420 via modem 470 or 492 and UART 472 or 494.
b. Transmitting operation—The microcontroller 420 commands the switching circuit 450 or 486 sequentially to connect each pair of wires 350 or 360 to activity sensor 460 or 488. If the activity sensor 460 or 488 detects a signal on the line, this is reported to the microcontroller 420 which notes that such line is busy and causes the switching circuit to move on to the next line. If no activity is reported on a given line the microcontroller 420 causes the modem 470 or 492 to transmit initially a Tx synchronization signal followed by a Tx signal.

Transmission and reception may be carried out in a frequency band not utilized for other communication (out-of-band) to allow the scanners to operate in parallel to transmission of other information, such as voice and fax information, over the lines. Alternatively, transmission and reception may be carried out in the same frequency band as other communication (in-band) provided that a line activity circuit ensures that an individual line is not being used before transmitting over that line.

The Tx signal preferably comprises:

a. An indication of the level (A, B, C, D, E or F in FIG. 4) of the scanner;
b. An ID of the transmitting scanner;
c. An ID of the currently transmitting wire pair from among the pairs monitored by the scanner.

Referring now once again to FIGS. 4, 6 and 7 which illustrate power and communication hub 60, it is noted that a single wire pair connected to hub 60 is coupled to each scanner 40 via a wire pair either of cable 14 or of cable 24. The wire pair is connected via a splitter circuit 496 which receives a high voltage over the wire pair and supplies it to a power supply (not shown) which transforms it to appropriate voltages for use throughout the scanner circuitry.

Splitter circuit 496 also provides communication signals to modem 492 via switch 490. Switch 490, controlled by microcontroller 420, is operative to determine whether the modem 492 receives communications from or transmits communications to the power and communication hub 60 of FIGS. 4 and 7, or alternatively whether the modem 492 receives or transmits over wires 350 or 360 via switching circuit 486. Each scanner 40 may optionally also include apparatus for indicating faults in the network and measuring various electrical parameters thereof. Such apparatus may be connected to the switching circuit 450 or 486 in parallel with the activity sensor 460 or 488.

Each scanner 40 preferably also includes RS232 interface circuitry 520 which allows communication with a laptop or similar computer which is employed for set-up as described in detail herein with reference to Appendix C, testing or download.

Optionally, each scanner 40 may include alarm sensing circuitry 530 which alerts the control station 50 of events occurring in the vicinity of the cross-connection frame, which affect the operational status thereof. Preferably, the alarm sensing circuitry 530 is operative to:

a. Alarm if the CC cabinet or distribution box door is opened; and/or
b. Alarm if a unacceptable temperature, smoke or fire are detected within the CC cabinet or distribution box.

Appendix A is a detailed description of a scanner 40 constructed and operative in accordance with a preferred embodiment of the present invention.

FIG. 7 is a diagram of the power and communication links of the scanners 40 with the hub 60 and the control station 50 of FIG. 4. As described above, the control station 50 typically resides at the regional telephone exchange 10 (FIG. 4) which is operative to receive from each scanner the connectivity status of all nodes monitored thereby and to generate a routing table representing the connectivity status of all nodes in the network.

Typically, the control station 50 downloads all information from all scanners periodically, such as once a day, and creates an integrated connectivity database. The control station 50 may, for example, generate a comparison of today's routing with yesterday's routing. Preferable, the control station 50 continuously operates a scanning functionality in the hub 60, similar to that described hereinabove with reference to the Rx operation of the scanner 40. This functionality enables the control station to promptly receive alarms and other messages from the various scanners 40.

Appendix B is a detailed description of the control station 50 of FIG. 7.

The control station 50 is preferably operative to identify vacant wire pairs in each CC cabinet, to identify fully occupied CC cabinets, and to identify faulty cables and disconnections in CC cabinets, as described in detail in Appendix B.

The control station 50 requires little maintenance time and is easy to install. Following a one-time installation, routing information is generated automatically.

A preferred set-up method, in which a table is generated in memory which links physical connections of the scanner and actual block designations or numbers, is described in Appendix C.

It is appreciated that the software components of the present invention may, if desired, be implemented in ROM (read-only memory) form. The software components may, generally, be implemented in hardware, if desired, using conventional techniques.

It is appreciated that the particular embodiment described in the Appendices is intended only to provide an extremely detailed disclosure of the present invention and is not intended to be limiting. It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited to what has been particularly shown and described hereinabove. Rather, the scope of the present invention is defined only by the claims that follow:

APPENDIX A

RIT TECHNOLOGIES

PV2 PROTOTYPE

*SCANNER APPLICATION SPEC.*

28 Jul. 1994

*Rev 1.1*

Contents

| | |
|---|---|
| Version History | 3 |
|     Standby state | 5 |
|     Receive state | 6 |
|     Transmit state | 8 |
|     File Transfer state | 9 |
|     Alarm state | 10 |
| Communication Protocol | 11 |
|     General | 12 |
|     Collisions Handling | 14 |
|         Type 1 collision: | 14 |
|         Type 2 & 3 collision: | 14 |
|     Protocol Message Format | 15 |
|     Timing Considerations | 16 |
|     Point To Point Data Transfer Protocol | 19 |
|         Message Frame format | 19 |
|         Data Flow Protocol | 20 |
|     Receiver State Machine | 21 |
|     Transmitter State Machine | 24 |
|     Control Messages Set | 26 |
|         Messages to the scanner unit | 26 |
|         Messages from the scanner | 27 |
| File Transfer Protocol | 28 |
| Scanner Data Base Structure | 29 |
|     Data Base extension for multiple connected port: | 30 |
| Appendix A: Synonyms and Abbreviations | 31 |

Version History

| VERSION | DATE | OWNER / Change History |
|---------|------|------------------------|
| 0.1 | 26 Jun. 1994. | Avirav Yehuda.<br>First Draft. |
| 1.0 | 30 Jun. 1994. | Avirav Yehuda.<br>First Release. |
| 1.1 | 30 Jul. 1994. | Avirav Yehuda.<br>Canceling of SETUP state/procedure. |

Scanner State Machine and Program Flow
The scanner can be at one of the six states listed below:
1. Standby.
2. Receive.
3. Transmit.
4. File Transfer.
5. Alarm.
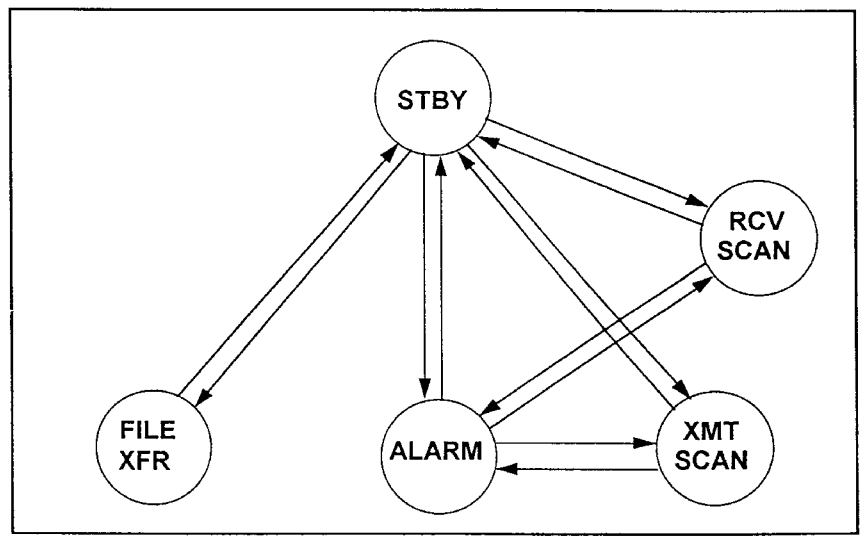
Figure 1, - Scanner State Machine

Standby state

Standby mode is used to set the scanner in idle, to save power. The scanner will switch to this mode in the following conditions:

1. When receiving a standby command from the control station.

2. After finishing a complete transmit scan cycle.

3. After finishing file transfer.

4. After reset/power up.

In this mode, the following actions will be done:

1. The Scanner will go to low power mode, shutting off unnecessary H/W units (The dedicated RS232 channel will not turn off).

2. Switch the modem to the control station line, and listen to receive messages.

3. Alarms inputs will be checked and reported.

4. The scanner will not switch to another state, unless commanded to do so.

5. If standby mode follows Reset/Power up conditions, an appropriate message will be sent to the C.S.

NOTES: 1. When the scanner is installed for the first time, the scanner will send a 'RESET' message to the C.S with I.D=0. When this situation occur; the C.S will return a message to identify the scanner I.D, as allocated by the C.S. This I.D will be saved in the scanner EEPROM.

2. If alarm occur during the time the scanner don't received his I.D, then it will report the alarm with I.D=0.

Receive state

In receive state, the scanner searches all it's ports for a signal detection and data frames.

The scanning will progress in a cyclic manner, until the control unit commands for other operation.

While waiting for data frame, the scanner will search for the data frame to be received in the format defined in the Communication Protocol section, in this document.

The control line connected to the control station is scanned as one of the scanner ports, with the same timing restrictions.

Flow charts actions:

For each port,

1. Wait for S.D T.O.T seconds to detect a signal in band.
   If signal was detected during this time, go to step 2, else go to step 7.

2. Wait a defined carrier detect time-out ( C.D T.O.T ) to detect a carrier.

3. If carrier signal was sensed during this C.D T.O.T, then stop scanning, and go to 4. Otherwise go to 7.

4. Look for a 'STOP SCAN' pattern for a PREAMBLE T.O.T seconds.
   If at least two STOP SCAN characters where identified, go to 5. Otherwise, go to 7. ( see note 2)

5. Wait for 'DATA T.O.T' seconds for the expected data frame to be received.
   If the expected data frame has not been received within this time, go to 7.

6. Insert the received information into the local data base. See DATA BASE section.

7. Switch the modem (including the sensing circuit) to the next scanner port.
   Go to step 1.

NOTES: 1) When the scanner starts to scan in receive mode, the scanning will start randomly on one of the scanner ports, which will be marked as the first port. This will help to minimize missing messages which are caused by timing problems.

2) During receive, alarms will be checked and reported. If alarm is detected in the receive mode, the scanner will switch to alarm state.

Transmit state

In transmit state, the scanner will transmit it's identification frame (which includes scanner i.d and port i.d) over each one of the ports connected to it.

For each one of the ports connected to the scanner, the scanner will do the following:

1. If the scanner had already successfully transmitted it's identification frame on that port, then go to 6.

2. Check line status (see T.B.D criteria).

3. If the port line identified as busy one, go to 6.

4. If the port line is not busy, transmit a STOP SCAN signal followed by the scanner identification frame.

5. If while transmitting, a collision is sensed, stop transmitting and go to 6.

6. Select the next port, and go to 1.
   If the scanner has successfully transmitted it's identification frame on all the ports, then switch to standby state.

NOTE: 1) When the scanner starts to scan in transmit mode, the scanning will start randomly on one of the scanner ports, which will be marked as the first port. This will help to minimize collisions which are caused by timing problems.

2) While in transmit state, the scanner must sample the signal detector which is connected to the control station line at least once every 1 ms.
If a signal is sensed, then stop operation (including transmitting) and switch the modem to the control station line, and look for message from the control center (according to the communication protocol).
If a message did not received, restart last operation.

File Transfer state

This mode is used to download the scanner local database to the control station.

In this mode, alarm will be checked, but will not be reported, in order to prevent disruption of the file transfer process.

File will be transferred with the standard XMODEM file transfer protocol. After the scanner received a command to go to file transfer mode, the following actions will be done:

1. Switch to File Transfer mode.

2. Initialize the XMODEM protocol, and start handshaking with the control station.

3. If after 30 seconds, the scanner cannot finish successfully the handshaking phase, go to standby mode.

4. If during the transfer, the communication fails, go to standby mode.

5. After successful transfer, go to standby mode.

Alarm state

After the scanner identifies an alarm input, the following actions will be done:

1. Save the last state in temporary location.

2. Go to the ALARM state.

3. Switch the communication line to the control station line.

4. Transmit the alarm message, starting with the stop scan signal.

5. If the control station acknowledge the message, return to the last state saved in step 1, and continue operation.

6. Otherwise, return to last state saved in step 1, continue operation and retry to transmit the alarm after T.B.D seconds (i.e., go to 3).

Communication Protocol

The following section describes the proposed protocol to be used as the management protocol for the PV2 system.
This protocol was designed to meet the following objectives:

1. To enable messages transfer between the scanners (for the scanning process purpose) and between the scanners and the control station (for management and control purpose).

2. Use of one MODEM for the scanning process and the management protocol.

3. The protocol must handle urgent messages transfer to control station.

4. Enable file transfer between scanners and control station.

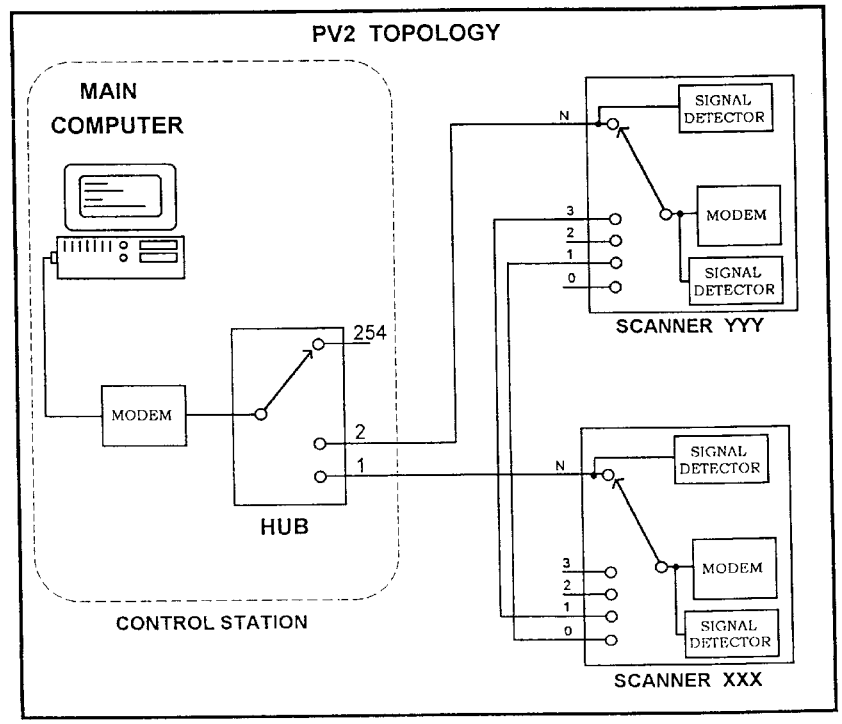

Figure 2:
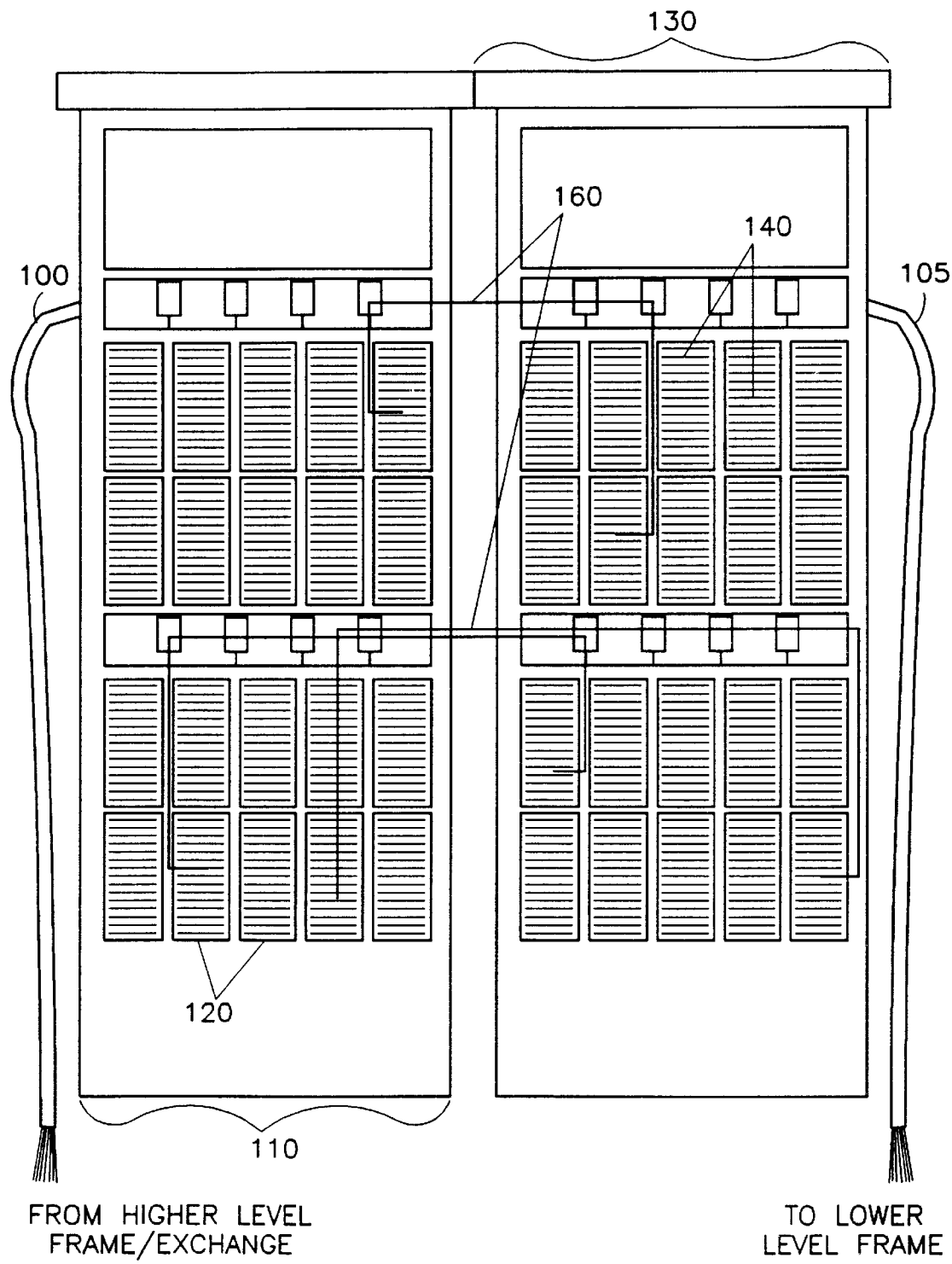
FIG. 2 is a simplified pictorial illustration of a conventional prior art cross-connection frame.

Figure 2 - PV2 topology

General

The main idea is that the scanner units search for data at each one of the scanner ports (port N is dedicated for the control station control).
While the scanners scan, the control station also perform a 'secondary scan' on the HUB ports, and search for urgent messages delivered by one or more of the scanners units.

each scanner is equipped with two energy detectors (signal detectors) which are used to identify in band line activities.

In the TRANSMIT SCAN mode, the scanner transmit it's identification frame to the other scanners in the system.

In the RECEIVE SCAN mode, the scanners search for the identification frames that was delivered from others scanners in the system.
Every port is scanned, while during the scan, the signal detector is checked first, and only after a signal was detected, the modem is checked for data and carrier.

A scanner that need to send an urgent message to the control station (such as alarms), will switch to the ALARM state, connect to the control station control line, and will start transmit the message.

To receive urgent messages from all the scanners units, the main computer will scan all the HUB ports (secondary scan ).

Each one of the scanners microprocessor have two communication ports:

1: Main port, which is used for scanning and also for control station.

2: RS232 port, which is mainly used for setup with an external computer.

While the scanner power is on, the scanner will always turn on the RS232 port and will wait for command, in stand by mode.

The RS232 messages will be in a higher priority then the control station.

NOTES:

1. The RS232 is a dedicated channel and therefore the STOP SCAN preamble will not used (see message format ).

2. During Receive and Transmit scan, the control station signal detector is always checked, and if a signal is detected, the current activity is stopped, and the modem will be switched to the control station line.

Collisions Handling

There are tree cases when a collision can happen:

1. When the control station send a message to a specific scanner while at the same time the same scanner tries to send an urgent message to the control station (at the same time).

2. When two scanners that are in transmit scan state, starts transmit on the same wire pairs.

3. When a scanner in the transmit scan state tries to transmit while at the same time, a customer equipment is transmitting in the same band.

To enable collision detection, the modems have the local echo feature.

The collision is detected when the received data, if any, is different from the transmitted one.

Type 1 collision:

When a collision is detected, the transmitter must stop transmitting and will wait for recovery time, before retrying to transmit.
During this time, the transmitter device will listen to the line.
To prevent succeeding collisions:
    The control station recovery time will be: T.B.D sec.
    The scanner recovery time will be T.B.D sec.

If during the recovery time, the device starts to receive a message, the received message will be processed and then retry to transmit the pending message.

Type 2 & 3 collision:

If the collision was sensed during a TRANSMIT SCAN state then the scanner will not re transmit on this port and will resume scan, trying to transmit on the next port.

Protocol Message Format

Every management message in the system will contains two parts:

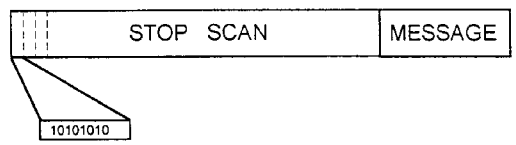

- STOP SCAN preamble parts, used to stop the scanning of all the receivers that are scanning now (including secondary scan).
  The STOP SCAN section is simply a long sequence of char 0xAA,

Notes: After a link is established, i.e. the scanner (or control station) stops scan as a response to the preamble, and the message was received, then from now the scanner (or control station) is connected to the computer and is not needed from now to transmit more preambeled messages to the other side.
The link duration will be limited by a LINK T.O.T after the last message received. If no messages is received during this time-out, then scanning is resumed.

The RS232 channel is a dedicated channel therefore the STOP SCAN preamble will not be used.

- MESSAGE part, used to transfer the message itself, and which is defined at the 'Point To Point Data Transfer protocol' next section.

Timing Considerations

♦ While one scanner transmit it's identification frame to the other scanners, the worst case condition occurs when:

• The message was received at port 0.

• The message starts while the scanner was scanning port 1.

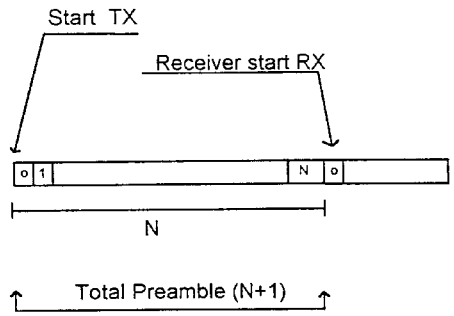

This preamble is the minimum required for the use of transmitting identification frames to other scanners.

Example : For N=630 scanner:

@ C.S TOT = 5ms ⇒

*Scanner Preamble = 631 * 5s = 3.16sec.*

NOTE: In the HUB secondary scanning, only up to 256 ports are scanned, so this preamble is only :

*Scanner To HUB preamble = 257 * 5ms = 1.29 sec.*

- While the control station tries to send message to specific scanner, the worst case condition occurs when :
  - The control station start sending the message while the scanner was scanning port 0.
  - While The scanner was scanning port 629, the scanner that is connected to this port starts transmit it's identification frame.

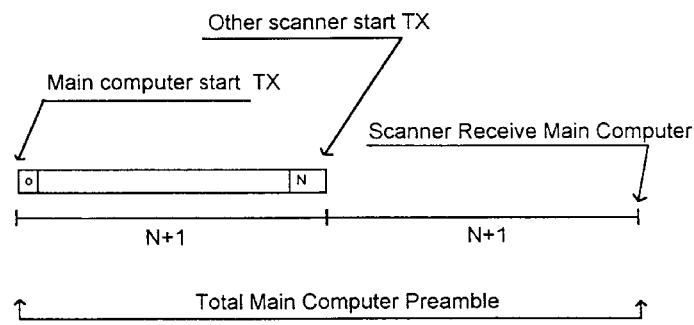

This condition requires that the control station preamble will be :

$$[(N+1) * C.S\ TOT] + [(N*1) * C.S\ TOT] = (2N+2) * C.S\ TOT$$

Example : For N=630 scanner:

@ C.S TOT = 5ms ⇒

*Control station preamble = 6.32 sec.*

- Two or more scanners transmit an urgent message to control station:
- Specific scanner transmit a message to the control station, while at the same time, the control station start transmit message to other scanner.
-

Point To Point Data Transfer Protocol

The data transfer protocol used for the management protocol will be implemented as a simple Point To Point (P.T.P) protocol, with the addition of address field, to gain versatility. The address field enable connecting of two communication units on the same communication line.

Message Frame format

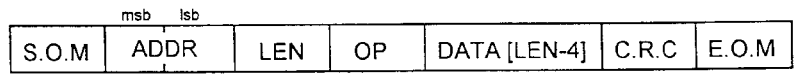

S.O.M: Start Of Message sync character, ( 0x02 ).

ADDR: I.D number of addressee.
To enable support of broadcast messages, a receiver unit will respond to messages addressed to the private or to the broadcast addresses. The broadcast address is defined as 0xFFFF.
NOTE: The ADDR field is two bytes long. The first byte is the msb one.

LEN : Length of message (exclude S.O.M, E.O.M, ADDR). LEN = 0..255.

OP : Op code, used to identify the type of service requested.

DATA : Message body.

CRC : Modulu 256 checksum for error checking, off all characters, exclude CRC itself.

E.O.M: End Of Message sync character, ( 0x03 ).

Data Flow Protocol

1. If the message received successfully, the receiver device will acknowledge it with ACK character (0x06).

2. If the message unsuccessfully received, the receiver device will return a negative ack, NAK, character (0x15).

3. A message will be considered as a successful one, if all the message bytes received within message time out, and the CRC checksum passed.

4. If the transmitter device received NAK, or did not received an ACK within TBD ACK T.O.T, then it will attempt to re transmit the message again. Total number of retries will be five.
   In the case that ACK received, The preamble will not be used in the retransmitted message.

5. For the scanner application, due to the long time of the preamble sequence used for the STOP SCAN, after a message was received from the control station, stay to listen on the line for LINK T.O.T seconds for successive messages.

Receiver State Machine

The receiver state machine diagram and states explanation are given below:

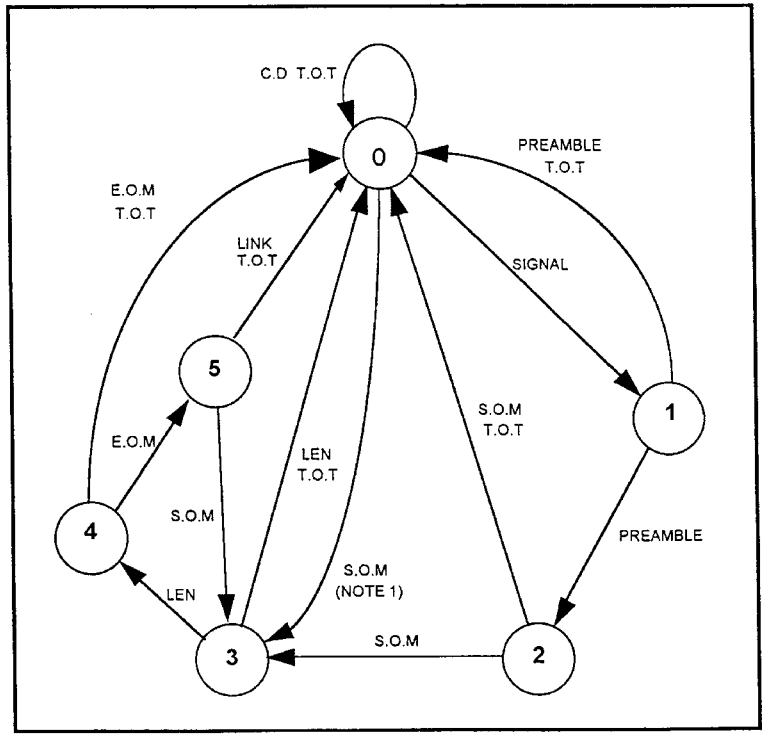

Receiver state machine

Explanation

State 0: In this state, the receiver checks for signal detection

The receiver is looking for signal within a C.D T.O.T seconds.

If a signal is detected, then switch to state 1.

If the signal is not detected within this time, then switch to next port, and stay in this state.

NOTE 1:
In case of the dedicated RS232 line, the receiver looks for the S.O.M character in state 0, because the preamble pattern is not used in this case. This is described with the dashed line outgoing from this state.
In this case, the receiver will looks for the S.O.M without time limit, because this character is the event that starts the state machine.

State 1: In this state, the receiver waits for PREAMBLE pattern, within PREAMBLE T.O.T seconds.

If at least two preamble characters was received, it assumed that a valid message is coming, and then switch to state 2.

If the PREAMBLE characters wasn't detected within this time, return to state 0.

State 2: In this state, the receiver waits for Start Of Message character (*S.O.M*), within S.O.M T.O.T seconds.

If the *S.O.M* was received within this time, initiate the receiver for message receive, and switch to state 3.

If the *S.O.M* wasn't detected within this time, return state 0.

State 3: In this state the receiver is waiting for the *LEN* field to be received. The *LEN* is important for calculating the message time out, so a dedicated state is used to receive it.

The receiver will wait for *LEN* within LEN T.O.T, which is:

$$\text{LEN T.O.T} = (3*2) * (BYTE\ TIME)$$

State 4: In this state, the receiver waits for the whole message to be received.
While receiving, the receiver looks for the End Of Message character (*E.O.M*) to appear at the end of message, according to the *LEN* field.

The receiver will wait for *E.O.M* within E.O.M T.O.T which is calculated from *LEN*.

$$\text{E.O.M T.O.T} = [(LEN+3)*2] * (BYTE\ TIME).$$

If during this T.O.T : the *S.O.M* wasn't detected, or the number of characters received is less then *LEN*+3 then return state 0.

If The E.O.M received within the time limit, and the message was recognizes as a good message (*LEN* and checksum passed), then switch to state 5.

State 5: This state is used to enable receive of successive messages that are not starts with the preamble pattern. This is an idle state which the receiver waits to receive an S.O.M character.

If the S.O.M is received, then assume a new message and start receive it while switching to state 3.

If a successive message didn't received within a LINK T.O.T, then reset receiver and switch to state 0.

Transmitter State Machine

The transmitter state machine diagram and states explanation are given below:

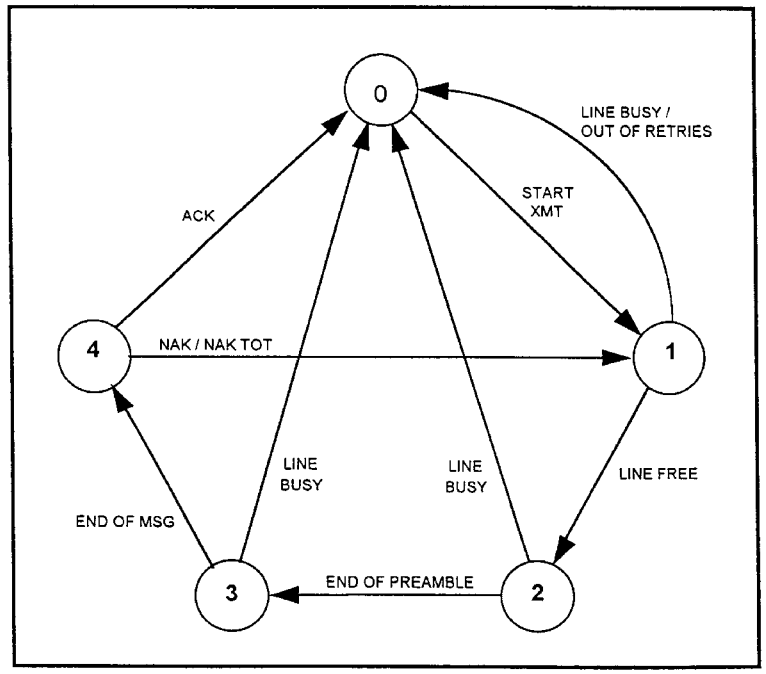

Transmitter state machine

Explanation

State 0: State zero is the idle state, which the transmitter is waiting to a message to be transmitted.
If a message needs to be transmitted then switch to state 1.

State 1: In this state, the transmitter will check the line if it busy or free to transmit, within a C.D T.O.T seconds.

If the line is busy, return to state 0, and the message will be in a pending state.

If the line is free, initiate the transmitter and switch to next state (2).

State 2: In this state, the preamble pattern is transmitted.
At the end of the preamble, switch to state 3.

If during the transmission the line is identified as busy, then stop transmit and switch to state 0.

State 3: This state is used to transmit the message body, character by character, from S.O.M to E.O.M.

The checksum will be calculated on character to character basis.

After transmitting of the last character (E.O.M), switch to state 4.

If during the transmission the line is identified as busy, then stop transmit and switch to state 0.

State 4: In this state, the transmitter is waiting to receive an ACK / NAK for the last transmitted message.

If an ACK is received, the message successfully transferred and switch to state 0.

If an NAK received, or ACK dined received within ACK T.O.T, then switch to state 1, to re transmit the message.

Control Messages Set

Messages to the scanner unit

Go to Standby mode.

Start new transmit scan cycle .

Continue last transmit scan cycle.

Start receive scan.

Go to standby and download local scanner database.

Request Scanner Status.

Start BIT process ( with report ).

Reset scanner (including data base).

Set scanner I.D number.

Request scanner I.D number.

Set scanner rack I.D.

Set scanner rack parameters (level, number of input/output ports).

Note:

When the scanner commanded to stop transmit scan cycle, then it will report to the control station the status of the transmit scan.

Messages from the scanner

Report scanner status.

Report ALARM status.

Report BIT status.

Report scanner I.D number.

Report scanner rack I.D.

Report scanner rack parameters (level, number of input/output ports).

Scanner transmit scan identification frame (for scanning).

Report transmit scan cycle status.

File Transfer Protocol

The file transfer protocol was chosen to be the XMODEM standard protocol, used worldwide in many applications.

This protocol is used to transfer files between two computers via modems, with the following features:

- Error checking by using CRC method.

- Transfer of small packets (512 bytes) which are assembled back to the complete file at the receiving station.

- ACK is used to confirm each received packet.

After the scanner receive a command to download data base to the control station, the scanner will enter to the FILE TRANSFER state and will start the transfer, using the XMODEM protocol.
First, the XMODEM protocol is making the negotiating process with the control station, and then transfer the file.

After transfer process is completed or aborted for any reason, the scanner will return back to communicate with the normal P.T.P management protocol.

The file that will be downloaded to the computer will be a binary data file, that contains the scanner data base exactly as it is in the scanner memory.

It is the control station responsibility to identify the file according to the specific scanner I.D.

Scanner Data Base Structure

A graphical demonstration of the data base structure is shown in the next drawing:

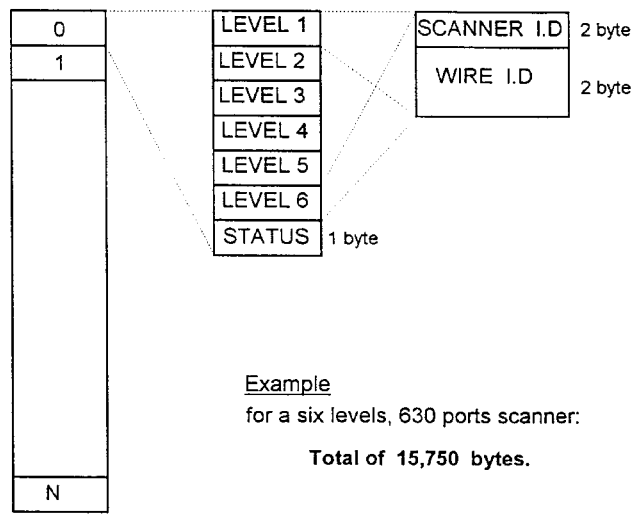

Example
for a six levels, 630 ports scanner:

Total of 15,750 bytes.

Scanner i.d: I.D number of received scanner (Same I.D number as used for the communication protocol).
If Scanner I.D = 0xFFFF, this means that WIRE I.D is a pointer to a linked list that contains the connection list for multiple connection port. See structure of this linked list at the Data Base Extension section..

PORT I.D: An integer to indicate the wire I.D as identified in scanner ( I.D ).
Also used as a pointer to a linked list of the connection list for multiple connection port (see Scanner I.D ).

STATUS: Indicate if the scanner succeeded transmit on this port.

Data Base extension for multiple connected port:

When more then one identification frames was received at a specific port for a specific level, this port is define to be a "multiply connected port".

For those kind of ports, the data base structure suggested above is not suitable, and therefore the extended format is used.

In this format, The scanner I.D field will be set to I.D=0xFFFF ( to indicate the use of the extended format), while the wire I.D field will hold a pointer to the beginning of a linked list which holds all the identification frames received at the specific level.

A graphical visualization of the linked list structure is drawn below:

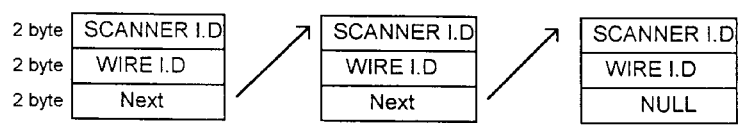

Appendix A: Synonyms and Abbreviations

| | |
|---|---|
| C.D TOT | - Carrier Detect Time Out. |
| DATA TOT | - Data message Time Out. |
| PC POL TOT | - PC control station Polling Time.. |
| P.T.P | - Point To Point |
| S.O.M | - Start Of Message. |
| E.O.M | - End Of Message. |
| LEN | - Length (of message). |
| OP | - Operation code. |
| CRC | - Cyclic Redundancy Check. |
| S/W | - software. |
| H/W | - hardware. |
| RCV | - Receive. |
| XMT | - Transmit. |
| XFR | - Transfer. |
| STBY | - Stand by |
| T.O.T | - Time Out. |
| UART | - Universal Asynhronous Receiver Transmitter. |
| CHARACTER RATE | - Maximum Rate of character received/transmitted. This is usually BAUD RATE / 11. |
| S.D T.O.T | - Signal Detect time-out. |
| C.D T.O.T | - Carrier Detect time-out. |
| S.O.M T.O.T | - Start Of Message time-out. |
| E.O.M T.O.T | - End Of Message time-out. |

```
% Product: PV2 - MUX (216 Pairs)              Revised:    July  6, 199
% MUX1_4.SCH                                  Revision: 0.4
% RIT TECHNOLOGIES LTD.
% 7 Ha-arad St. Tel-Aviv 69710, Israel
% Tel: 972-3-496504, 496513, Fax: 972-3-496505
% ================================================
% Designer: IDAN KESSEL
BOARD = ORCAD.PCB;

PARTS
100NF          = CL1,      % 100NF
                 CL2,      % 100NF
                 CL3,      % 100NF
                 CL4,      % 100NF
                 CL5,      % 100NF
                 CL6,      % 100NF
                 CL7,      % 100NF
                 C7,       % 100NF
                 CL8,      % 100NF
                 C8,       % 100NF
                 CL9,      % 100NF
                 CL10,     % 100NF
                 CL11,     % 100NF
                 CL12,     % 100NF
                 CL13,     % 100NF
                 CL14,     % 100NF
                 CL15,     % 100NF
                 CL16,     % 100NF
                 CL17,     % 100NF
                 CL18,     % 100NF
                 CL19,     % 100NF
                 CL20,     % 100NF
                 CL21,     % 100NF
                 CL22,     % 100NF
                 CL23,     % 100NF
                 CL24,     % 100NF
                 CL25,     % 100NF
                 CL26,     % 100NF
                 CL27,     % 100NF
                 CL28,     % 100NF
                 CL29,     % 100NF
                 CL30,     % 100NF
                 CL31,     % 100NF
                 CL32,     % 100NF
                 CL33,     % 100NF
                 C33,      % 100NF
                 C34,      % 100NF
                 CL34,     % 100NF
                 CL35,     % 100NF
                 CL36,     % 100NF
                 CL37,     % 100NF
                 CL38,     % 100NF
                 C59,      % 100NF
                 C60,      % 100NF
                 C85,      % 100NF
                 C86,      % 100NF
                 C111,     % 100NF
                 C112,     % 100NF
                 C137,     % 100NF
                 C138,     % 100NF
                 C163,     % 100NF
                 C164,     % 100NF
                 C189,     % 100NF
                 C190,     % 100NF
                 C215,     % 100NF
                 C216;     % 100NF
```

10NF

```
C1,   % 10NF
C2,   % 10NF
C3,   % 10NF
C4,   % 10NF
C5,   % 10NF
C6,   % 10NF
C9,   % 10NF
C10,  % 10NF
C11,  % 10NF
C12,  % 10NF
C13,  % 10NF
C14,  % 10NF
C15,  % 10NF
C16,  % 10NF
C17,  % 10NF
C18,  % 10NF
C19,  % 10NF
C20,  % 10NF
C21,  % 10NF
C22,  % 10NF
C23,  % 10NF
C24,  % 10NF
C25,  % 10NF
C26,  % 10NF
C27,  % 10NF
C28,  % 10NF
C29,  % 10NF
C30,  % 10NF
C31,  % 10NF
C32,  % 10NF
C35,  % 10NF
C36,  % 10NF
C37,  % 10NF
C38,  % 10NF
C39,  % 10NF
C40,  % 10NF
C41,  % 10NF
C42,  % 10NF
C43,  % 10NF
C44,  % 10NF
C45,  % 10NF
C46,  % 10NF
C47,  % 10NF
C48,  % 10NF
C49,  % 10NF
C50,  % 10NF
C51,  % 10NF
C52,  % 10NF
C53,  % 10NF
C54,  % 10NF
C55,  % 10NF
C56,  % 10NF
C57,  % 10NF
C58,  % 10NF
C61,  % 10NF
C62,  % 10NF
C63,  % 10NF
C64,  % 10NF
C65,  % 10NF
C66,  % 10NF
C67,  % 10NF
C68,  % 10NF
C69,  % 10NF
C70,  % 10NF
C71,  % 10NF
C72,  % 10NF
```

```
C73,   % 10NF
C74,   % 10NF
C75,   % 10NF
C76,   % 10NF
C77,   % 10NF
C78,   % 10NF
C79,   % 10NF
C80,   % 10NF
C81,   % 10NF
C82,   % 10NF
C83,   % 10NF
C84,   % 10NF
C87,   % 10NF
C88,   % 10NF
C89,   % 10NF
C90,   % 10NF
C91,   % 10NF
C92,   % 10NF
C93,   % 10NF
C94,   % 10NF
C95,   % 10NF
C96,   % 10NF
C97,   % 10NF
C98,   % 10NF
C99,   % 10NF
C100,  % 10NF
C101,  % 10NF
C102,  % 10NF
C103,  % 10NF
C104,  % 10NF
C105,  % 10NF
C106,  % 10NF
C107,  % 10NF
C108,  % 10NF
C109,  % 10NF
C110,  % 10NF
C113,  % 10NF
C114,  % 10NF
C115,  % 10NF
C116,  % 10NF
C117,  % 10NF
C118,  % 10NF
C119,  % 10NF
C120,  % 10NF
C121,  % 10NF
C122,  % 10NF
C123,  % 10NF
C124,  % 10NF
C125,  % 10NF
C126,  % 10NF
C127,  % 10NF
C128,  % 10NF
C129,  % 10NF
C130,  % 10NF
C131,  % 10NF
C132,  % 10NF
C133,  % 10NF
C134,  % 10NF
C135,  % 10NF
C136,  % 10NF
C139,  % 10NF
C140,  % 10NF
C141,  % 10NF
C142,  % 10NF
C143,  % 10NF
C144,  % 10NF
```

```
C145,   % 10NF
C146,   % 10NF
C147,   % 10NF
C148,   % 10NF
C149,   % 10NF
C150,   % 10NF
C151,   % 10NF
C152,   % 10NF
C153,   % 10NF
C154,   % 10NF
C155,   % 10NF
C156,   % 10NF
C157,   % 10NF
C158,   % 10NF
C159,   % 10NF
C160,   % 10NF
C161,   % 10NF
C162,   % 10NF
C165,   % 10NF
C166,   % 10NF
C167,   % 10NF
C168,   % 10NF
C169,   % 10NF
C170,   % 10NF
C171,   % 10NF
C172,   % 10NF
C173,   % 10NF
C174,   % 10NF
C175,   % 10NF
C176,   % 10NF
C177,   % 10NF
C178,   % 10NF
C179,   % 10NF
C180,   % 10NF
C181,   % 10NF
C182,   % 10NF
C183,   % 10NF
C184,   % 10NF
C185,   % 10NF
C186,   % 10NF
C187,   % 10NF
C188,   % 10NF
C191,   % 10NF
C192,   % 10NF
C193,   % 10NF
C194,   % 10NF
C195,   % 10NF
C196,   % 10NF
C197,   % 10NF
C198,   % 10NF
C199,   % 10NF
C200,   % 10NF
C201,   % 10NF
C202,   % 10NF
C203,   % 10NF
C204,   % 10NF
C205,   % 10NF
C206,   % 10NF
C207,   % 10NF
C208,   % 10NF
C209,   % 10NF
C210,   % 10NF
C211,   % 10NF
C212,   % 10NF
C213,   % 10NF
C214,   % 10NF
```

```
C217,   % 10NF
C218,   % 10NF
C219,   % 10NF
C220,   % 10NF
C221,   % 10NF
C222,   % 10NF
C223,   % 10NF
C224,   % 10NF
C225,   % 10NF
C226,   % 10NF
C227,   % 10NF
C228,   % 10NF
C229,   % 10NF
C230,   % 10NF
C231,   % 10NF
C232,   % 10NF
C233,   % 10NF
C234,   % 10NF
C235,   % 10NF
C236,   % 10NF
C237,   % 10NF
C238,   % 10NF
C239,   % 10NF
C240,   % 10NF
C241,   % 10NF
C242,   % 10NF
C243,   % 10NF
C244,   % 10NF
C245,   % 10NF
C246,   % 10NF
C247,   % 10NF
C248,   % 10NF
C249,   % 10NF
C250,   % 10NF
C251,   % 10NF
C252,   % 10NF
C253,   % 10NF
C254,   % 10NF
C255,   % 10NF
C256,   % 10NF
C257,   % 10NF
C258,   % 10NF
C259,   % 10NF
C260,   % 10NF
C261,   % 10NF
C262,   % 10NF
C263,   % 10NF
C264,   % 10NF
C265,   % 10NF
C266,   % 10NF
C267,   % 10NF
C268,   % 10NF
C269,   % 10NF
C270,   % 10NF
C271,   % 10NF
C272,   % 10NF
C273,   % 10NF
C274,   % 10NF
C275,   % 10NF
C276,   % 10NF
C277,   % 10NF
C278,   % 10NF
C279,   % 10NF
C280,   % 10NF
C281,   % 10NF
C282,   % 10NF
```

```
C283,    % 10NF
C284,    % 10NF
C285,    % 10NF
C286,    % 10NF
C287,    % 10NF
C288,    % 10NF
C289,    % 10NF
C290,    % 10NF
C291,    % 10NF
C292,    % 10NF
C293,    % 10NF
C294,    % 10NF
C295,    % 10NF
C296,    % 10NF
C297,    % 10NF
C298,    % 10NF
C299,    % 10NF
C300,    % 10NF
C301,    % 10NF
C302,    % 10NF
C303,    % 10NF
C304,    % 10NF
C305,    % 10NF
C306,    % 10NF
C307,    % 10NF
C308,    % 10NF
C309,    % 10NF
C310,    % 10NF
C311,    % 10NF
C312,    % 10NF
C313,    % 10NF
C314,    % 10NF
C315,    % 10NF
C316,    % 10NF
C317,    % 10NF
C318,    % 10NF
C319,    % 10NF
C320,    % 10NF
C321,    % 10NF
C322,    % 10NF
C323,    % 10NF
C324,    % 10NF
C325,    % 10NF
C326,    % 10NF
C327,    % 10NF
C328,    % 10NF
C329,    % 10NF
C330,    % 10NF
C331,    % 10NF
C332,    % 10NF
C333,    % 10NF
C334,    % 10NF
C335,    % 10NF
C336,    % 10NF
C337,    % 10NF
C338,    % 10NF
C339,    % 10NF
C340,    % 10NF
C341,    % 10NF
C342,    % 10NF
C343,    % 10NF
C344,    % 10NF
C345,    % 10NF
C346,    % 10NF
C347,    % 10NF
C348,    % 10NF
```

| | | |
|---|---|---|
| C349, | % | 10NF |
| C350, | % | 10NF |
| C351, | % | 10NF |
| C352, | % | 10NF |
| C353, | % | 10NF |
| C354, | % | 10NF |
| C355, | % | 10NF |
| C356, | % | 10NF |
| C357, | % | 10NF |
| C358, | % | 10NF |
| C359, | % | 10NF |
| C360, | % | 10NF |
| C361, | % | 10NF |
| C362, | % | 10NF |
| C363, | % | 10NF |
| C364, | % | 10NF |
| C365, | % | 10NF |
| C366, | % | 10NF |
| C367, | % | 10NF |
| C368, | % | 10NF |
| C369, | % | 10NF |
| C370, | % | 10NF |
| C371, | % | 10NF |
| C372, | % | 10NF |
| C373, | % | 10NF |
| C374, | % | 10NF |
| C375, | % | 10NF |
| C376, | % | 10NF |
| C377, | % | 10NF |
| C378, | % | 10NF |
| C379, | % | 10NF |
| C380, | % | 10NF |
| C381, | % | 10NF |
| C382, | % | 10NF |
| C383, | % | 10NF |
| C384, | % | 10NF |
| C385, | % | 10NF |
| C386, | % | 10NF |
| C387, | % | 10NF |
| C388, | % | 10NF |
| C389, | % | 10NF |
| C390, | % | 10NF |
| C391, | % | 10NF |
| C392, | % | 10NF |
| C393, | % | 10NF |
| C394, | % | 10NF |
| C395, | % | 10NF |
| C396, | % | 10NF |
| C397, | % | 10NF |
| C398, | % | 10NF |
| C399, | % | 10NF |
| C400, | % | 10NF |
| C401, | % | 10NF |
| C402, | % | 10NF |
| C403, | % | 10NF |
| C404, | % | 10NF |
| C405, | % | 10NF |
| C406, | % | 10NF |
| C407, | % | 10NF |
| C408, | % | 10NF |
| C409, | % | 10NF |
| C410, | % | 10NF |
| C411, | % | 10NF |
| C412, | % | 10NF |
| C413, | % | 10NF |
| C414, | % | 10NF |

```
                    C415,   % 10NF
                    C416,   % 10NF
                    C417,   % 10NF
                    C418,   % 10NF
                    C419,   % 10NF
                    C420,   % 10NF
                    C421,   % 10NF
                    C422,   % 10NF
                    C423,   % 10NF
                    C424,   % 10NF
                    C425,   % 10NF
                    C426,   % 10NF
                    C427,   % 10NF
                    C428,   % 10NF
                    C429,   % 10NF
                    C430,   % 10NF
                    C431,   % 10NF
                    C432,   % 10NF
                    C433,   % 10NF
                    C434,   % 10NF
                    C435,   % 10NF
                    C436,   % 10NF
                    C437,   % 10NF
                    C438,   % 10NF
                    C439,   % 10NF
                    C440,   % 10NF
                    C441,   % 10NF
                    C442,   % 10NF
                    C443,   % 10NF
                    C444,   % 10NF
                    C445,   % 10NF
                    C446,   % 10NF
                    C447,   % 10NF
                    C448,   % 10NF
                    C449,   % 10NF
                    C450;   % 10NF
4514            =   U1,     % 4514
                    U2;     % 4514
70K             =   R1,     % 70K
                    R2,     % 70K
                    R3,     % 70K
                    R4,     % 70K
                    R5,     % 70K
                    R6,     % 70K
                    R7,     % 70K
                    R8,     % 70K
                    R9,     % 70K
                    R10,    % 70K
                    R11,    % 70K
                    R12,    % 70K
                    R13,    % 70K
                    R14,    % 70K
                    R15,    % 70K
                    R16,    % 70K
                    R17,    % 70K
                    R18,    % 70K
                    R19,    % 70K
                    R20,    % 70K
                    R21,    % 70K
                    R22,    % 70K
                    R23,    % 70K
                    R24,    % 70K
                    R25,    % 70K
                    R26,    % 70K
                    R27,    % 70K
                    R28,    % 70K
```

| | |
|---|---|
| R29, | % 70K |
| R30, | % 70K |
| R31, | % 70K |
| R32, | % 70K |
| R33, | % 70K |
| R34, | % 70K |
| R35, | % 70K |
| R36, | % 70K |
| R37, | % 70K |
| R38, | % 70K |
| R39, | % 70K |
| R40, | % 70K |
| R41, | % 70K |
| R42, | % 70K |
| R43, | % 70K |
| R44, | % 70K |
| R45, | % 70K |
| R46, | % 70K |
| R47, | % 70K |
| R48, | % 70K |
| R49, | % 70K |
| R50, | % 70K |
| R51, | % 70K |
| R52, | % 70K |
| R53, | % 70K |
| R54, | % 70K |
| R55, | % 70K |
| R56, | % 70K |
| R57, | % 70K |
| R58, | % 70K |
| R59, | % 70K |
| R60, | % 70K |
| R61, | % 70K |
| R62, | % 70K |
| R63, | % 70K |
| R64, | % 70K |
| R65, | % 70K |
| R66, | % 70K |
| R67, | % 70K |
| R68, | % 70K |
| R69, | % 70K |
| R70, | % 70K |
| R71, | % 70K |
| R72, | % 70K |
| R73, | % 70K |
| R74, | % 70K |
| R75, | % 70K |
| R76, | % 70K |
| R77, | % 70K |
| R78, | % 70K |
| R79, | % 70K |
| R80, | % 70K |
| R81, | % 70K |
| R82, | % 70K |
| R83, | % 70K |
| R84, | % 70K |
| R85, | % 70K |
| R86, | % 70K |
| R87, | % 70K |
| R88, | % 70K |
| R89, | % 70K |
| R90, | % 70K |
| R91, | % 70K |
| R92, | % 70K |
| R93, | % 70K |
| R94, | % 70K |

| | |
|---|---|
| R95, | ⅛ 70K |
| R96, | ⅛ 70K |
| R97, | ⅛ 70K |
| R98, | ⅛ 70K |
| R99, | ⅛ 70K |
| R100, | ⅛ 70K |
| R101, | ⅛ 70K |
| R102, | ⅛ 70K |
| R103, | ⅛ 70K |
| R104, | ⅛ 70K |
| R105, | ⅛ 70K |
| R106, | ⅛ 70K |
| R107, | ⅛ 70K |
| R108, | ⅛ 70K |
| R109, | ⅛ 70K |
| R110, | ⅛ 70K |
| R111, | ⅛ 70K |
| R112, | ⅛ 70K |
| R113, | ⅛ 70K |
| R114, | ⅛ 70K |
| R115, | ⅛ 70K |
| R116, | ⅛ 70K |
| R117, | ⅛ 70K |
| R118, | ⅛ 70K |
| R119, | ⅛ 70K |
| R120, | ⅛ 70K |
| R121, | ⅛ 70K |
| R122, | ⅛ 70K |
| R123, | ⅛ 70K |
| R124, | ⅛ 70K |
| R125, | ⅛ 70K |
| R126, | ⅛ 70K |
| R127, | ⅛ 70K |
| R128, | ⅛ 70K |
| R129, | ⅛ 70K |
| R130, | ⅛ 70K |
| R131, | ⅛ 70K |
| R132, | ⅛ 70K |
| R133, | ⅛ 70K |
| R134, | ⅛ 70K |
| R135, | ⅛ 70K |
| R136, | ⅛ 70K |
| R137, | ⅛ 70K |
| R138, | ⅛ 70K |
| R139, | ⅛ 70K |
| R140, | ⅛ 70K |
| R141, | ⅛ 70K |
| R142, | ⅛ 70K |
| R143, | ⅛ 70K |
| R144, | ⅛ 70K |
| R145, | ⅛ 70K |
| R146, | ⅛ 70K |
| R147, | ⅛ 70K |
| R148, | ⅛ 70K |
| R149, | ⅛ 70K |
| R150, | ⅛ 70K |
| R151, | ⅛ 70K |
| R152, | ⅛ 70K |
| R153, | ⅛ 70K |
| R154, | ⅛ 70K |
| R155, | ⅛ 70K |
| R156, | ⅛ 70K |
| R157, | ⅛ 70K |
| R158, | ⅛ 70K |
| R159, | ⅛ 70K |
| R160, | ⅛ 70K |

```
             R161,    % 70K
             R162,    % 70K
             R163,    % 70K
             R164,    % 70K
             R165,    % 70K
             R166,    % 70K
             R167,    % 70K
             R168,    % 70K
             R169,    % 70K
             R170,    % 70K
             R171,    % 70K
             R172,    % 70K
             R173,    % 70K
             R174,    % 70K
             R175,    % 70K
             R176,    % 70K
             R177,    % 70K
             R178,    % 70K
             R179,    % 70K
             R180,    % 70K
             R181,    % 70K
             R182,    % 70K
             R183,    % 70K
             R184,    % 70K
             R185,    % 70K
             R186,    % 70K
             R187,    % 70K
             R188,    % 70K
             R189,    % 70K
             R190,    % 70K
             R191,    % 70K
             R192,    % 70K
             R193,    % 70K
             R194,    % 70K
             R195,    % 70K
             R196,    % 70K
             R197,    % 70K
             R198,    % 70K
             R199,    % 70K
             R200,    % 70K
             R201,    % 70K
             R202,    % 70K
             R203,    % 70K
             R204,    % 70K
             R205,    % 70K
             R206,    % 70K
             R207,    % 70K
             R208,    % 70K
             R209,    % 70K
             R210,    % 70K
             R211,    % 70K
             R212,    % 70K
             R213,    % 70K
             R214,    % 70K
             R215,    % 70K
             R216;    % 70K
CON AT48   = J2,      % CON AT48
             J3,      % CON AT48
             J4,      % CON AT48
             J5,      % CON AT48
             J6,      % CON AT48
             J7,      % CON AT48
             J8,      % CON AT48
             J9,      % CON AT48
             J10;     % CON AT48
CON20A     = J1;      % CON20A
```

```
HI547           = U4,    % HI547
                  U9,    % HI547
                  U14,   % HI547
                  U19,   % HI547
                  U24,   % HI547
                  U29,   % HI547
                  U34,   % HI547
                  U39,   % HI547
                  U44,   % HI547
                  U49,   % HI547
                  U51,   % HI547
                  U53,   % HI547
                  U55,   % HI547
                  U57,   % HI547
                  U59,   % HI547
                  U61,   % HI547
                  U63,   % HI547
                  U65,   % HI547
                  U67,   % HI547
                  U69,   % HI547
                  U71,   % HI547
                  U73,   % HI547
                  U75,   % HI547
                  U77,   % HI547
                  U79,   % HI547
                  U81,   % HI547
                  U83;   % HI547
SIOV-S14K230    = RV1,   % SIOV-S14K230
                  RV2,   % SIOV-S14K230
                  RV3,   % SIOV-S14K230
                  RV4,   % SIOV-S14K230
                  RV5,   % SIOV-S14K230
                  RV6,   % SIOV-S14K230
                  RV7,   % SIOV-S14K230
                  RV8,   % SIOV-S14K230
                  RV9,   % SIOV-S14K230
                  RV10,  % SIOV-S14K230
                  RV11,  % SIOV-S14K230
                  RV12,  % SIOV-S14K230
                  RV13,  % SIOV-S14K230
                  RV14,  % SIOV-S14K230
                  RV15,  % SIOV-S14K230
                  RV16,  % SIOV-S14K230
                  RV17,  % SIOV-S14K230
                  RV18,  % SIOV-S14K230
                  RV19,  % SIOV-S14K230
                  RV20,  % SIOV-S14K230
                  RV21,  % SIOV-S14K230
                  RV22,  % SIOV-S14K230
                  RV23,  % SIOV-S14K230
                  RV24,  % SIOV-S14K230
                  RV25,  % SIOV-S14K230
                  RV26,  % SIOV-S14K230
                  RV27,  % SIOV-S14K230
                  RV28,  % SIOV-S14K230
                  RV29,  % SIOV-S14K230
                  RV30,  % SIOV-S14K230
                  RV31,  % SIOV-S14K230
                  RV32,  % SIOV-S14K230
                  RV33,  % SIOV-S14K230
                  RV34,  % SIOV-S14K230
                  RV35,  % SIOV-S14K230
                  RV36,  % SIOV-S14K230
                  RV37,  % SIOV-S14K230
                  RV38,  % SIOV-S14K230
                  RV39,  % SIOV-S14K230
```

```
RV40,    % SIOV-S14K230
RV41,    % SIOV-S14K230
RV42,    % SIOV-S14K230
RV43,    % SIOV-S14K230
RV44,    % SIOV-S14K230
RV45,    % SIOV-S14K230
RV46,    % SIOV-S14K230
RV47,    % SIOV-S14K230
RV48,    % SIOV-S14K230
RV49,    % SIOV-S14K230
RV50,    % SIOV-S14K230
RV51,    % SIOV-S14K230
RV52,    % SIOV-S14K230
RV53,    % SIOV-S14K230
RV54,    % SIOV-S14K230
RV55,    % SIOV-S14K230
RV56,    % SIOV-S14K230
RV57,    % SIOV-S14K230
RV58,    % SIOV-S14K230
RV59,    % SIOV-S14K230
RV60,    % SIOV-S14K230
RV61,    % SIOV-S14K230
RV62,    % SIOV-S14K230
RV63,    % SIOV-S14K230
RV64,    % SIOV-S14K230
RV65,    % SIOV-S14K230
RV66,    % SIOV-S14K230
RV67,    % SIOV-S14K230
RV68,    % SIOV-S14K230
RV69,    % SIOV-S14K230
RV70,    % SIOV-S14K230
RV71,    % SIOV-S14K230
RV72,    % SIOV-S14K230
RV73,    % SIOV-S14K230
RV74,    % SIOV-S14K230
RV75,    % SIOV-S14K230
RV76,    % SIOV-S14K230
RV77,    % SIOV-S14K230
RV78,    % SIOV-S14K230
RV79,    % SIOV-S14K230
RV80,    % SIOV-S14K230
RV81,    % SIOV-S14K230
RV82,    % SIOV-S14K230
RV83,    % SIOV-S14K230
RV84,    % SIOV-S14K230
RV85,    % SIOV-S14K230
RV86,    % SIOV-S14K230
RV87,    % SIOV-S14K230
RV88,    % SIOV-S14K230
RV89,    % SIOV-S14K230
RV90,    % SIOV-S14K230
RV91,    % SIOV-S14K230
RV92,    % SIOV-S14K230
RV93,    % SIOV-S14K230
RV94,    % SIOV-S14K230
RV95,    % SIOV-S14K230
RV96,    % SIOV-S14K230
RV97,    % SIOV-S14K230
RV98,    % SIOV-S14K230
RV99,    % SIOV-S14K230
RV100,   % SIOV-S14K230
RV101,   % SIOV-S14K230
RV102,   % SIOV-S14K230
RV103,   % SIOV-S14K230
RV104,   % SIOV-S14K230
RV105,   % SIOV-S14K230
```

RV106, % SIOV-S14K230
RV107, % SIOV-S14K230
RV108, % SIOV-S14K230
RV109, % SIOV-S14K230
RV110, % SIOV-S14K230
RV111, % SIOV-S14K230
RV112, % SIOV-S14K230
RV113, % SIOV-S14K230
RV114, % SIOV-S14K230
RV115, % SIOV-S14K230
RV116, % SIOV-S14K230
RV117, % SIOV-S14K230
RV118, % SIOV-S14K230
RV119, % SIOV-S14K230
RV120, % SIOV-S14K230
RV121, % SIOV-S14K230
RV122, % SIOV-S14K230
RV123, % SIOV-S14K230
RV124, % SIOV-S14K230
RV125, % SIOV-S14K230
RV126, % SIOV-S14K230
RV127, % SIOV-S14K230
RV128, % SIOV-S14K230
RV129, % SIOV-S14K230
RV130, % SIOV-S14K230
RV131, % SIOV-S14K230
RV132, % SIOV-S14K230
RV133, % SIOV-S14K230
RV134, % SIOV-S14K230
RV135, % SIOV-S14K230
RV136, % SIOV-S14K230
RV137, % SIOV-S14K230
RV138, % SIOV-S14K230
RV139, % SIOV-S14K230
RV140, % SIOV-S14K230
RV141, % SIOV-S14K230
RV142, % SIOV-S14K230
RV143, % SIOV-S14K230
RV144, % SIOV-S14K230
RV145, % SIOV-S14K230
RV146, % SIOV-S14K230
RV147, % SIOV-S14K230
RV148, % SIOV-S14K230
RV149, % SIOV-S14K230
RV150, % SIOV-S14K230
RV151, % SIOV-S14K230
RV152, % SIOV-S14K230
RV153, % SIOV-S14K230
RV154, % SIOV-S14K230
RV155, % SIOV-S14K230
RV156, % SIOV-S14K230
RV157, % SIOV-S14K230
RV158, % SIOV-S14K230
RV159, % SIOV-S14K230
RV160, % SIOV-S14K230
RV161, % SIOV-S14K230
RV162, % SIOV-S14K230
RV163, % SIOV-S14K230
RV164, % SIOV-S14K230
RV165, % SIOV-S14K230
RV166, % SIOV-S14K230
RV167, % SIOV-S14K230
RV168, % SIOV-S14K230
RV169, % SIOV-S14K230
RV170, % SIOV-S14K230
RV171, % SIOV-S14K230

```
          RV172,   % SIOV-S14K230
          RV173,   % SIOV-S14K230
          RV174,   % SIOV-S14K230
          RV175,   % SIOV-S14K230
          RV176,   % SIOV-S14K230
          RV177,   % SIOV-S14K230
          RV178,   % SIOV-S14K230
          RV179,   % SIOV-S14K230
          RV180,   % SIOV-S14K230
          RV181,   % SIOV-S14K230
          RV182,   % SIOV-S14K230
          RV183,   % SIOV-S14K230
          RV184,   % SIOV-S14K230
          RV185,   % SIOV-S14K230
          RV186,   % SIOV-S14K230
          RV187,   % SIOV-S14K230
          RV188,   % SIOV-S14K230
          RV189,   % SIOV-S14K230
          RV190,   % SIOV-S14K230
          RV191,   % SIOV-S14K230
          RV192,   % SIOV-S14K230
          RV193,   % SIOV-S14K230
          RV194,   % SIOV-S14K230
          RV195,   % SIOV-S14K230
          RV196,   % SIOV-S14K230
          RV197,   % SIOV-S14K230
          RV198,   % SIOV-S14K230
          RV199,   % SIOV-S14K230
          RV200,   % SIOV-S14K230
          RV201,   % SIOV-S14K230
          RV202,   % SIOV-S14K230
          RV203,   % SIOV-S14K230
          RV204,   % SIOV-S14K230
          RV205,   % SIOV-S14K230
          RV206,   % SIOV-S14K230
          RV207,   % SIOV-S14K230
          RV208,   % SIOV-S14K230
          RV209,   % SIOV-S14K230
          RV210,   % SIOV-S14K230
          RV211,   % SIOV-S14K230
          RV212,   % SIOV-S14K230
          RV213,   % SIOV-S14K230
          RV214,   % SIOV-S14K230
          RV215,   % SIOV-S14K230
          RV216;   % SIOV-S14K230
SM14M12 = U3,      % SM14M12
          U5,      % SM14M12
          U6,      % SM14M12
          U7,      % SM14M12
          U8,      % SM14M12
          U10,     % SM14M12
          U11,     % SM14M12
          U12,     % SM14M12
          U13,     % SM14M12
          U15,     % SM14M12
          U16,     % SM14M12
          U17,     % SM14M12
          U18,     % SM14M12
          U20,     % SM14M12
          U21,     % SM14M12
          U22,     % SM14M12
          U23,     % SM14M12
          U25,     % SM14M12
          U26,     % SM14M12
          U27,     % SM14M12
          U28,     % SM14M12
```

```
                    U30,    % SM14M12
                    U31,    % SM14M12
                    U32,    % SM14M12
                    U33,    % SM14M12
                    U35,    % SM14M12
                    U36,    % SM14M12
                    U37,    % SM14M12
                    U38,    % SM14M12
                    U40,    % SM14M12
                    U41,    % SM14M12
                    U42,    % SM14M12
                    U43,    % SM14M12
                    U45,    % SM14M12
                    U46,    % SM14M12
                    U47,    % SM14M12
                    U48,    % SM14M12
                    U50,    % SM14M12
                    U52,    % SM14M12
                    U54,    % SM14M12
                    U56,    % SM14M12
                    U58,    % SM14M12
                    U60,    % SM14M12
                    U62,    % SM14M12
                    U64,    % SM14M12
                    U66,    % SM14M12
                    U68,    % SM14M12
                    U70,    % SM14M12
                    U72,    % SM14M12
                    U74,    % SM14M12
                    U76,    % SM14M12
                    U78,    % SM14M12
                    U80,    % SM14M12
                    U82;    % SM14M12
NETS

DT3_1      = J1/2A U2/2 U1/2 ;
DT4_1      = J1/4A U2/3 U1/3 ;
DT5_1      = J1/6A U2/21 U1/21 ;
DT6_1      = J1/8A U2/22 U1/22 ;
N00005     = J1/10A U1/23 ;
N00006     = J1/2B U2/23 ;
ST_1       = U1/1 J1/4B U2/1 ;
TIP1_2     = J2/B1 RV1/1 C235/2 ;
LA1_2      = U50/2 U49/19 C235/1 R1/2 ;
TIP9_2     = J2/B5 RV8/1 C22/2 ;
LA9_2      = U4/19 U48/2 C22/1 R20/2 ;
TIP17_2    = J2/B9 RV18/1 C13/2 ;
LA17_2     = U5/2 U51/19 C13/1 R11/2 ;
RING1_2    = RV1/2 C1/2 J2/A1 ;
TIP2_2     = RV2/1 C9/2 J2/D1 ;
RING2_2    = RV2/2 C241/2 J2/C1 ;
TIP3_2     = RV3/1 C247/2 J2/B2 ;
RING3_2    = RV3/2 C15/2 J2/A2 ;
TIP4_2     = RV4/1 C21/2 J2/D2 ;
RING4_2    = RV4/2 C253/2 J2/C2 ;
TIP5_2     = RV5/1 C236/2 J2/B3 ;
RING5_2    = RV5/2 C2/2 J2/A3 ;
RING9_2    = J2/A5 RV8/2 C254/2 ;
RING17_2   = J2/A9 RV18/2 C245/2 ;
TIP6_2     = RV9/1 C237/2 J2/D3 ;
RING6_2    = RV9/2 C3/2 J2/C3 ;
LB1_2      = U49/11 U50/13 R1/1 C1/1 ;
LB9_2      = U4/11 U48/13 R20/1 C254/1 ;
LB17_2     = U5/13 U51/11 R11/1 C245/1 ;
TIP7_2     = RV6/1 C10/2 J2/B4 ;
```

```
RING7_2   = RV6/2 C242/2 J2/A4 ;
TIP8_2    = RV7/1 C248/2 J2/D4 ;
RING8_2   = RV7/2 C16/2 J2/C4 ;
TIP10_2   = RV11/1 C249/2 J2/D5 ;
RING10_2  = RV11/2 C17/2 J2/C5 ;
LA2_2     = U50/3 U49/20 C9/1 R7/2 ;
LA10_2    = U4/20 U48/3 C249/1 R15/2 ;
TIP18_2   = J2/D9 RV19/1 C251/2 ;
LA18_2    = U5/3 U51/20 C251/1 R17/2 ;
TIP11_2   = RV13/1 C238/2 J2/B6 ;
RING11_2  = RV13/2 C4/2 J2/A6 ;
TIP12_2   = RV10/1 C11/2 J2/D6 ;
RING12_2  = RV10/2 C243/2 J2/C6 ;
TIP13_2   = RV15/1 C250/2 J2/B7 ;
RING13_2  = RV15/2 C18/2 J2/A7 ;
TIP14_2   = RV12/1 C23/2 J2/D7 ;
RING14_2  = RV12/2 C255/2 J2/C7 ;
TIP15_2   = RV14/1 C12/2 J2/B8 ;
RING15_2  = RV14/2 C244/2 J2/A8 ;
RING18_2  = J2/C9 RV19/2 C19/2 ;
TIP16_2   = RV17/1 C239/2 J2/D8 ;
RING16_2  = RV17/2 C5/2 J2/C8 ;
LB2_2     = U49/10 U50/12 R7/1 C241/1 ;
LB10_2    = U4/10 U48/12 R15/1 C17/1 ;
LB18_2    = U5/12 U51/10 R17/1 C19/1 ;
TIP19_2   = RV20/1 C25/2 J2/B10 ;
RING19_2  = RV20/2 C257/2 J2/A10 ;
TIP20_2   = RV16/1 C24/2 J2/D10 ;
RING20_2  = RV16/2 C256/2 J2/C10 ;
LA3_2     = U50/4 U49/21 C247/1 R13/2 ;
LA11_2    = U4/21 U48/4 C238/1 R4/2 ;
LA19_2    = U5/4 U51/21 C25/1 R23/2 ;
TIP21_2   = RV21/1 C240/2 J2/B11 ;
RING21_2  = RV21/2 C6/2 J2/A11 ;
TIP22_2   = RV22/1 C14/2 J2/D11 ;
RING22_2  = RV22/2 C246/2 J2/C11 ;
TIP23_2   = RV23/1 C252/2 J2/B12 ;
RING23_2  = RV23/2 C20/2 J2/A12 ;
TIP24_2   = RV24/1 C26/2 J2/D12 ;
RING24_2  = RV24/2 C258/2 J2/C12 ;
LB3_2     = U49/9 U50/11 R13/1 C15/1 ;
LB11_2    = U4/9 U48/11 R4/1 C4/1 ;
LB19_2    = U5/11 U51/9 R23/1 C257/1 ;
LA4_2     = U50/5 C21/1 R19/2 U49/22 ;
LA5_2     = C236/1 R2/2 U3/2 U49/23 ;
LA6_2     = C237/1 R3/2 U3/3 U49/24 ;
LA7_2     = C10/1 R8/2 U3/4 U49/25 ;
LA12_2    = U4/22 U48/5 C11/1 R9/2 ;
LA20_2    = U5/5 U51/22 C24/1 R22/2 ;
LA8_2     = C248/1 R14/2 U3/5 U49/26 ;
LB4_2     = R19/1 C253/1 U49/8 U50/10 ;
LB12_2    = U4/8 U48/10 R9/1 C243/1 ;
LB20_2    = U5/10 U51/8 R22/1 C256/1 ;
LB5_2     = R2/1 C2/1 U49/7 U3/13 ;
LA21_2    = U6/2 C240/1 R6/2 U51/23 ;
LB6_2     = R3/1 C3/1 U49/6 U3/12 ;
LA22_2    = U6/3 C14/1 R12/2 U51/24 ;
LB7_2     = R8/1 C242/1 U49/5 U3/11 ;
LA23_2    = U6/4 C252/1 R18/2 U51/25 ;
LB8_2     = R14/1 C16/1 U49/4 U3/10 ;
LA24_2    = U6/5 C26/1 R24/2 U51/26 ;
LA13_2    = U4/23 U7/2 C250/1 R16/2 ;
LB21_2    = U6/13 R6/1 C6/1 U51/7 ;
LB13_2    = U4/7 U7/13 R16/1 C18/1 ;
LB22_2    = U6/12 R12/1 C246/1 U51/6 ;
LB23_2    = U6/11 R18/1 C20/1 U51/5 ;
```

```
LB24_2    = R24/1 C258/1 U6/10 U51/4 ;
LA14_2    = U4/24 U7/3 C23/1 R21/2 ;
LB14_2    = U4/6 R21/1 C255/1 U7/12 ;
LA15_2    = C12/1 R10/2 U4/25 U7/4 ;
LB15_2    = R10/1 C244/1 U4/5 U7/11 ;
LA16_2    = C239/1 R5/2 U4/26 U7/5 ;
LB16_2    = R5/1 C5/1 U4/4 U7/10 ;
TIP1_3    = J4/B1 RV49/1 C283/2 ;
LA1_3     = U58/2 U57/19 C283/1 R49/2 ;
TIP9_3    = J4/B5 RV56/1 C74/2 ;
LA9_3     = U14/19 U56/2 C74/1 R68/2 ;
TIP17_3   = J4/B9 RV66/1 C65/2 ;
LA17_3    = U15/2 U59/19 C65/1 R59/2 ;
RING1_3   = RV49/2 C53/2 J4/A1 ;
TIP2_3    = RV50/1 C61/2 J4/D1 ;
RING2_3   = RV50/2 C289/2 J4/C1 ;
TIP3_3    = RV51/1 C295/2 J4/B2 ;
RING3_3   = RV51/2 C67/2 J4/A2 ;
TIP4_3    = RV52/1 C73/2 J4/D2 ;
RING4_3   = RV52/2 C301/2 J4/C2 ;
TIP5_3    = RV53/1 C284/2 J4/B3 ;
RING5_3   = RV53/2 C54/2 J4/A3 ;
RING9_3   = J4/A5 RV56/2 C302/2 ;
RING17_3  = J4/A9 RV66/2 C293/2 ;
TIP6_3    = RV57/1 C285/2 J4/D3 ;
RING6_3   = RV57/2 C55/2 J4/C3 ;
LB1_3     = U57/11 U58/13 R49/1 C53/1 ;
LB9_3     = U14/11 U56/13 R68/1 C302/1 ;
LB17_3    = U15/13 U59/11 R59/1 C293/1 ;
TIP7_3    = RV54/1 C62/2 J4/B4 ;
RING7_3   = RV54/2 C290/2 J4/A4 ;
TIP8_3    = RV55/1 C296/2 J4/D4 ;
RING8_3   = RV55/2 C68/2 J4/C4 ;
TIP10_3   = RV59/1 C297/2 J4/D5 ;
RING10_3  = RV59/2 C69/2 J4/C5 ;
LA2_3     = U58/3 U57/20 C61/1 R55/2 ;
LA10_3    = U14/20 U56/3 C297/1 R63/2 ;
TIP18_3   = J4/D9 RV67/1 C299/2 ;
LA18_3    = U15/3 U59/20 C299/1 R65/2 ;
TIP11_3   = RV61/1 C286/2 J4/B6 ;
RING11_3  = RV61/2 C56/2 J4/A6 ;
TIP12_3   = RV58/1 C63/2 J4/D6 ;
RING12_3  = RV58/2 C291/2 J4/C6 ;
TIP13_3   = RV63/1 C298/2 J4/B7 ;
RING13_3  = RV63/2 C70/2 J4/A7 ;
TIP14_3   = RV60/1 C75/2 J4/D7 ;
RING14_3  = RV60/2 C303/2 J4/C7 ;
TIP15_3   = RV62/1 C64/2 J4/B8 ;
RING15_3  = RV62/2 C292/2 J4/A8 ;
RING18_3  = J4/C9 RV67/2 C71/2 ;
TIP16_3   = RV65/1 C287/2 J4/D8 ;
RING16_3  = RV65/2 C57/2 J4/C8 ;
LB2_3     = U57/10 U58/12 R55/1 C289/1 ;
LB10_3    = U14/10 U56/12 R63/1 C69/1 ;
LB18_3    = U15/12 U59/10 R65/1 C71/1 ;
TIP19_3   = RV68/1 C77/2 J4/B10 ;
RING19_3  = RV68/2 C305/2 J4/A10 ;
TIP20_3   = RV64/1 C76/2 J4/D10 ;
RING20_3  = RV64/2 C304/2 J4/C10 ;
LA3_3     = U58/4 U57/21 C295/1 R61/2 ;
LA11_3    = U14/21 U56/4 C286/1 R52/2 ;
LA19_3    = U15/4 U59/21 C77/1 R71/2 ;
TIP21_3   = RV69/1 C288/2 J4/B11 ;
RING21_3  = RV69/2 C58/2 J4/A11 ;
TIP22_3   = RV70/1 C66/2 J4/D11 ;
RING22_3  = RV70/2 C294/2 J4/C11 ;
```

```
TIP23_3   = RV71/1 C300/2 J4/B12 ;
RING23_3  = RV71/2 C72/2 J4/A12 ;
TIP24_3   = RV72/1 C78/2 J4/D12 ;
RING24_3  = RV72/2 C306/2 J4/C12 ;
LB3_3     = U57/9 U58/11 R61/1 C67/1 ;
LB11_3    = U14/9 U56/11 R52/1 C56/1 ;
LB19_3    = U15/11 U59/9 R71/1 C305/1 ;
LA4_3     = U58/5 C73/1 R67/2 U57/22 ;
LA5_3     = C284/1 R50/2 U13/2 U57/23 ;
LA6_3     = C285/1 R51/2 U13/3 U57/24 ;
LA7_3     = C62/1 R56/2 U13/4 U57/25 ;
LA12_3    = U14/22 U56/5 C63/1 R57/2 ;
LA20_3    = U15/5 U59/22 C76/1 R70/2 ;
LA8_3     = C296/1 R62/2 U13/5 U57/26 ;
LB4_3     = R67/1 C301/1 U57/8 U58/10 ;
LB12_3    = U14/8 U56/10 R57/1 C291/1 ;
LB20_3    = U15/10 U59/8 R70/1 C304/1 ;
LB5_3     = R50/1 C54/1 U57/7 U13/13 ;
LA21_3    = U16/2 C288/1 R54/2 U59/23 ;
LB6_3     = R51/1 C55/1 U57/6 U13/12 ;
LA22_3    = U16/3 C66/1 R60/2 U59/24 ;
LB7_3     = R56/1 C290/1 U57/5 U13/11 ;
LA23_3    = U16/4 C300/1 R66/2 U59/25 ;
LB8_3     = R62/1 C68/1 U57/4 U13/10 ;
LA24_3    = U16/5 C78/1 R72/2 U59/26 ;
LA13_3    = U14/23 U17/2 C298/1 R64/2 ;
LB21_3    = U16/13 R54/1 C58/1 U59/7 ;
LB13_3    = U14/7 U17/13 R64/1 C70/1 ;
LB22_3    = U16/12 R60/1 C294/1 U59/6 ;
LB23_3    = U16/11 R66/1 C72/1 U59/5 ;
LB24_3    = R72/1 C306/1 U16/10 U59/4 ;
LA14_3    = U14/24 U17/3 C75/1 R69/2 ;
LB14_3    = U14/6 R69/1 C303/1 U17/12 ;
LA15_3    = C64/1 R58/2 U14/25 U17/4 ;
LB15_3    = R58/1 C292/1 U14/5 U17/11 ;
LA16_3    = C287/1 R53/2 U14/26 U17/5 ;
LB16_3    = R53/1 C57/1 U14/4 U17/10 ;
TIP1_4    = J5/B1 RV73/1 C307/2 ;
LA1_4     = U62/2 U61/19 C307/1 R73/2 ;
TIP9_4    = J5/B5 RV80/1 C100/2 ;
LA9_4     = U19/19 U60/2 C100/1 R92/2 ;
TIP17_4   = J5/B9 RV90/1 C91/2 ;
LA17_4    = U20/2 U63/19 C91/1 R83/2 ;
RING1_4   = RV73/2 C79/2 J5/A1 ;
TIP2_4    = RV74/1 C87/2 J5/D1 ;
RING2_4   = RV74/2 C313/2 J5/C1 ;
TIP3_4    = RV75/1 C319/2 J5/B2 ;
RING3_4   = RV75/2 C93/2 J5/A2 ;
TIP4_4    = RV76/1 C99/2 J5/D2 ;
RING4_4   = RV76/2 C325/2 J5/C2 ;
TIP5_4    = RV77/1 C308/2 J5/B3 ;
RING5_4   = RV77/2 C80/2 J5/A3 ;
RING9_4   = J5/A5 RV80/2 C326/2 ;
RING17_4  = J5/A9 RV90/2 C317/2 ;
TIP6_4    = RV81/1 C309/2 J5/D3 ;
RING6_4   = RV81/2 C81/2 J5/C3 ;
LB1_4     = U61/11 U62/13 R73/1 C79/1 ;
LB9_4     = U19/11 U60/13 R92/1 C326/1 ;
LB17_4    = U20/13 U63/11 R83/1 C317/1 ;
TIP7_4    = RV78/1 C88/2 J5/B4 ;
RING7_4   = RV78/2 C314/2 J5/A4 ;
TIP8_4    = RV79/1 C320/2 J5/D4 ;
RING8_4   = RV79/2 C94/2 J5/C4 ;
TIP10_4   = RV83/1 C321/2 J5/D5 ;
RING10_4  = RV83/2 C95/2 J5/C5 ;
LA2_4     = U62/3 U61/20 C87/1 R79/2 ;
```

```
LA10_4    = U19/20 U60/3 C321/1 R87/2 ;
TIP18_4   = J5/D9 RV91/1 C323/2 ;
LA18_4    = U20/3 U63/20 C323/1 R89/2 ;
TIP11_4   = RV85/1 C310/2 J5/B6 ;
RING11_4  = RV85/2 C82/2 J5/A6 ;
TIP12_4   = RV82/1 C89/2 J5/D6 ;
RING12_4  = RV82/2 C315/2 J5/C6 ;
TIP13_4   = RV87/1 C322/2 J5/B7 ;
RING13_4  = RV87/2 C96/2 J5/A7 ;
TIP14_4   = RV84/1 C101/2 J5/D7 ;
RING14_4  = RV84/2 C327/2 J5/C7 ;
TIP15_4   = RV86/1 C90/2 J5/B8 ;
RING15_4  = RV86/2 C316/2 J5/A8 ;
RING18_4  = J5/C9 RV91/2 C97/2 ;
TIP16_4   = RV89/1 C311/2 J5/D8 ;
RING16_4  = RV89/2 C83/2 J5/C8 ;
LB2_4     = U61/10 U62/12 R79/1 C313/1 ;
LB10_4    = U19/10 U60/12 R87/1 C95/1 ;
LB18_4    = U20/12 U63/10 R89/1 C97/1 ;
TIP19_4   = RV92/1 C103/2 J5/B10 ;
RING19_4  = RV92/2 C329/2 J5/A10 ;
TIP20_4   = RV88/1 C102/2 J5/D10 ;
RING20_4  = RV88/2 C328/2 J5/C10 ;
LA3_4     = U62/4 U61/21 C319/1 R85/2 ;
LA11_4    = U19/21 U60/4 C310/1 R76/2 ;
LA19_4    = U20/4 U63/21 C103/1 R95/2 ;
TIP21_4   = RV93/1 C312/2 J5/B11 ;
RING21_4  = RV93/2 C84/2 J5/A11 ;
TIP22_4   = RV94/1 C92/2 J5/D11 ;
RING22_4  = RV94/2 C318/2 J5/C11 ;
TIP23_4   = RV95/1 C324/2 J5/B12 ;
RING23_4  = RV95/2 C98/2 J5/A12 ;
TIP24_4   = RV96/1 C104/2 J5/D12 ;
RING24_4  = RV96/2 C330/2 J5/C12 ;
LB3_4     = U61/9 U62/11 R85/1 C93/1 ;
LB11_4    = U19/9 U60/11 R76/1 C82/1 ;
LB19_4    = U20/11 U63/9 R95/1 C329/1 ;
LA4_4     = U62/5 C99/1 R91/2 U61/22 ;
LA5_4     = C308/1 R74/2 U18/2 U61/23 ;
LA6_4     = C309/1 R75/2 U18/3 U61/24 ;
LA7_4     = C88/1 R80/2 U18/4 U61/25 ;
LA12_4    = U19/22 U60/5 C89/1 R81/2 ;
LA20_4    = U20/5 U63/22 C102/1 R94/2 ;
LA8_4     = C320/1 R86/2 U18/5 U61/26 ;
LB4_4     = R91/1 C325/1 U61/8 U62/10 ;
LB12_4    = U19/8 U60/10 R81/1 C315/1 ;
LB20_4    = U20/10 U63/8 R94/1 C328/1 ;
LB5_4     = R74/1 C80/1 U61/7 U18/13 ;
LA21_4    = U21/2 C312/1 R78/2 U63/23 ;
LB6_4     = R75/1 C81/1 U61/6 U18/12 ;
LA22_4    = U21/3 C92/1 R84/2 U63/24 ;
LB7_4     = R80/1 C314/1 U61/5 U18/11 ;
LA23_4    = U21/4 C324/1 R90/2 U63/25 ;
LB8_4     = R86/1 C94/1 U61/4 U18/10 ;
LA24_4    = U21/5 C104/1 R96/2 U63/26 ;
LA13_4    = U19/23 U22/2 C322/1 R88/2 ;
LB21_4    = U21/13 R78/1 C84/1 U63/7 ;
LB13_4    = U19/7 U22/13 R88/1 C96/1 ;
LB22_4    = U21/12 R84/1 C318/1 U63/6 ;
LB23_4    = U21/11 R90/1 C98/1 U63/5 ;
LB24_4    = R96/1 C330/1 U21/10 U63/4 ;
LA14_4    = U19/24 U22/3 C101/1 R93/2 ;
LB14_4    = U19/6 R93/1 C327/1 U22/12 ;
LA15_4    = C90/1 R82/2 U19/25 U22/4 ;
LB15_4    = R82/1 C316/1 U19/5 U22/11 ;
LA16_4    = C311/1 R77/2 U19/26 U22/5 ;
```

```
LB16_4    = R77/1 C83/1 U19/4 U22/10 ;
TIP1_6    = J7/B1 RV121/1 C355/2 ;
LA1_6     = U70/2 U69/19 C355/1 R121/2 ;
TIP9_6    = J7/B5 RV128/1 C152/2 ;
LA9_6     = U29/19 U68/2 C152/1 R140/2 ;
TIP17_6   = J7/B9 RV138/1 C143/2 ;
LA17_6    = U30/2 U71/19 C143/1 R131/2 ;
RING1_6   = RV121/2 C131/2 J7/A1 ;
TIP2_6    = RV122/1 C139/2 J7/D1 ;
RING2_6   = RV122/2 C361/2 J7/C1 ;
TIP3_6    = RV123/1 C367/2 J7/B2 ;
RING3_6   = RV123/2 C145/2 J7/A2 ;
TIP4_6    = RV124/1 C151/2 J7/D2 ;
RING4_6   = RV124/2 C373/2 J7/C2 ;
TIP5_6    = RV125/1 C356/2 J7/B3 ;
RING5_6   = RV125/2 C132/2 J7/A3 ;
RING9_6   = J7/A5 RV128/2 C374/2 ;
RING17_6  = J7/A9 RV138/2 C365/2 ;
TIP6_6    = RV129/1 C357/2 J7/D3 ;
RING6_6   = RV129/2 C133/2 J7/C3 ;
LB1_6     = U69/11 U70/13 R121/1 C131/1 ;
LB9_6     = U29/11 U68/13 R140/1 C374/1 ;
LB17_6    = U30/13 U71/11 R131/1 C365/1 ;
TIP7_6    = RV126/1 C140/2 J7/B4 ;
RING7_6   = RV126/2 C362/2 J7/A4 ;
TIP8_6    = RV127/1 C368/2 J7/D4 ;
RING8_6   = RV127/2 C146/2 J7/C4 ;
TIP10_6   = RV131/1 C369/2 J7/D5 ;
RING10_6  = RV131/2 C147/2 J7/C5 ;
LA2_6     = U70/3 U69/20 C139/1 R127/2 ;
LA10_6    = U29/20 U68/3 C369/1 R135/2 ;
TIP18_6   = J7/D9 RV139/1 C371/2 ;
LA18_6    = U30/3 U71/20 C371/1 R137/2 ;
TIP11_6   = RV133/1 C358/2 J7/B6 ;
RING11_6  = RV133/2 C134/2 J7/A6 ;
TIP12_6   = RV130/1 C141/2 J7/D6 ;
RING12_6  = RV130/2 C363/2 J7/C6 ;
TIP13_6   = RV135/1 C370/2 J7/B7 ;
RING13_6  = RV135/2 C148/2 J7/A7 ;
TIP14_6   = RV132/1 C153/2 J7/D7 ;
RING14_6  = RV132/2 C375/2 J7/C7 ;
TIP15_6   = RV134/1 C142/2 J7/B8 ;
RING15_6  = RV134/2 C364/2 J7/A8 ;
RING18_6  = J7/C9 RV139/2 C149/2 ;
TIP16_6   = RV137/1 C359/2 J7/D8 ;
RING16_6  = RV137/2 C135/2 J7/C8 ;
LB2_6     = U69/10 U70/12 R127/1 C361/1 ;
LB10_6    = U29/10 U68/12 R135/1 C147/1 ;
LB18_6    = U30/12 U71/10 R137/1 C149/1 ;
TIP19_6   = RV140/1 C155/2 J7/B10 ;
RING19_6  = RV140/2 C377/2 J7/A10 ;
TIP20_6   = RV136/1 C154/2 J7/D10 ;
RING20_6  = RV136/2 C376/2 J7/C10 ;
LA3_6     = U70/4 U69/21 C367/1 R133/2 ;
LA11_6    = U29/21 U68/4 C358/1 R124/2 ;
LA19_6    = U30/4 U71/21 C155/1 R143/2 ;
TIP21_6   = RV141/1 C360/2 J7/B11 ;
RING21_6  = RV141/2 C136/2 J7/A11 ;
TIP22_6   = RV142/1 C144/2 J7/D11 ;
RING22_6  = RV142/2 C366/2 J7/C11 ;
TIP23_6   = RV143/1 C372/2 J7/B12 ;
RING23_6  = RV143/2 C150/2 J7/A12 ;
TIP24_6   = RV144/1 C156/2 J7/D12 ;
RING24_6  = RV144/2 C378/2 J7/C12 ;
LB3_6     = U69/9 U70/11 R133/1 C145/1 ;
LB11_6    = U29/9 U68/11 R124/1 C134/1 ;
```

```
LB19_6    = U30/11 U71/9 R143/1 C377/1 ;
LA4_6     = U70/5 C151/1 R139/2 U69/22 ;
LA5_6     = C356/1 R122/2 U28/2 U69/23 ;
LA6_6     = C357/1 R123/2 U28/3 U69/24 ;
LA7_6     = C140/1 R128/2 U28/4 U69/25 ;
LA12_6    = U29/22 U68/5 C141/1 R129/2 ;
LA20_6    = U30/5 U71/22 C154/1 R142/2 ;
LA8_6     = C368/1 R134/2 U28/5 U69/26 ;
LB4_6     = R139/1 C373/1 U69/8 U70/10 ;
LB12_6    = U29/8 U68/10 R129/1 C363/1 ;
LB20_6    = U30/10 U71/8 R142/1 C376/1 ;
LB5_6     = R122/1 C132/1 U69/7 U28/13 ;
LA21_6    = U31/2 C360/1 R126/2 U71/23 ;
LB6_6     = R123/1 C133/1 U69/6 U28/12 ;
LA22_6    = U31/3 C144/1 R132/2 U71/24 ;
LB7_6     = R128/1 C362/1 U69/5 U28/11 ;
LA23_6    = U31/4 C372/1 R138/2 U71/25 ;
LB8_6     = R134/1 C146/1 U69/4 U28/10 ;
LA24_6    = U31/5 C156/1 R144/2 U71/26 ;
LA13_6    = U29/23 U32/2 C370/1 R136/2 ;
LB21_6    = U31/13 R126/1 C136/1 U71/7 ;
LB13_6    = U29/7 U32/13 R136/1 C148/1 ;
LB22_6    = U31/12 R132/1 C366/1 U71/6 ;
LB23_6    = U31/11 R138/1 C150/1 U71/5 ;
LB24_6    = R144/1 C378/1 U31/10 U71/4 ;
LA14_6    = U29/24 U32/3 C153/1 R141/2 ;
LB14_6    = U29/6 R141/1 C375/1 U32/12 ;
LA15_6    = C142/1 R130/2 U29/25 U32/4 ;
LB15_6    = R130/1 C364/1 U29/5 U32/11 ;
LA16_6    = C359/1 R125/2 U29/26 U32/5 ;
LB16_6    = R125/1 C135/1 U29/4 U32/10 ;
TIP1_5    = J6/B1 RV97/1 C331/2 ;
LA1_5     = U66/2 U65/19 C331/1 R97/2 ;
TIP9_5    = J6/B5 RV104/1 C126/2 ;
LA9_5     = U24/19 U64/2 C126/1 R116/2 ;
TIP17_5   = J6/B9 RV114/1 C117/2 ;
LA17_5    = U25/2 U67/19 C117/1 R107/2 ;
RING1_5   = RV97/2 C105/2 J6/A1 ;
TIP2_5    = RV98/1 C113/2 J6/D1 ;
RING2_5   = RV98/2 C337/2 J6/C1 ;
TIP3_5    = RV99/1 C343/2 J6/B2 ;
RING3_5   = RV99/2 C119/2 J6/A2 ;
TIP4_5    = RV100/1 C125/2 J6/D2 ;
RING4_5   = RV100/2 C349/2 J6/C2 ;
TIP5_5    = RV101/1 C332/2 J6/B3 ;
RING5_5   = RV101/2 C106/2 J6/A3 ;
RING9_5   = J6/A5 RV104/2 C350/2 ;
RING17_5  = J6/A9 RV114/2 C341/2 ;
TIP6_5    = RV105/1 C333/2 J6/D3 ;
RING6_5   = RV105/2 C107/2 J6/C3 ;
LB1_5     = U65/11 U66/13 R97/1 C105/1 ;
LB9_5     = U24/11 U64/13 R116/1 C350/1 ;
LB17_5    = U25/13 U67/11 R107/1 C341/1 ;
TIP7_5    = RV102/1 C114/2 J6/B4 ;
RING7_5   = RV102/2 C338/2 J6/A4 ;
TIP8_5    = RV103/1 C344/2 J6/D4 ;
RING8_5   = RV103/2 C120/2 J6/C4 ;
TIP10_5   = RV107/1 C345/2 J6/D5 ;
RING10_5  = RV107/2 C121/2 J6/C5 ;
LA2_5     = U66/3 U65/20 C113/1 R103/2 ;
LA10_5    = U24/20 U64/3 C345/1 R111/2 ;
TIP18_5   = J6/D9 RV115/1 C347/2 ;
LA18_5    = U25/3 U67/20 C347/1 R113/2 ;
TIP11_5   = RV109/1 C334/2 J6/B6 ;
RING11_5  = RV109/2 C108/2 J6/A6 ;
TIP12_5   = RV106/1 C115/2 J6/D6 ;
```

```
RING12_5   = RV106/2 C339/2 J6/C6 ;
TIP13_5    = RV111/1 C346/2 J6/B7 ;
RING13_5   = RV111/2 C122/2 J6/A7 ;
TIP14_5    = RV108/1 C127/2 J6/D7 ;
RING14_5   = RV108/2 C351/2 J6/C7 ;
TIP15_5    = RV110/1 C116/2 J6/B8 ;
RING15_5   = RV110/2 C340/2 J6/A8 ;
RING18_5   = J6/C9 RV115/2 C123/2 ;
TIP16_5    = RV113/1 C335/2 J6/D8 ;
RING16_5   = RV113/2 C109/2 J6/C8 ;
LB2_5      = U65/10 U66/12 R103/1 C337/1 ;
LB10_5     = U24/10 U64/12 R111/1 C121/1 ;
LB18_5     = U25/12 U67/10 R113/1 C123/1 ;
TIP19_5    = RV116/1 C129/2 J6/B10 ;
RING19_5   = RV116/2 C353/2 J6/A10 ;
TIP20_5    = RV112/1 C128/2 J6/D10 ;
RING20_5   = RV112/2 C352/2 J6/C10 ;
LA3_5      = U66/4 U65/21 C343/1 R109/2 ;
LA11_5     = U24/21 U64/4 C334/1 R100/2 ;
LA19_5     = U25/4 U67/21 C129/1 R119/2 ;
TIP21_5    = RV117/1 C336/2 J6/B11 ;
RING21_5   = RV117/2 C110/2 J6/A11 ;
TIP22_5    = RV118/1 C118/2 J6/D11 ;
RING22_5   = RV118/2 C342/2 J6/C11 ;
TIP23_5    = RV119/1 C348/2 J6/B12 ;
RING23_5   = RV119/2 C124/2 J6/A12 ;
TIP24_5    = RV120/1 C130/2 J6/D12 ;
RING24_5   = RV120/2 C354/2 J6/C12 ;
LB3_5      = U65/9 U66/11 R109/1 C119/1 ;
LB11_5     = U24/9 U64/11 R100/1 C108/1 ;
LB19_5     = U25/11 U67/9 R119/1 C353/1 ;
LA4_5      = U66/5 C125/1 R115/2 U65/22 ;
LA5_5      = C332/1 R98/2 U23/2 U65/23 ;
LA6_5      = C333/1 R99/2 U23/3 U65/24 ;
LA7_5      = C114/1 R104/2 U23/4 U65/25 ;
LA12_5     = U24/22 U64/5 C115/1 R105/2 ;
LA20_5     = U25/5 U67/22 C128/1 R118/2 ;
LA8_5      = C344/1 R110/2 U23/5 U65/26 ;
LB4_5      = R115/1 C349/1 U65/8 U66/10 ;
LB12_5     = U24/8 U64/10 R105/1 C339/1 ;
LB20_5     = U25/10 U67/8 R118/1 C352/1 ;
LB5_5      = R98/1 C106/1 U65/7 U23/13 ;
LA21_5     = U26/2 C336/1 R102/2 U67/23 ;
LB6_5      = R99/1 C107/1 U65/6 U23/12 ;
LA22_5     = U26/3 C118/1 R108/2 U67/24 ;
LB7_5      = R104/1 C338/1 U65/5 U23/11 ;
LA23_5     = U26/4 C348/1 R114/2 U67/25 ;
LB8_5      = R110/1 C120/1 U65/4 U23/10 ;
LA24_5     = U26/5 C130/1 R120/2 U67/26 ;
LA13_5     = U24/23 U27/2 C346/1 R112/2 ;
LB21_5     = U26/13 R102/1 C110/1 U67/7 ;
LB13_5     = U24/7 U27/13 R112/1 C122/1 ;
LB22_5     = U26/12 R108/1 C342/1 U67/6 ;
LB23_5     = U26/11 R114/1 C124/1 U67/5 ;
LB24_5     = R120/1 C354/1 U26/10 U67/4 ;
LA14_5     = U24/24 U27/3 C127/1 R117/2 ;
LB14_5     = U24/6 R117/1 C351/1 U27/12 ;
LA15_5     = C116/1 R106/2 U24/25 U27/4 ;
LB15_5     = R106/1 C340/1 U24/5 U27/11 ;
LA16_5     = C335/1 R101/2 U24/26 U27/5 ;
LB16_5     = R101/1 C109/1 U24/4 U27/10 ;
TIP1_7     = J8/B1 RV145/1 C379/2 ;
LA1_7      = U74/2 U73/19 C379/1 R145/2 ;
TIP9_7     = J8/B5 RV152/1 C178/2 ;
LA9_7      = U34/19 U72/2 C178/1 R164/2 ;
TIP17_7    = J8/B9 RV162/1 C169/2 ;
```

```
LA17_7    = U35/2 U75/19 C169/1 R155/2 ;
RING1_7   = RV145/2 C157/2 J8/A1 ;
TIP2_7    = RV146/1 C165/2 J8/D1 ;
RING2_7   = RV146/2 C385/2 J8/C1 ;
TIP3_7    = RV147/1 C391/2 J8/B2 ;
RING3_7   = RV147/2 C171/2 J8/A2 ;
TIP4_7    = RV148/1 C177/2 J8/D2 ;
RING4_7   = RV148/2 C397/2 J8/C2 ;
TIP5_7    = RV149/1 C380/2 J8/B3 ;
RING5_7   = RV149/2 C158/2 J8/A3 ;
RING9_7   = J8/A5 RV152/2 C398/2 ;
RING17_7  = J8/A9 RV162/2 C389/2 ;
TIP6_7    = RV153/1 C381/2 J8/D3 ;
RING6_7   = RV153/2 C159/2 J8/C3 ;
LB1_7     = U73/11 U74/13 R145/1 C157/1 ;
LB9_7     = U34/11 U72/13 R164/1 C398/1 ;
LB17_7    = U35/13 U75/11 R155/1 C389/1 ;
TIP7_7    = RV150/1 C166/2 J8/B4 ;
RING7_7   = RV150/2 C386/2 J8/A4 ;
TIP8_7    = RV151/1 C392/2 J8/D4 ;
RING8_7   = RV151/2 C172/2 J8/C4 ;
TIP10_7   = RV155/1 C393/2 J8/D5 ;
RING10_7  = RV155/2 C173/2 J8/C5 ;
LA2_7     = U74/3 U73/20 C165/1 R151/2 ;
LA10_7    = U34/20 U72/3 C393/1 R159/2 ;
TIP18_7   = J8/D9 RV163/1 C395/2 ;
LA18_7    = U35/3 U75/20 C395/1 R161/2 ;
TIP11_7   = RV157/1 C382/2 J8/B6 ;
RING11_7  = RV157/2 C160/2 J8/A6 ;
TIP12_7   = RV154/1 C167/2 J8/D6 ;
RING12_7  = RV154/2 C387/2 J8/C6 ;
TIP13_7   = RV159/1 C394/2 J8/B7 ;
RING13_7  = RV159/2 C174/2 J8/A7 ;
TIP14_7   = RV156/1 C179/2 J8/D7 ;
RING14_7  = RV156/2 C399/2 J8/C7 ;
TIP15_7   = RV158/1 C168/2 J8/B8 ;
RING15_7  = RV158/2 C388/2 J8/A8 ;
RING18_7  = J8/C9 RV163/2 C175/2 ;
TIP16_7   = RV161/1 C383/2 J8/D8 ;
RING16_7  = RV161/2 C161/2 J8/C8 ;
LB2_7     = U73/10 U74/12 R151/1 C385/1 ;
LB10_7    = U34/10 U72/12 R159/1 C173/1 ;
LB18_7    = U35/12 U75/10 R161/1 C175/1 ;
TIP19_7   = RV164/1 C181/2 J8/B10 ;
RING19_7  = RV164/2 C401/2 J8/A10 ;
TIP20_7   = RV160/1 C180/2 J8/D10 ;
RING20_7  = RV160/2 C400/2 J8/C10 ;
LA3_7     = U74/4 U73/21 C391/1 R157/2 ;
LA11_7    = U34/21 U72/4 C382/1 R148/2 ;
LA19_7    = U35/4 U75/21 C181/1 R167/2 ;
TIP21_7   = RV165/1 C384/2 J8/B11 ;
RING21_7  = RV165/2 C162/2 J8/A11 ;
TIP22_7   = RV166/1 C170/2 J8/D11 ;
RING22_7  = RV166/2 C390/2 J8/C11 ;
TIP23_7   = RV167/1 C396/2 J8/B12 ;
RING23_7  = RV167/2 C176/2 J8/A12 ;
TIP24_7   = RV168/1 C182/2 J8/D12 ;
RING24_7  = RV168/2 C402/2 J8/C12 ;
LB3_7     = U73/9 U74/11 R157/1 C171/1 ;
LB11_7    = U34/9 U72/11 R148/1 C160/1 ;
LB19_7    = U35/11 U75/9 R167/1 C401/1 ;
LA4_7     = U74/5 C177/1 R163/2 U73/22 ;
LA5_7     = C380/1 R146/2 U33/2 U73/23 ;
LA6_7     = C381/1 R147/2 U33/3 U73/24 ;
LA7_7     = C166/1 R152/2 U33/4 U73/25 ;
LA12_7    = U34/22 U72/5 C167/1 R153/2 ;
```

```
LA20_7    = U35/5 U75/22 C180/1 R166/2 ;
LA8_7     = C392/1 R158/2 U33/5 U73/26 ;
LB4_7     = R163/1 C397/1 U73/8 U74/10 ;
LB12_7    = U34/8 U72/10 R153/1 C387/1 ;
LB20_7    = U35/10 U75/8 R166/1 C400/1 ;
LB5_7     = R146/1 C158/1 U73/7 U33/13 ;
LA21_7    = U36/2 C384/1 R150/2 U75/23 ;
LB6_7     = R147/1 C159/1 U73/6 U33/12 ;
LA22_7    = U36/3 C170/1 R156/2 U75/24 ;
LB7_7     = R152/1 C386/1 U73/5 U33/11 ;
LA23_7    = U36/4 C396/1 R162/2 U75/25 ;
LB8_7     = R158/1 C172/1 U73/4 U33/10 ;
LA24_7    = U36/5 C182/1 R168/2 U75/26 ;
LA13_7    = U34/23 U37/2 C394/1 R160/2 ;
LB21_7    = U36/13 R150/1 C162/1 U75/7 ;
LB13_7    = U34/7 U37/13 R160/1 C174/1 ;
LB22_7    = U36/12 R156/1 C390/1 U75/6 ;
LB23_7    = U36/11 R162/1 C176/1 U75/5 ;
LB24_7    = R168/1 C402/1 U36/10 U75/4 ;
LA14_7    = U34/24 U37/3 C179/1 R165/2 ;
LB14_7    = U34/6 R165/1 C399/1 U37/12 ;
LA15_7    = C168/1 R154/2 U34/25 U37/4 ;
LB15_7    = R154/1 C388/1 U34/5 U37/11 ;
LA16_7    = C383/1 R149/2 U34/26 U37/5 ;
LB16_7    = R149/1 C161/1 U34/4 U37/10 ;
TIP1_8    = J9/B1 RV169/1 C403/2 ;
LA1_8     = U78/2 U77/19 C403/1 R169/2 ;
TIP9_8    = J9/B5 RV176/1 C204/2 ;
LA9_8     = U39/19 U76/2 C204/1 R188/2 ;
TIP17_8   = J9/B9 RV186/1 C195/2 ;
LA17_8    = U40/2 U79/19 C195/1 R179/2 ;
RING1_8   = RV169/2 C183/2 J9/A1 ;
TIP2_8    = RV170/1 C191/2 J9/D1 ;
RING2_8   = RV170/2 C409/2 J9/C1 ;
TIP3_8    = RV171/1 C415/2 J9/B2 ;
RING3_8   = RV171/2 C197/2 J9/A2 ;
TIP4_8    = RV172/1 C203/2 J9/D2 ;
RING4_8   = RV172/2 C421/2 J9/C2 ;
TIP5_8    = RV173/1 C404/2 J9/B3 ;
RING5_8   = RV173/2 C184/2 J9/A3 ;
RING9_8   = J9/A5 RV176/2 C422/2 ;
RING17_8  = J9/A9 RV186/2 C413/2 ;
TIP6_8    = RV177/1 C405/2 J9/D3 ;
RING6_8   = RV177/2 C185/2 J9/C3 ;
LB1_8     = U77/11 U78/13 R169/1 C183/1 ;
LB9_8     = U39/11 U76/13 R188/1 C422/1 ;
LB17_8    = U40/13 U79/11 R179/1 C413/1 ;
TIP7_8    = RV174/1 C192/2 J9/B4 ;
RING7_8   = RV174/2 C410/2 J9/A4 ;
TIP8_8    = RV175/1 C416/2 J9/D4 ;
RING8_8   = RV175/2 C198/2 J9/C4 ;
TIP10_8   = RV179/1 C417/2 J9/D5 ;
RING10_8  = RV179/2 C199/2 J9/C5 ;
LA2_8     = U78/3 U77/20 C191/1 R175/2 ;
LA10_8    = U39/20 U76/3 C417/1 R183/2 ;
TIP18_8   = J9/D9 RV187/1 C419/2 ;
LA18_8    = U40/3 U79/20 C419/1 R185/2 ;
TIP11_8   = RV181/1 C406/2 J9/B6 ;
RING11_8  = RV181/2 C186/2 J9/A6 ;
TIP12_8   = RV178/1 C193/2 J9/D6 ;
RING12_8  = RV178/2 C411/2 J9/C6 ;
TIP13_8   = RV183/1 C418/2 J9/B7 ;
RING13_8  = RV183/2 C200/2 J9/A7 ;
TIP14_8   = RV180/1 C205/2 J9/D7 ;
RING14_8  = RV180/2 C423/2 J9/C7 ;
TIP15_8   = RV182/1 C194/2 J9/B8 ;
```

```
RING15_8   = RV182/2 C412/2 J9/A8    ;
RING18_8   = J9/C9 RV187/2 C201/2    ;
TIP16_8    = RV185/1 C407/2 J9/D8    ;
RING16_8   = RV185/2 C187/2 J9/C8    ;
LB2_8      = U77/10 U78/12 R175/1 C409/1 ;
LB10_8     = U39/10 U76/12 R183/1 C199/1 ;
LB18_8     = U40/12 U79/10 R185/1 C201/1 ;
TIP19_8    = RV188/1 C207/2 J9/B10   ;
RING19_8   = RV188/2 C425/2 J9/A10   ;
TIP20_8    = RV184/1 C206/2 J9/D10   ;
RING20_8   = RV184/2 C424/2 J9/C10   ;
LA3_8      = U78/4 U77/21 C415/1 R181/2 ;
LA11_8     = U39/21 U76/4 C406/1 R172/2 ;
LA19_8     = U40/4 U79/21 C207/1 R191/2 ;
TIP21_8    = RV189/1 C408/2 J9/B11   ;
RING21_8   = RV189/2 C188/2 J9/A11   ;
TIP22_8    = RV190/1 C196/2 J9/D11   ;
RING22_8   = RV190/2 C414/2 J9/C11   ;
TIP23_8    = RV191/1 C420/2 J9/B12   ;
RING23_8   = RV191/2 C202/2 J9/A12   ;
TIP24_8    = RV192/1 C208/2 J9/D12   ;
RING24_8   = RV192/2 C426/2 J9/C12   ;
LB3_8      = U77/9 U78/11 R181/1 C197/1 ;
LB11_8     = U39/9 U76/11 R172/1 C186/1 ;
LB19_8     = U40/11 U79/9 R191/1 C425/1 ;
LA4_8      = U78/5 C203/1 R187/2 U77/22 ;
LA5_8      = C404/1 R170/2 U38/2 U77/23 ;
LA6_8      = C405/1 R171/2 U38/3 U77/24 ;
LA7_8      = C192/1 R176/2 U38/4 U77/25 ;
LA12_8     = U39/22 U76/5 C193/1 R177/2 ;
LA20_8     = U40/5 U79/22 C206/1 R190/2 ;
LA8_8      = C416/1 R182/2 U38/5 U77/26 ;
LB4_8      = R187/1 C421/1 U77/8 U78/10 ;
LB12_8     = U39/8 U76/10 R177/1 C411/1 ;
LB20_8     = U40/10 U79/8 R190/1 C424/1 ;
LB5_8      = R170/1 C184/1 U77/7 U38/13 ;
LA21_8     = U41/2 C408/1 R174/2 U79/23 ;
LB6_8      = R171/1 C185/1 U77/6 U38/12 ;
LA22_8     = U41/3 C196/1 R180/2 U79/24 ;
LB7_8      = R176/1 C410/1 U77/5 U38/11 ;
LA23_8     = U41/4 C420/1 R186/2 U79/25 ;
LB8_8      = R182/1 C198/1 U77/4 U38/10 ;
LA24_8     = U41/5 C208/1 R192/2 U79/26 ;
LA13_8     = U39/23 U42/2 C418/1 R184/2 ;
LB21_8     = U41/13 R174/1 C188/1 U79/7 ;
LB13_8     = U39/7 U42/13 R184/1 C200/1 ;
LB22_8     = U41/12 R180/1 C414/1 U79/6 ;
LB23_8     = U41/11 R186/1 C202/1 U79/5 ;
LB24_8     = R192/1 C426/1 U41/10 U79/4 ;
LA14_8     = U39/24 U42/3 C205/1 R189/2 ;
LB14_8     = U39/6 R189/1 C423/1 U42/12 ;
LA15_8     = C194/1 R178/2 U39/25 U42/4 ;
LB15_8     = R178/1 C412/1 U39/5 U42/11 ;
LA16_8     = C407/1 R173/2 U39/26 U42/5 ;
LB16_8     = R173/1 C187/1 U39/4 U42/10 ;
TIP1_9     = J10/B1 RV193/1 C427/2   ;
LA1_9      = U82/2 U81/19 C427/1 R193/2 ;
TIP9_9     = J10/B5 RV200/1 C230/2   ;
LA9_9      = U44/19 U80/2 C230/1 R212/2 ;
TIP17_9    = J10/B9 RV210/1 C221/2   ;
LA17_9     = U45/2 U83/19 C221/1 R203/2 ;
RING1_9    = RV193/2 C209/2 J10/A1   ;
TIP2_9     = RV194/1 C217/2 J10/D1   ;
RING2_9    = RV194/2 C433/2 J10/C1   ;
TIP3_9     = RV195/1 C439/2 J10/B2   ;
RING3_9    = RV195/2 C223/2 J10/A2   ;
```

```
TIP4_9    = RV196/1 C229/2 J10/D2 ;
RING4_9   = RV196/2 C445/2 J10/C2 ;
TIP5_9    = RV197/1 C428/2 J10/B3 ;
RING5_9   = RV197/2 C210/2 J10/A3 ;
RING9_9   = J10/A5 RV200/2 C446/2 ;
RING17_9  = J10/A9 RV210/2 C437/2 ;
TIP6_9    = RV201/1 C429/2 J10/D3 ;
RING6_9   = RV201/2 C211/2 J10/C3 ;
LB1_9     = U81/11 U82/13 R193/1 C209/1 ;
LB9_9     = U44/11 U80/13 R212/1 C446/1 ;
LB17_9    = U45/13 U83/11 R203/1 C437/1 ;
TIP7_9    = RV198/1 C218/2 J10/B4 ;
RING7_9   = RV198/2 C434/2 J10/A4 ;
TIP8_9    = RV199/1 C440/2 J10/D4 ;
RING8_9   = RV199/2 C224/2 J10/C4 ;
TIP10_9   = RV203/1 C441/2 J10/D5 ;
RING10_9  = RV203/2 C225/2 J10/C5 ;
LA2_9     = U82/3 U81/20 C217/1 R199/2 ;
LA10_9    = U44/20 U80/3 C441/1 R207/2 ;
TIP18_9   = J10/D9 RV211/1 C443/2 ;
LA18_9    = U45/3 U83/20 C443/1 R209/2 ;
TIP11_9   = RV205/1 C430/2 J10/B6 ;
RING11_9  = RV205/2 C212/2 J10/A6 ;
TIP12_9   = RV202/1 C219/2 J10/D6 ;
RING12_9  = RV202/2 C435/2 J10/C6 ;
TIP13_9   = RV207/1 C442/2 J10/B7 ;
RING13_9  = RV207/2 C226/2 J10/A7 ;
TIP14_9   = RV204/1 C231/2 J10/D7 ;
RING14_9  = RV204/2 C447/2 J10/C7 ;
TIP15_9   = RV206/1 C220/2 J10/B8 ;
RING15_9  = RV206/2 C436/2 J10/A8 ;
RING18_9  = J10/C9 RV211/2 C227/2 ;
TIP16_9   = RV209/1 C431/2 J10/D8 ;
RING16_9  = RV209/2 C213/2 J10/C8 ;
LB2_9     = U81/10 U82/12 R199/1 C433/1 ;
LB10_9    = U44/10 U80/12 R207/1 C225/1 ;
LB18_9    = U45/12 U83/10 R209/1 C227/1 ;
TIP19_9   = RV212/1 C233/2 J10/B10 ;
RING19_9  = RV212/2 C449/2 J10/A10 ;
TIP20_9   = RV208/1 C232/2 J10/D10 ;
RING20_9  = RV208/2 C448/2 J10/C10 ;
LA3_9     = U82/4 U81/21 C439/1 R205/2 ;
LA11_9    = U44/21 U80/4 C430/1 R196/2 ;
LA19_9    = U45/4 U83/21 C233/1 R215/2 ;
TIP21_9   = RV213/1 C432/2 J10/B11 ;
RING21_9  = RV213/2 C214/2 J10/A11 ;
TIP22_9   = RV214/1 C222/2 J10/D11 ;
RING22_9  = RV214/2 C438/2 J10/C11 ;
TIP23_9   = RV215/1 C444/2 J10/B12 ;
RING23_9  = RV215/2 C228/2 J10/A12 ;
TIP24_9   = RV216/1 C234/2 J10/D12 ;
RING24_9  = RV216/2 C450/2 J10/C12 ;
LB3_9     = U81/9 U82/11 R205/1 C223/1 ;
LB11_9    = U44/9 U80/11 R196/1 C212/1 ;
LB19_9    = U45/11 U83/9 R215/1 C449/1 ;
LA4_9     = U82/5 C229/1 R211/2 U81/22 ;
LA5_9     = C428/1 R194/2 U43/2 U81/23 ;
LA6_9     = C429/1 R195/2 U43/3 U81/24 ;
LA7_9     = C218/1 R200/2 U43/4 U81/25 ;
LA12_9    = U44/22 U80/5 C219/1 R201/2 ;
LA20_9    = U45/5 U83/22 C232/1 R214/2 ;
LA8_9     = C440/1 R206/2 U43/5 U81/26 ;
LB4_9     = R211/1 C445/1 U81/8 U82/10 ;
LB12_9    = U44/8 U80/10 R201/1 C435/1 ;
LB20_9    = U45/10 U83/8 R214/1 C448/1 ;
LB5_9     = R194/1 C210/1 U81/7 U43/13 ;
```

```
LA21_9    = U46/2 C432/1 R198/2 U83/23 ;
LB6_9     = R195/1 C211/1 U81/6 U43/12 ;
LA22_9    = U46/3 C222/1 R204/2 U83/24 ;
LB7_9     = R200/1 C434/1 U81/5 U43/11 ;
LA23_9    = U46/4 C444/1 R210/2 U83/25 ;
LB8_9     = R206/1 C224/1 U81/4 U43/10 ;
LA24_9    = U46/5 C234/1 R216/2 U83/26 ;
LA13_9    = U44/23 U47/2 C442/1 R208/2 ;
LB21_9    = U46/13 R198/1 C214/1 U83/7 ;
LB13_9    = U44/7 U47/13 R208/1 C226/1 ;
LB22_9    = U46/12 R204/1 C438/1 U83/6 ;
LB23_9    = U46/11 R210/1 C228/1 U83/5 ;
LB24_9    = R216/1 C450/1 U46/10 U83/4 ;
LA14_9    = U44/24 U47/3 C231/1 R213/2 ;
LB14_9    = U44/6 R213/1 C447/1 U47/12 ;
LA15_9    = C220/1 R202/2 U44/25 U47/4 ;
LB15_9    = R202/1 C436/1 U44/5 U47/11 ;
LA16_9    = C431/1 R197/2 U44/26 U47/5 ;
LB16_9    = R197/1 C213/1 U44/4 U47/10 ;
TIP1_10   = J3/B1 RV25/1 C259/2 ;
LA1_10    = U54/2 U53/19 C259/1 R25/2 ;
TIP9_10   = J3/B5 RV32/1 C48/2 ;
LA9_10    = U9/19 U52/2 C48/1 R44/2 ;
TIP17_10  = J3/B9 RV42/1 C39/2 ;
LA17_10   = U10/2 U55/19 C39/1 R35/2 ;
RING1_10  = RV25/2 C27/2 J3/A1 ;
TIP2_10   = RV26/1 C35/2 J3/D1 ;
RING2_10  = RV26/2 C265/2 J3/C1 ;
TIP3_10   = RV27/1 C271/2 J3/B2 ;
RING3_10  = RV27/2 C41/2 J3/A2 ;
TIP4_10   = RV28/1 C47/2 J3/D2 ;
RING4_10  = RV28/2 C277/2 J3/C2 ;
TIP5_10   = RV29/1 C260/2 J3/B3 ;
RING5_10  = RV29/2 C28/2 J3/A3 ;
RING9_10  = J3/A5 RV32/2 C278/2 ;
N00792    = J3/A9 RV42/2 C269/2 ;
TIP6_10   = RV33/1 C261/2 J3/D3 ;
RING6_10  = RV33/2 C29/2 J3/C3 ;
LB1_10    = U53/11 U54/13 R25/1 C27/1 ;
LB9_10    = U9/11 U52/13 R44/1 C278/1 ;
LB17_10   = U10/13 U55/11 R35/1 C269/1 ;
TIP7_10   = RV30/1 C36/2 J3/B4 ;
RING7_10  = RV30/2 C266/2 J3/A4 ;
TIP8_10   = RV31/1 C272/2 J3/D4 ;
RING8_10  = RV31/2 C42/2 J3/C4 ;
TIP10_10  = RV35/1 C273/2 J3/D5 ;
N00803    = RV35/2 C43/2 J3/C5 ;
LA2_10    = U54/3 U53/20 C35/1 R31/2 ;
LA10_10   = U9/20 U52/3 C273/1 R39/2 ;
TIP18_10  = J3/D9 RV43/1 C275/2 ;
LA18_10   = U10/3 U55/20 C275/1 R41/2 ;
TIP11_10  = RV37/1 C262/2 J3/B6 ;
N00809    = RV37/2 C30/2 J3/A6 ;
TIP12_10  = RV34/1 C37/2 J3/D6 ;
N00811    = RV34/2 C267/2 J3/C6 ;
TIP13_10  = RV39/1 C274/2 J3/B7 ;
N00813    = RV39/2 C44/2 J3/A7 ;
TIP14_10  = RV36/1 C49/2 J3/D7 ;
N00815    = RV36/2 C279/2 J3/C7 ;
TIP15_10  = RV38/1 C38/2 J3/B8 ;
N00817    = RV38/2 C268/2 J3/A8 ;
N00818    = J3/C9 RV43/2 C45/2 ;
TIP16_10  = RV41/1 C263/2 J3/D8 ;
N00820    = RV41/2 C31/2 J3/C8 ;
LB2_10    = U53/10 U54/12 R31/1 C265/1 ;
LB10_10   = U9/10 U52/12 R39/1 C43/1 ;
```

```
LB18_10   = U10/12 U55/10 R41/1 C45/1 ;
TIP19_10  = RV44/1 C51/2 J3/B10 ;
N00825    = RV44/2 C281/2 J3/A10 ;
TIP20_10  = RV40/1 C50/2 J3/D10 ;
N00827    = RV40/2 C280/2 J3/C10 ;
LA3_10    = U54/4 U53/21 C271/1 R37/2 ;
LA11_10   = U9/21 U52/4 C262/1 R28/2 ;
LA19_10   = U10/4 U55/21 C51/1 R47/2 ;
TIP21_10  = RV45/1 C264/2 J3/B11 ;
N00832    = RV45/2 C32/2 J3/A11 ;
TIP22_10  = RV46/1 C40/2 J3/D11 ;
N00834    = RV46/2 C270/2 J3/C11 ;
TIP23_10  = RV47/1 C276/2 J3/B12 ;
N00836    = RV47/2 C46/2 J3/A12 ;
TIP24_10  = RV48/1 C52/2 J3/D12 ;
N00838    = RV48/2 C282/2 J3/C12 ;
LB3_10    = U53/9 U54/11 R37/1 C41/1 ;
LB11_10   = U9/9 U52/11 R28/1 C30/1 ;
LB19_10   = U10/11 U55/9 R47/1 C281/1 ;
LA4_10    = U54/5 C47/1 R43/2 U53/22 ;
LA5_10    = C260/1 R26/2 U8/2 U53/23 ;
LA6_10    = C261/1 R27/2 U8/3 U53/24 ;
LA7_10    = C36/1 R32/2 U8/4 U53/25 ;
LA12_10   = U9/22 U52/5 C37/1 R33/2 ;
LA20_10   = U10/5 U55/22 C50/1 R46/2 ;
LA8_10    = C272/1 R38/2 U8/5 U53/26 ;
LB4_10    = R43/1 C277/1 U53/8 U54/10 ;
LB12_10   = U9/8 U52/10 R33/1 C267/1 ;
LB20_10   = U10/10 U55/8 R46/1 C280/1 ;
LB5_10    = R26/1 C28/1 U53/7 U8/13 ;
LA21_10   = U11/2 C264/1 R30/2 U55/23 ;
LB6_10    = R27/1 C29/1 U53/6 U8/12 ;
LA22_10   = U11/3 C40/1 R36/2 U55/24 ;
LB7_10    = R32/1 C266/1 U53/5 U8/11 ;
LA23_10   = U11/4 C276/1 R42/2 U55/25 ;
LB8_10    = R38/1 C42/1 U53/4 U8/10 ;
LA24_10   = U11/5 C52/1 R48/2 U55/26 ;
LA13_10   = U9/23 U12/2 C274/1 R40/2 ;
LB21_10   = U11/13 R30/1 C32/1 U55/7 ;
LB13_10   = U9/7 U12/13 R40/1 C44/1 ;
LB22_10   = U11/12 R36/1 C270/1 U55/6 ;
LB23_10   = U11/11 R42/1 C46/1 U55/5 ;
LB24_10   = R48/1 C282/1 U11/10 U55/4 ;
LA14_10   = U9/24 U12/3 C49/1 R45/2 ;
LB14_10   = U9/6 R45/1 C279/1 U12/12 ;
LA15_10   = C38/1 R34/2 U9/25 U12/4 ;
LB15_10   = R34/1 C268/1 U9/5 U12/11 ;
LA16_10   = C263/1 R29/2 U9/26 U12/5 ;
LB16_10   = R29/1 C31/1 U9/4 U12/10 ;
DT0_1     = J1/1A U4/17 U51/17 U49/17
            U14/17 U59/17 U57/17 U19/17
            U63/17 U61/17 U29/17 U71/17
            U69/17 U24/17 U67/17 U65/17
            U34/17 U75/17 U73/17 U39/17
            U79/17 U77/17 U44/17 U83/17
            U81/17 U9/17 U55/17 U53/17 ;
DT1_1     = J1/3A U4/16 U51/16 U49/16
            U14/16 U59/16 U57/16 U19/16
            U63/16 U61/16 U29/16 U71/16
            U69/16 U24/16 U67/16 U65/16
            U34/16 U75/16 U73/16 U39/16
            U79/16 U77/16 U44/16 U83/16
            U81/16 U9/16 U55/16 U53/16 ;
DT2_1     = J1/5A U4/15 U51/15 U49/15
            U14/15 U59/15 U57/15 U19/15
            U63/15 U61/15 U29/15 U71/15
```

```
                    U69/15  U24/15  U67/15  U65/15
                    U34/15  U75/15  U73/15  U39/15
                    U79/15  U77/15  U44/15  U83/15
                    U81/15  U9/15   U55/15  U53/15 ;
EN1_1    = U1/11 U49/18 ;
EN4_1    = U1/8 U53/18 ;
EN7_1    = U1/5 U57/18 ;
EN10_1   = U1/17 U61/18 ;
EN13_1   = U1/14 U65/18 ;
EN16_1   = U2/11 U69/18 ;
EN19_1   = U2/8 U73/18 ;
EN22_1   = U2/5 U77/18 ;
EN25_1   = U2/17 U81/18 ;
EN2_1    = U1/9 U4/18 ;
EN5_1    = U1/7 U9/18 ;
EN8_1    = U1/4 U14/18 ;
EN11_1   = U1/20 U19/18 ;
EN14_1   = U1/13 U24/18 ;
EN17_1   = U2/9 U29/18 ;
EN20_1   = U2/7 U34/18 ;
EN23_1   = U2/4 U39/18 ;
EN26_1   = U2/20 U44/18 ;
EN3_1    = U1/10 U51/18 ;
EN6_1    = U1/6 U55/18 ;
EN9_1    = U1/18 U59/18 ;
EN12_1   = U1/19 U63/18 ;
EN15_1   = U1/16 U67/18 ;
EN18_1   = U2/10 U71/18 ;
EN21_1   = U2/6 U75/18 ;
EN24_1   = U2/18 U79/18 ;
EN27_1   = U2/19 U83/18 ;
LA_1     = J1/7A U49/28 U51/28 U4/28
           U57/28 U59/28 U14/28 U61/28
           U63/28 U19/28 U69/28 U71/28
           U29/28 U65/28 U67/28 U24/28
           U73/28 U75/28 U34/28 U77/28
           U79/28 U39/28 U81/28 U83/28
           U44/28 U53/28 U55/28 U9/28 ;
LB_1     = J1/9A U51/2 U49/2 U4/2
           U59/2 U57/2 U14/2 U63/2
           U61/2 U19/2 U71/2 U69/2
           U29/2 U67/2 U65/2 U24/2
           U75/2 U73/2 U34/2 U79/2
           U77/2 U39/2 U83/2 U81/2
           U44/2 U55/2 U53/2 U9/2 ;
VDD      = J1/3B C8/1 CL6/1 CL4/1
           U4/1 U51/1 U49/1 C60/1
           CL14/1 CL12/1 U14/1 U59/1
           U57/1 C86/1 CL18/1 CL16/1
           U19/1 U63/1 U61/1 C138/1
           CL26/1 CL24/1 U29/1 U71/1
           U69/1 C112/1 CL22/1 CL20/1
           U24/1 U67/1 U65/1 C164/1
           CL30/1 CL28/1 U34/1 U75/1
           U73/1 C190/1 CL34/1 CL32/1
           U39/1 U79/1 U77/1 C216/1
           CL38/1 CL36/1 U44/1 U83/1
           U81/1 C34/1 CL10/1 CL8/1
           U9/1 U55/1 U53/1 ;
VSS      = J1/5B C7/1 CL5/1 CL3/1
           U4/27 U51/27 U49/27 C59/1
           CL13/1 CL11/1 U14/27 U59/27
           U57/27 C85/1 CL17/1 CL15/1
           U19/27 U63/27 U61/27 C137/1
           CL25/1 CL23/1 U29/27 U71/27
           U69/27 C111/1 CL21/1 CL19/1
```

```
                    U24/27 U67/27 U65/27 C163/1
                    CL29/1 CL27/1 U34/27 U75/27
                    U73/27 C189/1 CL33/1 CL31/1
                    U39/27 U79/27 U77/27 C215/1
                    CL37/1 CL35/1 U44/27 U83/27
                    U81/27 C33/1 CL9/1 CL7/1
                    U9/27 U55/27 U53/27 ;
GND              = CL1/2 CL2/2 U2/12 U1/12
                    J1/7B C7/2 CL5/2 CL3/2
                    C8/2 CL6/2 CL4/2 U4/12
                    U6/8 U6/7 U6/14 U6/1
                    U5/8 U5/7 U5/14 U5/1
                    U51/12 U7/8 U7/7 U7/14
                    U7/1 U49/12 U48/8 U48/7
                    U48/14 U48/1 U3/8 U3/7
                    U3/14 U3/1 U50/8 U50/7
                    U50/14 U50/1 C59/2 CL13/2
                    CL11/2 C60/2 CL14/2 CL12/2
                    U14/12 U16/8 U16/7 U16/14
                    U16/1 U15/8 U15/7 U15/14
                    U15/1 U59/12 U17/8 U17/7
                    U17/14 U17/1 U57/12 U56/8
                    U56/7 U56/14 U56/1 U13/8
                    U13/7 U13/14 U13/1 U58/8
                    U58/7 U58/14 U58/1 C85/2
                    CL17/2 CL15/2 C86/2 CL18/2
                    CL16/2 U19/12 U21/8 U21/7
                    U21/14 U21/1 U20/8 U20/7
                    U20/14 U20/1 U63/12 U22/8
                    U22/7 U22/14 U22/1 U61/12
                    U60/8 U60/7 U60/14 U60/1
                    U18/8 U18/7 U18/14 U18/1
                    U62/8 U62/7 U62/14 U62/1
                    C137/2 CL25/2 CL23/2 C138/2
                    CL26/2 CL24/2 U29/12 U31/8
                    U31/7 U31/14 U31/1 U30/8
                    U30/7 U30/14 U30/1 U71/12
                    U32/8 U32/7 U32/14 U32/1
                    U69/12 U68/8 U68/7 U68/14
                    U68/1 U28/8 U28/7 U28/14
                    U28/1 U70/8 U70/7 U70/14
                    U70/1 C111/2 CL21/2 CL19/2
                    C112/2 CL22/2 CL20/2 U24/12
                    U26/8 U26/7 U26/14 U26/1
                    U25/8 U25/7 U25/14 U25/1
                    U67/12 U27/8 U27/7 U27/14
                    U27/1 U65/12 U64/8 U64/7
                    U64/14 U64/1 U23/8 U23/7
                    U23/14 U23/1 U66/8 U66/7
                    U66/14 U66/1 C163/2 CL29/2
                    CL27/2 C164/2 CL30/2 CL28/2
                    U34/12 U36/8 U36/7 U36/14
                    U36/1 U35/8 U35/7 U35/14
                    U35/1 U75/12 U37/8 U37/7
                    U37/14 U37/1 U73/12 U72/8
                    U72/7 U72/14 U72/1 U33/8
                    U33/7 U33/14 U33/1 U74/8
                    U74/7 U74/14 U74/1 C189/2
                    CL33/2 CL31/2 C190/2 CL34/2
                    CL32/2 U39/12 U41/8 U41/7
                    U41/14 U41/1 U40/8 U40/7
                    U40/14 U40/1 U79/12 U42/8
                    U42/7 U42/14 U42/1 U77/12
                    U76/8 U76/7 U76/14 U76/1
                    U38/8 U38/7 U38/14 U38/1
                    U78/8 U78/7 U78/14 U78/1
```

```
            C215/2   CL37/2  CL35/2  C216/2
            CL38/2   CL36/2  U44/12  U46/8
            U46/7    U46/14  U46/1   U45/8
            U45/7    U45/14  U45/1   U83/12
            U47/8    U47/7   U47/14  U47/1
            U81/12   U80/8   U80/7   U80/14
            U80/1    U43/8   U43/7   U43/14
            U43/1    U82/8   U82/7   U82/14
            U82/1    C33/2   CL9/2   CL7/2
            C34/2    CL10/2  CL8/2   U9/12
            U11/8    U11/7   U11/14  U11/1
            U10/8    U10/7   U10/14  U10/1
            U55/12   U12/8   U12/7   U12/14
            U12/1    U53/12  U52/8   U52/7
            U52/14   U52/1   U8/8    U8/7
            U8/14    U8/1    U54/8   U54/7
            U54/14   U54/1 ;
VCC       = CL1/1    CL2/1   U2/24   J1/1B
            U1/24 ;
```

```
% Product: PV2 - MICRO PROCESSOR              Revised:    August 11, 199?
% PV2-BLK.SCH                                 Revision:  0.3
% RIT TECHNOLOGIES LTD.
% 7 Ha-arad St. Tel-Aviv 69710, Israel
% Tel: 972-3-496504, 496513, Fax: 972-3-496505
% ================================================
% Designer: IDAN KESSEL
BOARD = ORCAD.PCB;

PARTS
"              = TP1,     % "
                 TP2,     % "
                 TP3,     % "
                 TP4,     % "
                 TP5,     % "
                 TP6,     % "
                 TP7,     % "
                 TP8;     % "
000            = R7,      % 000
                 R8;      % 000
1.8432MHZ      = X1,      % 1.8432MHZ
                 X2;      % 1.8432MHZ
100K           = R11,     % 100K
                 R14,     % 100K
                 R20;     % 100K
100NF          = C23;     % 100NF
100PF          = C24,     % 100PF
                 C34;     % 100PF
10K            = RT1,     % 10K
                 R2,      % 10K
                 R3,      % 10K
                 R5,      % 10K
                 R6,      % 10K
                 R16,     % 10K
                 R19,     % 10K
                 R21,     % 10K
                 R22,     % 10K
                 R23,     % 10K
                 R24,     % 10K
                 R25,     % 10K
                 R26;     % 10K
10M            = R1,      % 10M
                 R4,      % 10M
                 R15,     % 10M
                 R27;     % 10M
10NF           = C1,      % 10NF
                 C3,      % 10NF
                 C4,      % 10NF
                 C5,      % 10NF
                 C6,      % 10NF
                 C9,      % 10NF
                 C10,     % 10NF
                 C11,     % 10NF
                 C12,     % 10NF
                 C13,     % 10NF
                 C14,     % 10NF
                 C15,     % 10NF
                 C16,     % 10NF
                 C17,     % 10NF
                 C19,     % 10NF
                 C20,     % 10NF
                 C21,     % 10NF
                 C22,     % 10NF
                 C25,     % 10NF
                 C27,     % 10NF
                 C28,     % 10NF
```

|               |   |      |           |
|---------------|---|------|-----------|
|               |   | C29, | % 10NF    |
|               |   | C33, | % 10NF    |
|               |   | C35, | % 10NF    |
|               |   | C36, | % 10NF    |
|               |   | C38, | % 10NF    |
|               |   | C39, | % 10NF    |
|               |   | C40, | % 10NF    |
|               |   | C41; | % 10NF    |
| 12PF          | = | C2,  | % 12PF    |
|               |   | C7,  | % 12PF    |
|               |   | C8,  | % 12PF    |
|               |   | C18; | % 12PF    |
| 18K           | = | R17, | % 18K     |
|               |   | R18; | % 18K     |
| 1UF           | = | C30, | % 1UF     |
|               |   | C31, | % 1UF     |
|               |   | C42, | % 1UF     |
|               |   | C43; | % 1UF     |
| 2.4K          | = | R9,  | % 2.4K    |
|               |   | R10; | % 2.4K    |
| 22PF          | = | C26, | % 22PF    |
|               |   | C37; | % 22PF    |
| 4.7K          | = | R28, | % 4.7K    |
|               |   | R29, | % 4.7K    |
|               |   | R30, | % 4.7K    |
|               |   | R31, | % 4.7K    |
|               |   | R32; | % 4.7K    |
| 4.7UF         | = | C32; | % 4.7UF   |
| 470K          | = | R13; | % 470K    |
| 600/600 SPLIT | = | T1;  | % 600/600 SPLIT |
| 68L11A1FN     | = | U23; | % 68L11A1FN |
| 70K           | = | R12; | % 70K     |
| 74ACT02       | = | U4,  | % 74ACT02 |
|               |   | U11; | % 74ACT02 |
| 74ACT08       | = | U15; | % 74ACT08 |
| 74ACT163      | = | U16; | % 74ACT163 |
| 74ACT574      | = | U12, | % 74ACT574 |
|               |   | U18; | % 74ACT574 |
| 74HCT137      | = | U13, | % 74HCT137 |
|               |   | U14; | % 74HCT137 |
| 74HCT74       | = | U20; | % 74HCT74 |
| 74LVC240      | = | U6,  | % 74LVC240 |
|               |   | U21; | % 74LVC240 |
| 74LVC245      | = | U1,  | % 74LVC245 |
|               |   | U3,  | % 74LVC245 |
|               |   | U7,  | % 74LVC245 |
|               |   | U9;  | % 74LVC245 |
| 8.0MHZ        | = | X3;  | % 8.0MHZ  |
| DB-9          | = | J7;  | % DB-9    |
| DB15          | = | P1;  | % DB15    |
| DG409DY       | = | U5;  | % DG409DY |
| DS14C241      | = | U26; | % DS14C241 |
| G65SC51-4     | = | U2,  | % G65SC51-4 |
|               |   | U8;  | % G65SC51-4 |
| HLMP-1700     | = | LD1, | % HLMP-1700 |
|               |   | LD2, | % HLMP-1700 |
|               |   | LD3; | % HLMP-1700 |
| JMPR2         | = | JP1, | % JMPR2   |
|               |   | JP2, | % JMPR2   |
|               |   | JP4, | % JMPR2   |
|               |   | JP6, | % JMPR2   |
|               |   | JP7, | % JMPR2   |
|               |   | JP8; | % JMPR2   |
| JUMPER1       | = | JP3, | % JUMPER1 |
|               |   | JP5, | % JUMPER1 |
|               |   | JP9, | % JUMPER1 |

```
                        JP10,    % JUMPER1
                        JP11;    % JUMPER1
MAX706RCSA       = U22;    % MAX706RCSA
MOLEX 90151-2210 = J1,     % MOLEX 90151-2210
                   J2,     % MOLEX 90151-2210
                   J3,     % MOLEX 90151-2210
                   J6;     % MOLEX 90151-2210
MT5LC2568        = U10,    % MT5LC2568
                   U17;    % MT5LC2568
P50E060PSR1TG    = J4,     % P50E060PSR1TG
                   J5;     % P50E060PSR1TG
RESET SW         = S1;     % RESET SW
SIOV-S14K230     = RV1;    % SIOV-S14K230
SMBG12A          = D1,     % SMBG12A
                   D2;     % SMBG12A
SMBG5.0A         = D3;     % SMBG5.0A
SOCKET FOR 22LV10 = U25;    % SOCKET FOR 22LV10
SOCKET FOR PSD311L = U24;   % SOCKET FOR PSD311L
T83-A230X        = G1;     % T83-A230X
TLC279CD         = U19;    % TLC279CD

NETS

N00001   = U9/9 U8/25 ;
RCV1     = J1/3 U8/12 ;
N00003   = U9/8 U8/24 ;
TRN1     = J1/7 U8/10 ;
N00005   = U9/7 U8/23 ;
DCD1     = U8/16 J1/1 ;
DCD2     = U2/16 J1/2 ;
N00008   = U9/6 U8/22 ;
RCV2     = U2/12 J1/4 ;
N00010   = U9/5 U8/21 ;
N00011   = U8/8 U8/9 ;
N00012   = U9/4 U8/20 ;
TRN2     = U2/10 J1/8 ;
N00014   = U9/3 U8/19 ;
N00015   = U8/11 U8/17 ;
N00016   = U9/2 U8/18 ;
N00017   = U7/2 U8/28 ;
XTA      = JP2/1 X1/2 R1/1 C2/1
           JP1/1 ;
N00019   = U7/3 U8/27 ;
MDM1A    = U5/8 J2/2 ;
N00021   = U8/26 U7/16 ;
N00022   = JP1/2 JP4/3 ;
MDM1B    = U5/9 J2/4 ;
N00024   = U7/6 U8/3 ;
N00025   = U7/7 U8/13 ;
N00026   = U8/6 JP4/2 ;
N00027   = U7/8 U8/14 ;
N00028   = JP5/1 U8/7 ;
N00029   = U7/9 U8/4 ;
N00030   = R4/1 JP4/1 X2/2 C8/1 ;
N00031   = JP5/2 X2/1 R4/2 C18/1 ;
N00032   = U3/9 U2/25 ;
N00033   = U3/8 U2/24 ;
N00034   = U3/7 U2/23 ;
N00035   = U3/6 U2/22 ;
N00036   = U3/5 U2/21 ;
N00037   = U2/8 U2/9 ;
N00038   = U3/4 U2/20 ;
N00039   = U3/3 U2/19 ;
N00040   = U2/11 U2/17 ;
N00041   = U3/2 U2/18 ;
N00042   = U1/2 U2/28 ;
```

```
N00043      = U1/3 U2/27 ;
N00044      = U2/26 U1/16 ;
PCOM1       = D1/ANODE T1/9 R13/1 R12/1
              U5/5 ;
N00046      = U1/6 U2/3 ;
N00047      = U1/7 U2/13 ;
N00048      = U2/6 JP2/2 ;
N00049      = U1/8 U2/14 ;
N00050      = JP3/1 U2/7 ;
N00051      = U1/9 U2/4 ;
N00052      = JP3/2 X1/1 R1/2 C7/1 ;
PWR1        = C24/1 C23/1 C32/1 T1/10
              J6/10 ;
N00054      = R15/1 R16/2 U19/3 ;
N00055      = R15/2 R21/2 U19/1 U20/3 ;
N00056      = LD1/ANODE R11/1 ;
N00057      = D1/CATHODE D2/CATHODE ;
N00058      = D3/CATHODE R13/2 R17/2 R18/1
              U19/5 ;
N00059      = R14/2 U19/2 RT1/B TP6/TP
              RT1/WIPER ;
PWR2        = C24/2 C23/2 T1/3 C32/2
              J6/9 ;
N00061      = C35/2 U19/7 C34/1 R20/1 ;
N00062      = C35/1 R16/1 ;
N00063      = C34/2 U19/6 R20/2 R19/1 ;
N00064      = U19/8 U19/9 ;
N00065      = U19/14 U19/13 ;
DTO0        = U18/19 J5/B21 J5/B11 J5/B1 ;
DTO3        = U18/16 J5/A21 J5/A11 J5/A1 ;
DTO1        = U18/18 J5/B22 J5/B12 J5/B2 ;
DTO4        = U18/15 J5/A22 J5/A12 J5/A2 ;
DTO2        = U18/17 J5/B23 J5/B13 J5/B3 ;
DTO5        = U18/14 J5/A23 J5/A13 J5/A3 ;
N00072      = U23/7 X3/2 R27/1 C26/1 ;
DTO6        = U18/13 J5/A24 J5/A14 J5/A4 ;
OE1-120     = U14/15 J5/A5 ;
A2          = U13/3 U14/3 U24/19 U17/8
              U10/8 ;
N00076      = U14/14 J5/A6 ;
A3          = U24/18 U17/7 U10/7 ;
AST2        = U4/1 J5/A27 J5/A17 J5/A7 ;
N00079      = R30/2 U22/1 S1/1 ;
N00080      = JP8/2 JP8/3 R28/2 U23/18 ;
A4          = U24/17 U17/6 U10/6 ;
WD          = U15/13 U15/12 U23/29 U22/6 ;
XT          = U16/2 X3/1 U23/8 R27/2
              C37/1 ;
A5          = U24/16 U17/5 U10/5 ;
N00085      = U22/8 JP8/1 ;
A6          = U24/15 U17/4 U10/4 ;
A7          = U24/14 U17/3 U10/3 ;
A8          = U25/3 U24/40 U23/42 U24/31
              U17/25 U10/25 ;
A9          = U25/4 U24/41 U23/41 U24/32
              U17/24 U10/24 ;
A10         = U25/5 U24/42 U23/40 U24/33
              U17/21 U10/21 ;
A11         = U25/6 U23/39 U24/35 U17/23
              U10/23 ;
N00092      = U14/13 J5/A15 ;
A12         = U25/7 U23/38 U24/36 U17/2
              U10/2 ;
N00094      = U14/12 J5/A16 ;
PAGE        = U25/16 U24/43 U23/27 ;
A13         = U25/9 U23/37 U24/37 U17/26
```

```
                      U10/26 ;
A14         = U25/10 U23/36 U24/38 U17/1
              U10/1 ;
S0          = U11/2 U24/11 ;
S1          = U11/5 U24/10 ;
CS0         = U11/1 U10/20 ;
CS1         = U11/4 U17/20 ;
S2          = U11/8 U4/2 U24/9 ;
S3          = U11/11 U4/5 U24/8 ;
CS-INT      = U21/16 U23/32 ;
N00105      = R24/2 P1/3 U21/15 ;
N00106      = R25/2 U21/13 P1/2 ;
N00107      = R26/2 P1/1 U21/11 ;
N00108      = U14/11 J5/A25 ;
SW1         = U21/9 U23/43 ;
A15         = U25/11 U23/35 U24/39 ;
N00111      = U14/10 J5/A26 ;
SW2         = U21/7 U23/45 ;
SW3         = U21/5 U23/47 ;
AS          = U25/12 U23/4 U24/13 ;
CS2         = U11/10 U18/11 U14/4 ;
DTI0        = J4/B21 J4/B11 U12/19 J4/B1 ;
DTI3        = J4/A21 U12/16 J4/A11 J4/A1 ;
DTI1        = J4/B22 J4/B12 U12/18 J4/B2 ;
DTI4        = J4/A22 U12/15 J4/A12 J4/A2 ;
DTI2        = J4/B23 J4/B13 U12/17 J4/B3 ;
DTI5        = J4/A23 U12/14 J4/A13 J4/A3 ;
RXDA        = U21/14 U23/20 ;
DTI6        = J4/A24 U12/13 J4/A14 J4/A4 ;
TXDA        = U21/8 U23/21 ;
IE1-120     = U13/15 J4/A5 ;
MISO        = JP9/1 U23/22 ;
N00127      = U13/14 J4/A6 ;
MOSI        = JP10/1 U23/23 ;
AST3        = U4/4 J4/A27 J4/A17 J4/A7 ;
SCK         = JP11/1 U23/24 ;
N00131      = J4/A15 U13/13 ;
SD          = U26/25 U23/25 ;
N00133      = J4/A16 U13/12 ;
CS3         = U11/13 U12/11 U13/4 ;
N00135      = J4/A25 U13/11 ;
N00136      = U23/3 R31/1 ;
N00137      = R31/2 R32/2 JP7/2 ;
N00138      = J4/A26 U13/10 ;
N00139      = U23/2 R32/1 ;
N00140      = JP6/1 U16/14 ;
N00141      = U16/13 JP6/3 ;
N00142      = JP6/2 U15/1 ;
N00143      = U11/12 U11/9 U4/13 U11/6
              U11/3 ;
N00144      = U15/4 R22/2 ;
N00145      = U15/5 R23/2 ;
N00146      = U15/9 R6/2 ;
N00147      = R5/2 U15/10 ;
N00148      = R3/2 U4/8 ;
N00149      = U15/11 R9/1 ;
N00150      = U4/9 R2/2 ;
N00151      = C42/1 U26/14 ;
N00152      = C42/2 U26/12 ;
N00153      = C43/1 U26/13 ;
N00154      = C30/1 U26/17 ;
N00155      = C31/1 U26/15 ;
N00156      = C31/2 U26/16 ;
N00157      = U21/6 U26/8 ;
N00158      = U21/12 U26/7 ;
RXD         = U26/9 J7/2 ;
```

```
TXD     = J7/3 U26/2 ;
N00161  = LD2/ANODE R9/2 ;
N00162  = R10/2 LD3/ANODE ;
N00163  = U1/18 U3/1 U7/18 U9/1
          U25/13 U23/6 U24/2 U17/27
          U10/27 ;
N00164  = U3/11 U9/11 U12/2 U18/2
          U23/9 U24/23 U17/11 U10/11 ;
N00165  = U3/12 U9/12 U12/3 U18/3
          U23/10 U24/24 U17/12 U10/12 ;
N00166  = U3/13 U9/13 U12/4 U18/4
          U23/11 U24/25 U17/13 U10/13 ;
N00167  = U3/14 U9/14 U12/5 U18/5
          U23/12 U24/26 U17/15 U10/15 ;
N00168  = U3/15 U9/15 U12/6 U18/6
          U23/13 U24/27 U17/16 U10/16 ;
N00169  = J1/5 U23/31 ;
N00170  = J1/6 U23/30 ;
N00171  = U3/16 U9/16 U12/7 U18/7
          U23/14 U24/28 U17/17 U10/17 ;
N00172  = U1/13 U7/13 U13/1 U14/1
          U24/21 U17/10 U10/10 ;
N00173  = U3/17 U9/17 U12/8 U18/8
          U23/15 U24/29 U17/18 U10/18 ;
N00174  = U1/12 U7/12 U13/2 U14/2
          U24/20 U17/9 U10/9 ;
N00175  = U3/18 U9/18 U12/9 U18/9
          U23/16 U24/30 U17/19 U10/19 ;
N00176  = U5/1 U23/28 ;
N00177  = U7/4 U23/34 ;
N00178  = U1/4 U23/33 ;
N00179  = JP2/3 JP1/3 U4/12 U4/11
          U4/6 U15/2 U4/3 U23/5
          U25/2 U24/22 ;
N00180  = U1/11 U7/11 U24/3 U22/7
          R29/2 U23/17 ;
N00181  = U1/17 U7/17 U15/3 ;
N00182  = J2/1 U23/49 ;
N00183  = J2/3 U23/44 ;
N00184  = J2/5 JP9/2 ;
N00185  = J2/6 J4/B24 J4/B14 J4/B4 ;
N00186  = U7/14 U24/7 ;
N00187  = J2/7 JP10/2 ;
N00188  = J2/8 J4/B25 J4/B15 J4/B5 ;
N00189  = U1/14 U24/6 ;
N00190  = U5/4 J5/B24 J5/B14 J5/B4 ;
N00191  = U5/13 J5/B25 J5/B15 J5/B5 ;
N00192  = U20/5 U21/4 ;
N00193  = U20/1 JP11/2 ;
N00194  = G1/3 LD1/CATHODE RV1/1 T1/2
          P1/15 P1/8 ;
N00195  = G1/1 R11/2 RV1/2 T1/11
          P1/14 P1/7 ;
DGND    = U20/10 U20/12 U20/11 U20/13
          U6/2 U6/4 U6/6 U6/8
          U6/1 U6/10 U6/11 U6/13
          U6/15 U6/17 U6/19 U20/7
          R7/2 C2/2 C7/2 U5/15
          U1/10 U1/1 U5/16 U1/19
          U2/1 TP4/TP U3/19 J3/5
          C8/2 C18/2 U3/10 U7/10
          U7/1 U7/19 U8/1 C11/2
          C12/2 C21/2 C28/2 C29/2
          C40/2 C39/2 C25/2 C38/2
          C36/2 C9/2 C14/2 C4/2
          C15/2 C33/2 C41/2 C20/2
```

```
                C22/2 C16/2 C17/2 C6/2
                C1/2 C3/2 C13/2 C19/2
                U9/19 U9/10 LD3/CATHODE LD2/CATHODE
                U26/10 U26/6 U26/20 U26/21
                U26/4 U26/27 U26/23 U26/18
                U21/1 U26/24 C30/2 J7/5
                R3/1 R2/1 R22/1 R23/1
                R6/1 R5/1 U16/8 U11/7
                U15/7 U4/7 U16/3 U16/4
                U16/5 U16/6 U25/14 U12/10
                U12/1 U23/1 JP7/3 U13/8
                U13/5 U18/10 U18/1 U23/51
                U14/8 C27/1 U14/5 U24/12
                U24/34 U21/10 U23/46 U23/48
                U23/50 P1/9 P1/10 P1/11
                U21/17 U21/19 U17/14 U10/14
                U17/22 U10/22 S1/2 U22/3
                C26/2 C37/2 ;
N00197        = U6/20 J6/4 TP8/TP U1/15
                U1/20 U3/20 J3/3 U7/15
                C11/1 C12/1 C21/1 C28/1
                C29/1 C40/1 C39/1 C25/1
                C38/1 C36/1 U7/20 U9/20
                C6/1 C1/1 C3/1 U21/2
                U25/28 JP7/1 U23/52 C27/2
                U24/1 U21/20 R24/1 R25/1
                R26/1 U23/19 U23/26 U24/44
                U17/28 U10/28 R30/1 U22/2
                R29/1 R28/1 U22/4 ;
VCC           = U20/14 J6/3 U19/4 R14/1
                R17/1 R21/1 U20/4 U20/2
                U5/2 U2/2 TP7/TP U2/15
                J3/1 U8/2 C9/1 C14/1
                C4/1 C15/1 C33/1 C41/1
                C20/1 C22/1 C16/1 C17/1
                U8/15 C13/1 C19/1 R10/1
                U26/11 C43/2 U16/7 U16/9
                U16/10 U16/1 J4/B26 U11/14
                U15/14 U4/14 U16/16 J4/B16
                U13/6 U12/20 J4/B6 U13/16
                U14/6 U18/20 J5/B26 U14/16
                J5/B16 J5/B6 ;
VSS           = J6/6 U5/3 TP2/TP J3/4
                C10/1 J4/B28 J4/B18 J4/B8
                J5/B28 J5/B18 J5/B8 ;
VDD           = J6/2 U5/14 TP1/TP J3/2
                C5/1 J4/B27 J4/B17 J4/B7
                J5/B27 J5/B17 J5/B7 ;
AGND          = U19/12 U19/10 R19/2 RT1/A
                U19/11 T1/4 D2/ANODE R12/2
                R18/2 D3/ANODE G1/2 R8/1
                TP5/TP J3/8 J3/6 C10/2
                C5/2 U5/12 J4/B29 J4/B19
                J4/B9 J5/B29 J5/B19 J5/B9 ;
12V           = J6/1 TP3/TP J3/10 ;
GND           = J6/8 R8/2 R7/1 J6/7 ;
```

```
% Product: PV2 - MODEM                          Revised:    August 22, 199
% ANLG7.SCH                                     Revision: 0.7
% RIT TECHNOLOGIES LTD.
% 7 Ha-arad St. Tel-Aviv 69710, Israel
% Tel: 972-3-496504, 496513, Fax: 972-3-496505
% ================================================
% Designer: Idan Kessel
BOARD = ORCAD.PCB;

PARTS
    "              = TP1,      %  "
                     TP2;      %  "
    0PF            = C9,       %  0PF
                     C10;      %  0PF
    1.2NF          = C25,      %  1.2NF
                     C30;      %  1.2NF
    100K           = R1,       %  100K
                     R2,       %  100K
                     R4,       %  100K
                     R8,       %  100K
                     R9,       %  100K
                     R10;      %  100K
    100NF          = C14,      %  100NF
                     C20,      %  100NF
                     C34,      %  100NF
                     C35,      %  100NF
                     C37,      %  100NF
                     C39;      %  100NF
    10K            = TR3,      %  10K
                     TR4,      %  10K
                     R5,       %  10K
                     TR5,      %  10K
                     TR6,      %  10K
                     TR7,      %  10K
                     TR8,      %  10K
                     TR9,      %  10K
                     TR10,     %  10K
                     TR11,     %  10K
                     TR12,     %  10K
                     R13,      %  10K
                     R31,      %  10K
                     R32,      %  10K
                     R40,      %  10K
                     R43,      %  10K
                     R47,      %  10K
                     R50,      %  10K
                     R57,      %  10K
                     R58,      %  10K
                     R76,      %  10K
                     R82,      %  10K
                     R85,      %  10K
                     R88;      %  10K
    10M            = R3,       %  10M
                     R6;       %  10M
    10NF           = C1,       %  10NF
                     C2,       %  10NF
                     C3,       %  10NF
                     C4,       %  10NF
                     C5,       %  10NF
                     C6,       %  10NF
                     C7,       %  10NF
                     C8,       %  10NF
                     C32;      %  10NF
    10PF           = C33,      %  10PF
                     C38;      %  10PF
    12.1K          = R37,      %  12.1K
```

```
            R52,    % 12.1K
            R62,    % 12.1K
            R70;    % 12.1K
15K       = R34,    % 15K
            R48;    % 15K
1K        = TR1,    % 1K
            TR2;    % 1K
1M        = R7,     % 1M
            R12;    % 1M
1NF       = C11,    % 1NF
            C13,    % 1NF
            C15,    % 1NF
            C17,    % 1NF
            C18,    % 1NF
            C21,    % 1NF
            C22,    % 1NF
            C24,    % 1NF
            C27,    % 1NF
            C31;    % 1NF
1UF       = C23,    % 1UF
            C28;    % 1UF
2.7NF     = C12,    % 2.7NF
            C16;    % 2.7NF
24.3K     = R36,    % 24.3K
            R38,    % 24.3K
            R61,    % 24.3K
            R63,    % 24.3K
            R68,    % 24.3K
            R69,    % 24.3K
            R71,    % 24.3K
            R89;    % 24.3K
243K      = R44,    % 243K
            R54;    % 243K
3.3NF     = C19,    % 3.3NF
            C36;    % 3.3NF
3.9K      = R72,    % 3.9K
            R75;    % 3.9K
470       = R17,    % 470
            R21;    % 470
470K      = R59,    % 470K
            R87;    % 470K
47K       = R18,    % 47K
            R22,    % 47K
            R23,    % 47K
            R24,    % 47K
            R25,    % 47K
            R26,    % 47K
            R27,    % 47K
            R28,    % 47K
            R29,    % 47K
            R30,    % 47K
            R39,    % 47K
            R42,    % 47K
            R45,    % 47K
            R51,    % 47K
            R55,    % 47K
            R56,    % 47K
            R64,    % 47K
            R65,    % 47K
            R78,    % 47K
            R81,    % 47K
            R83,    % 47K
            R84,    % 47K
            R86,    % 47K
            R91,    % 47K
            R92,    % 47K
```

```
                      R94;       % 47K
5.1K             =    R73,       % 5.1K
                      R79;       % 5.1K
510K             =    R67,       % 510K
                      R74;       % 510K
53.6K            =    R41,       % 53.6K
                      R46,       % 53.6K
                      R53,       % 53.6K
                      R77,       % 53.6K
                      R80,       % 53.6K
                      R93;       % 53.6K
6.65K            =    R33,       % 6.65K
                      R35,       % 6.65K
                      R49,       % 6.65K
                      R90;       % 6.65K
680PF            =    C26,       % 680PF
                      C29;       % 680PF
74HCT74          =    U5;        % 74HCT74
74LVC240         =    U6;        % 74LVC240
86.6K            =    R15,       % 86.6K
                      R19;       % 86.6K
866              =    R16,       % 866
                      R20;       % 866
9.09K            =    R11,       % 9.09K
                      R14;       % 9.09K
90.9K            =    R60,       % 90.9K
                      R66;       % 90.9K
JUMPER2          =    JP1,       % JUMPER2
                      JP2,       % JUMPER2
                      JP3,       % JUMPER2
                      JP4,       % JUMPER2
                      JP5,       % JUMPER2
                      JP6,       % JUMPER2
                      JP7,       % JUMPER2
                      JP8,       % JUMPER2
                      JP9,       % JUMPER2
                      JP10;      % JUMPER2
MOLEX 90151-2210 =    J1,        % MOLEX 90151-2210
                      J2,        % MOLEX 90151-2210
                      J3;        % MOLEX 90151-2210
SMBG12A          =    D1,        % SMBG12A
                      D2,        % SMBG12A
                      D3,        % SMBG12A
                      D4;        % SMBG12A
TLC279CD         =    U7,        % TLC279CD
                      U8,        % TLC279CD
                      U9;        % TLC279CD
TR-4460          =    T1,        % TR-4460
                      T2,        % TR-4460
                      T5,        % TR-4460
                      T6;        % TR-4460
TRANSFORMER      =    T3,        % TRANSFORMER
                      T4;        % TRANSFORMER
XR2207           =    U2,        % XR2207
                      U4;        % XR2207
XR2211           =    U1,        % XR2211
                      U3;        % XR2211

NETS

DCD1      = J3/1 R32/2 U1/6 ;
N00002    = R33/1 R80/2 C21/1 C31/1 ;
N00003    = R33/2 R2/1 U7/1 C14/2
            R38/2 ;
RCV1      = J3/3 R31/2 U1/7 R74/1 ;
N00005    = R35/1 R77/2 C13/1 C11/1 ;
```

```
N00006    = R35/2 U7/7 R81/1 R78/2
            R36/2 R80/1 ;
N00007    = R2/2 R85/1 U9/5 ;
N00008    = C12/1 U1/14 ;
N00009    = C21/2 R37/2 U7/3 ;
N00010    = R77/1 R84/1 R83/2 R86/1
            U7/8 ;
N00011    = C13/2 R62/2 U7/5 ;
N00012    = C14/1 U1/2 ;
N00013    = U7/2 R61/2 R38/1 ;
N00014    = U1/3 R59/1 C19/1 ;
N00015    = U1/13 C12/2 ;
N00016    = R3/1 U9/3 R5/2 ;
N00017    = R3/2 R82/2 U9/1 U5/3 ;
N00018    = U7/6 R63/2 R36/1 ;
N00019    = U1/12 R60/2 TR3/3 TR3/2 ;
N00020    = R9/2 U9/2 TR7/1 TR7/2 ;
N00021    = U5/5 U6/2 ;
N00022    = R60/1 U1/11 R1/2 C29/1 ;
N00023    = U9/7 C34/2 C33/1 R7/1 ;
N00024    = C34/1 R5/1 ;
N00025    = C33/2 U9/6 R14/1 R7/2 ;
N00026    = U1/10 C20/2 ;
N00027    = U1/8 R1/1 R74/2 C30/1 ;
N00028    = R86/2 U7/9 R23/1 ;
N00029    = TR3/1 R34/2 ;
RX_RST1   = J2/5 U5/1 ;
RX1-      = JP7/2 R23/2 ;
N00032    = C22/1 U2/2 ;
TX1       = JP1/2 U7/14 R43/1 ;
N00034    = U7/10 R26/1 R25/2 R24/1 ;
RX1+      = JP9/2 R24/2 ;
N00036    = U7/12 R64/1 R65/2 C23/1 ;
N00037    = C23/2 U2/14 ;
RX_INT1   = J2/1 U6/18 ;
N00039    = U2/3 C22/2 ;
N00040    = U6/4 U5/9 ;
RX_INT2   = J2/3 U6/16 ;
N00042    = U7/13 R43/2 R40/2 ;
MDM1A     = J2/2 JP4/2 D1/1 ;
N00044    = U2/11 R75/2 R79/2 ;
N00045    = U2/4 R39/1 ;
N00046    = R39/2 TR4/2 TR4/3 ;
N00047    = D2/2 D1/2 ;
TRN1      = J3/7 U2/9 ;
N00049    = R41/1 U2/6 ;
N00050    = R41/2 TR5/2 TR5/3 ;
TR_EN1    = J3/5 U2/8 ;
N00052    = U2/7 R44/1 ;
N00053    = R44/2 TR6/3 TR6/2 ;
MDM1B     = JP3/2 J2/4 D2/1 ;
DCD2      = J3/2 R50/2 U3/6 ;
N00056    = R49/1 R46/2 C18/1 C17/1 ;
N00057    = R49/2 R8/1 C37/2 U8/1
            R68/2 ;
RCV2      = J3/4 R47/2 U3/7 R67/1 ;
N00059    = R90/1 R93/2 C24/1 C15/1 ;
N00060    = R90/2 U8/7 R45/1 R42/2
            R89/2 R46/1 ;
N00061    = R8/2 R88/1 U9/10 ;
N00062    = C16/1 U3/14 ;
N00063    = C18/2 R52/2 U8/3 ;
N00064    = R93/1 R94/1 R92/2 R91/1
            U8/8 ;
N00065    = C24/2 R70/2 U8/5 ;
N00066    = C37/1 U3/2 ;
```

```
N00067    = U8/2 R69/2 R68/1 ;
N00068    = U3/3 R87/1 C36/1 ;
N00069    = U3/13 C16/2 ;
N00070    = R6/1 U9/12 R13/2 ;
N00071    = R76/2 R6/2 U9/14 U5/11 ;
N00072    = U8/6 R71/2 R89/1 ;
N00073    = U3/12 R66/2 TR9/3 TR9/2 ;
N00074    = R10/2 U9/13 TR8/1 TR8/2 ;
N00075    = R66/1 U3/11 R4/2 C26/1 ;
N00076    = C39/2 U9/8 C38/1 R12/1 ;
N00077    = C39/1 R13/1 ;
N00078    = C38/2 U9/9 R11/1 R12/2 ;
N00079    = C35/2 U3/10 ;
N00080    = U3/8 R4/1 R67/2 C25/1 ;
N00081    = R91/2 U8/9 R27/1 ;
N00082    = TR9/1 R48/2 ;
RX_RST2   = J2/7 U5/13 ;
RX2-      = JP8/2 R27/2 ;
N00085    = C27/1 U4/2 ;
TX2       = JP2/2 U8/14 R58/1 ;
N00087    = U8/10 R30/2 R29/1 R28/1 ;
RX2+      = JP10/2 R28/2 ;
N00089    = U8/12 R55/2 R56/1 C28/1 ;
N00090    = C28/2 U4/14 ;
MDM2A     = JP6/2 J2/6 D3/1 ;
N00092    = U4/3 C27/2 ;
N00093    = D4/2 D3/2 ;
N00094    = U8/13 R58/2 R57/2 ;
N00095    = U4/11 R72/2 R73/2 ;
N00096    = R51/1 U4/4 ;
N00097    = R51/2 TR10/2 TR10/3 ;
TRN2      = J3/8 U4/9 ;
N00099    = U4/6 R53/1 ;
N00100    = R53/2 TR11/2 TR11/3 ;
TR_EN2    = J3/6 U4/8 ;
N00102    = U4/7 R54/1 ;
N00103    = R54/2 TR12/3 TR12/2 ;
MDM2B     = JP5/2 J2/8 D4/1 ;
N00105    = JP1/3 T1/6 ;
N00106    = R16/1 R15/1 JP1/1 ;
HYB1A     = JP4/3 T1/4 ;
N00108    = T1/1 T5/1 ;
N00109    = T1/5 C9/1 TR1/3 ;
N00110    = T1/2 T5/5 ;
N00111    = C9/2 TR1/2 TR1/1 T5/2 ;
N00112    = JP4/1 T3/5 ;
HYB1B     = JP3/3 T5/4 ;
N00114    = T3/2 R17/1 R16/2 JP9/1 ;
N00115    = R15/2 R18/1 JP7/1 ;
N00116    = JP7/3 T5/10 ;
N00117    = JP3/1 T3/3 ;
N00118    = T5/6 JP9/3 ;
N00119    = JP2/3 T2/6 ;
N00120    = R20/1 R19/1 JP2/1 ;
HYB2A     = JP6/3 T2/4 ;
N00122    = T2/1 T6/1 ;
N00123    = T2/5 C10/1 TR2/3 ;
N00124    = T2/2 T6/5 ;
N00125    = C10/2 TR2/2 TR2/1 T6/2 ;
HYB2B     = JP5/3 T6/4 ;
N00127    = JP8/1 R19/2 R22/1 ;
N00128    = JP8/3 T6/10 ;
N00129    = JP6/1 T4/5 ;
N00130    = T4/2 R20/2 R21/1 JP10/1 ;
N00131    = T6/6 JP10/3 ;
N00132    = JP5/1 T4/3 ;
```

```
+12V     = J1/10 C4/1  C3/1  C6/1
           C2/1  C1/1  C5/1  R73/1
           U4/1  R55/1 R30/1 R92/1
           U3/1  R42/1 U8/4  R79/1
           U2/1  R65/1 R25/1 R83/1
           U1/1  R78/1 U7/4  ;
VCC      = J1/1  C32/1 C8/1  U9/4
           R10/1 R76/1 U5/10 U5/12
           U5/14 R9/1  R82/1 U5/4
           U5/2  ;
AGND     = T4/6  R21/2 R22/2 T2/10
           T3/6  R17/2 R18/2 J1/8
           J1/6  C32/2 C4/2  C3/2
           C6/2  C2/2  C1/2  C5/2
           TR12/1 TR11/1 TR10/1 T1/10
           U4/12 U4/10 R56/2 R72/1
           R57/1 R29/2 R11/2 R94/2
           TR8/3 C25/2 C26/2 R48/1
           U9/11 R88/2 U3/4  C36/2
           R87/2 R45/2 U8/11 C35/1
           C15/2 R71/1 R70/1 C17/2
           R52/1 R69/1 TR4/1 TR5/1
           TR6/1 U2/12 U2/10 R64/2
           R75/1 R40/1 R26/2 R14/2
           R84/2 TR7/3 C30/2 C29/2
           R34/1 R85/2 U1/4  C19/2
           R59/2 R81/2 U7/11 C20/1
           C11/2 R63/1 R62/1 C31/2
           R61/1 R37/1 ;
DGND     = J1/5  C7/2  C8/2  U6/11
           U6/13 U6/15 U6/17 U6/19
           U6/10 U6/6  U6/8  U6/1
           U5/7  ;
N00137   = J1/3  C7/1  R50/1 R47/1
           U6/20 R32/1 R31/1 ;
VDD      = J1/2  TP1/1 ;
VSS      = J1/4  TP2/1 ;
```

```
% Product: PV2-CABLE4                              Revised: September 4, 199
% CABLE4_2.SCH                                     Revision: 0.2
% RIT TECHNOLOGIES LTD.
% 7 Ha-arad St. Tel-Aviv 69710, Israel
% Tel: 972-3-496504, 496513, Fax: 972-3-496505
% ==========================================
% Designer: Idan Kessel
BOARD = ORCAD.PCB;

PARTS
P50E-020S-TG    = J1,     % P50E-020S-TG
                  J2,     % P50E-020S-TG
                  J3;     % P50E-020S-TG
P50E-060S-TG    = J4;     % P50E-060S-TG

NETS

B1       = J1/B1  J4/B1  ;
A1       = J4/A1  J1/A1  ;
B2       = J1/B2  J4/B2  ;
A2       = J4/A2  J1/A2  ;
B3       = J1/B3  J4/B3  ;
A3       = J4/A3  J1/A3  ;
B4       = J1/B4  J4/B4  ;
A4       = J4/A4  J1/A4  ;
B5       = J1/B5  J4/B5  ;
A5       = J4/A5  J1/A5  ;
B6       = J1/B6  J4/B6  ;
A6       = J4/A6  J1/A6  ;
B7       = J1/B7  J4/B7  ;
A7       = J4/A7  J1/A7  ;
B8       = J1/B8  J4/B8  ;
A8       = J4/A8  J1/A8  ;
B9       = J1/B9  J4/B9  ;
A9       = J4/A9  J1/A9  ;
B10      = J1/B10 J4/B10 ;
A10      = J4/A10 J1/A10 ;
A11      = J4/A11 J2/A1  ;
B11      = J2/B1  J4/B11 ;
A12      = J4/A12 J2/A2  ;
B12      = J2/B2  J4/B12 ;
A13      = J4/A13 J2/A3  ;
B13      = J2/B3  J4/B13 ;
A14      = J4/A14 J2/A4  ;
B14      = J2/B4  J4/B14 ;
A15      = J4/A15 J2/A5  ;
B15      = J2/B5  J4/B15 ;
A16      = J4/A16 J2/A6  ;
B16      = J2/B6  J4/B16 ;
A17      = J4/A17 J2/A7  ;
B17      = J2/B7  J4/B17 ;
A18      = J4/A18 J2/A8  ;
B18      = J2/B8  J4/B18 ;
A19      = J4/A19 J2/A9  ;
B19      = J2/B9  J4/B19 ;
A20      = J4/A20 J2/A10 ;
B20      = J2/B10 J4/B20 ;
B21      = J3/B1  J4/B21 ;
A21      = J4/A21 J3/A1  ;
B22      = J3/B2  J4/B22 ;
A22      = J4/A22 J3/A2  ;
B23      = J3/B3  J4/B23 ;
A23      = J4/A23 J3/A3  ;
B24      = J3/B4  J4/B24 ;
A24      = J4/A24 J3/A4  ;
B25      = J3/B5  J4/B25 ;
```

```
A25  = J4/A25 J3/A5  ;
B26  = J3/B6  J4/B26 ;
A26  = J4/A26 J3/A6  ;
B27  = J3/B7  J4/B27 ;
A27  = J4/A27 J3/A7  ;
B28  = J3/B8  J4/B28 ;
A28  = J4/A28 J3/A8  ;
B29  = J3/B9  J4/B29 ;
A29  = J4/A29 J3/A9  ;
B30  = J3/B10 J4/B30 ;
A30  = J4/A30 J3/A10 ;
```

APPENDIX B

RIT TECHNOLOGIES

PV2 PROTOTYPE

*CONTROL STATION APPLICATION SPEC.*

31 Jul. 1994

*Rev 1.1*

Contents

Version History ..................................................................................................... 3

General ................................................................................................................ 4

Operation ............................................................................................................. 5
    Definition Of events ..................................................................................... 7
    Data Base Operations Screen ..................................................................... 8
    Routing display Screen ................................................................................ 9
    Statistics Screen ........................................................................................ 11

HUB Operation ................................................................................................... 12

Scanning Algorithm ........................................................................................... 13

Scanners Data Base construction ..................................................................... 14
    Building the 'BIG' data Base. ..................................................................... 17

Appendix A:   Control Station Platform requirement ............................................. 19
    H/W Requirement ...................................................................................... 19
    S/W Requirement ...................................................................................... 19

Appendix B:   Synonyms and Abbreviations ........................................................ 20

Appendix C:   Typical connections example ........................................................ 21

Version History

| VERSION | DATE | OWNER / Change History |
|---------|------|------------------------|
| 0.1 | 26 Jun. 1994. | Avirav Yehuda. First Draft, |
| 1.0 | 29 Jun. 1994. | Avirav Yehuda. First Release, |
| 1.1 | 31 Jul. 1994. | Avirav Yehuda. Canceling of SETUP |

General

This document describes the specifications for the PV2 control station application.

The Control station application will be implemented on an IBM PC type workstation, under DOS operating system.
See appendix A for H/W and S/W requirements.

The preliminary MMI will also developed under DOS.

In general, the main tasks of the control station application are:

- Control of the PV2 system scanning process/algorithm.

- Command the scanners units when to perform transmit scan and when to perform receive scan.

- Controls the HUB at the C.O site.

- Perform a 'Secondary scanning' at the HUB, to handle messages transmitted from scanners.

- Command the scanners units to download data bases files, and saving them.

- Construct a connectivity data base file of all the system ports (The 'BIG' data base ).

- Enable basic queries on the connectivity data base.

- Handle a minimum MMI to enable adequate operation.

- Handling and displaying of Alarms coming from the scanners.

- Maintaining a log file of system activities and events.

Operation

When the control station is powered on, the system comes up with the main screen, displayed in figure 1.

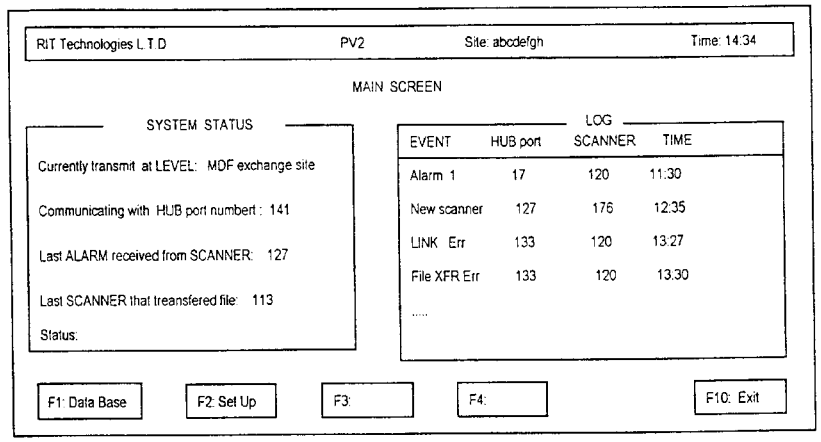

Figure 1 - Main screen

This screen is used to monitor the status of the system in real time, and includes two parts:

- LOG window

Displays contents of log file ( which is a list all the activities and events occurred in the system).
    Up/Down scrolling is not allowed in this window.
    For definition of events type, see 'Definition Of Events' paragraph at the end of this section.
    All the activities will be written to the LOG file, in editable ASCII format, with the addition of the date at the end of each line.

◆ STATUS window - display The current status:

*Currently transmitting at LEVEL:*
   - Displays the current system level at which scanners are transmitting now.
   - The levels will displayed as one of:

A- MDF exchange side    B-MDF Subscriber side.
     C- CCC exchange side.    D-CCC subscriber side.
     E,F.

- During level switching, the string 'CHANGE' will be displayed.
   - If there is no transmitting at any level, the string 'NONE' will be displayed

*Communicating with HUB PORT number:*
   - Displays the number of the HUB port that the HUB is currently switched to .
   - While the HUB is scanning it's ports, 'NONE' will be shown.

*Last ALARM received from scanner:*
   - Displays the I.D of scanner which reported the last alarm.

*Last scanner that Transferred file:*
   - Displays the I.D number of the last scanner that downloaded File.

*Status*
   - Displays the current state:
     HUB SCAN
     FILE TRANSFER
     SEND COMMAND The main screen enables the operator to select one of the followings:

1. F1 - Switch to data base operations screen.

2. F2 - Switch to T.B.D setup screen.

4. F3 - T.B.D.

5. F4 - T.B.D.

6. F10 - exit to DOS.

Definition Of events

Event in the system is defined as one of the followings:

1. External alarm sensed at the scanner unit (specified with alarm type/number).
2. 'Power on' message received from specific scanner.
3. A new scanner was added to the system.
4. Communication error with specific scanner.
5. File transfer error at specific scanner.
6. Change of transmit level.
7. HUB malfunction (specified with error type).

For each event, the same text, as appears on the screen, will be written to the LOG file, with the addition of the date, at the end of each line.

Data Base Operations Screen

This screen is used to display information about the connections in the system.

During displaying of this screen, and generally all other screens, the scanning algorithm will not stop, and will continue operating in the background.
See control station state machine.

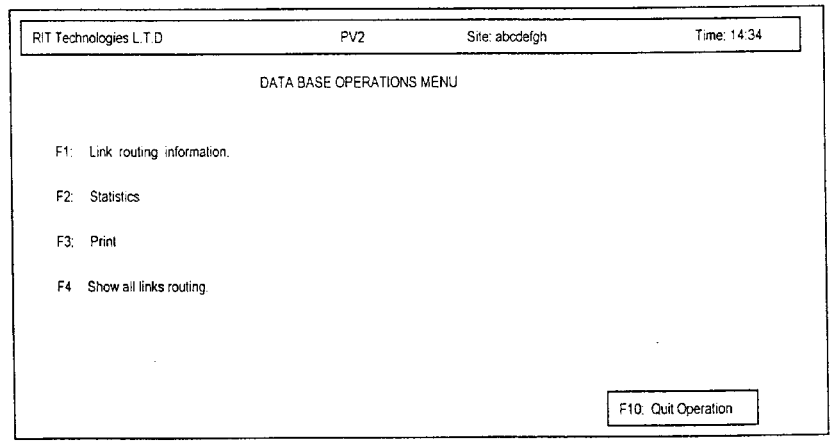

Figure 2 - Data Base Operations Screen.

This screen enables the operator to select one of the followings:

1. F1 - Switch to link routing information screen.

2. F2 - Switch to connections statistics screen.

3. F3 - Switch to T.B.D print screen ( Will no be implemented in the prototype version).

4. Switch to shoe all links routing screen.

5. F10 - exit to return screen.

Routing display Screen

This screen is used to display information about the link routing of a selected wire pair (link).

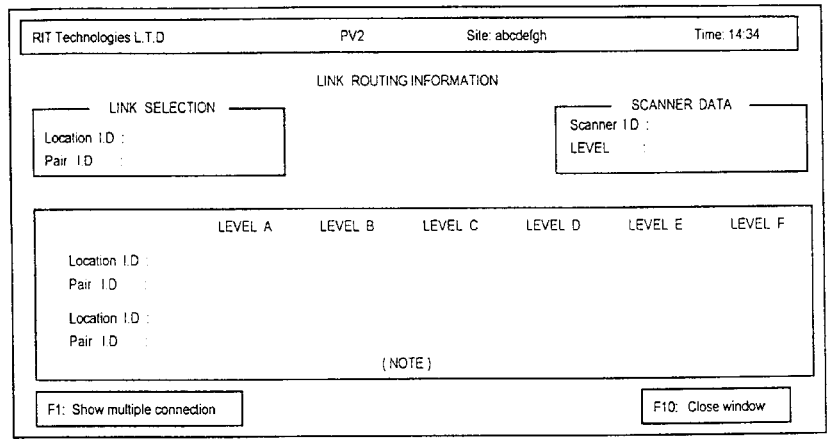

Figure 3 - Port Display screen

LINK SELECTION window:

In this window, the operator needs to enter the Location I.D and Pair I.D for the specific link and then the link data will be displayed.

- *Location I.D*   - The code relevant to the location of the specific pair.
- *Pair I.D.*   - The number of the specific pair in the above location.

SCANNER DATA window:

After selection of the link to display, this window is updated with an information about the location entered in "Link Selection", which contains:

- *Scanner I.D.*
- *Level* - Of hierarchy which the scanner is in it.

ROUTING information window:

> For the selected pair, this window displays the routing information i.e. the pair I.D which is connected to at each level of hierarchy.
>
> If there is double connection at a specific level, the two lines at the bottom of the window shows the pair I.D of this multiple connection.
>
> If at a specific level, there are more then two connections, the following message will appear :" This link has multiple connections, Press F1 for more information".
> Pressing F1 will cause to switch to a special T.B.D screen which displays the multiple connections list.
> This screen will not be implemented in the prototype version.

This screen enables the operator to select one of the followings:

1. F1 - Switch to T.B.D multiple connection display screen, in case of more then two connection at a specific level..

2. F10 - return to Data Base Operations screen.

Statistics Screen

This screen is used to display statistical (or summery) information about connections in the system.

```
┌─────────────────────────────────────────────────────────────────────────┐
│ RIT Technologies L T D        PV2         Site: abcdefgh      Time: 14:34│
│                                                                         │
│                              STATISTICS                                 │
│                                                                         │
│                 LEVEL A  LEVEL B  LEVEL C  LEVEL D  LEVEL E  LEVEL F  TOTAL│
│  TOTAL SCANNERS :                                                       │
│                                                                         │
│  TOTAL PAIRS    :                                                       │
│                                                                         │
│  CONNECTED PAIRS :                                                      │
│                                                                         │
│  UNCONNECTED PAIRS:                                                     │
│                                                                         │
│                                                      ┌─────────────────┐│
│                                                      │ F10: Quit operation ││
│                                                      └─────────────────┘│
└─────────────────────────────────────────────────────────────────────────┘
```

Figure 4 - Statistics screen

For each hierarchy level, the followings is displayed:

- Total number Of scanners in the level.

- Total number of wire pairs connected to those scanners.

- Total number of used pairs (i.e. pairs connected to at least one another level).

- Total number of spare pairs . A spare pair is define as one that is not linked to level A (which is MDF exchange side).

HUB Operation

T.B.D

Scanning Algorithm

T.B.D

Scanners Data Base construction

When the computer receives a file from a scanner unit, the file is stored in the computer memory (HARD DISK) in a file which it's name is SCANNER_ID.DB.
The prototype version will not maintain history (i.e. former files). The new updated file will be written over the existing one.

The new file will contains connectivity information for each port which also includes information about multiple connection on specific pairs.

See figure 5 for details about the file structure.

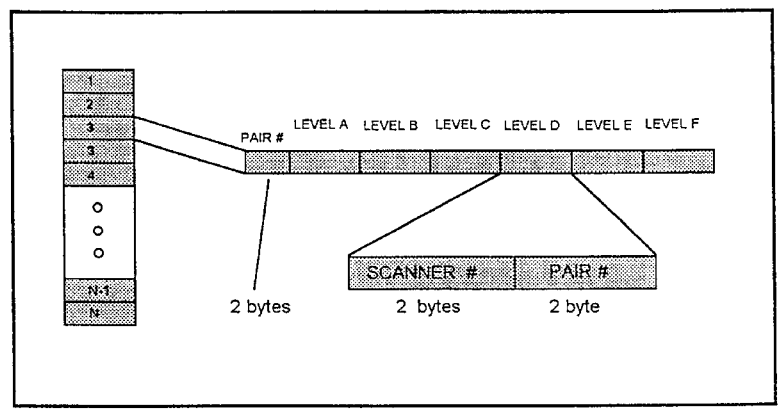

Figure 5 - Individual Scanner data base file.

Explanation:

The file is arranged as an N+ dimension vector of "pair connectivity record" elements.

N is the number of pairs connected to the scanner.
The N+ terminology is used because of when a multiple connections are present, the matrix length exceeds N, as it explained below.

For each scanner pair, there is a record which contains the followings:

1. Pair # - the number of the scanner pair.

2. Level A Pair I.D - I.D number that identifies the level A pair that is connected to Pair #.
   The Pair I.D includes the level A scanner number and the Pair number at this scanner.

3. Same as in 2, but for levels B,C,D,E,F.

NOTES:

1. If a multiple connection is detected at specific port, the next 'line' in the matrix also belongs to this pair, with the information about the multiple connection and it's level ( this means it has the same number in the pair # field).
   See example of pair #3 in figure 6 below.

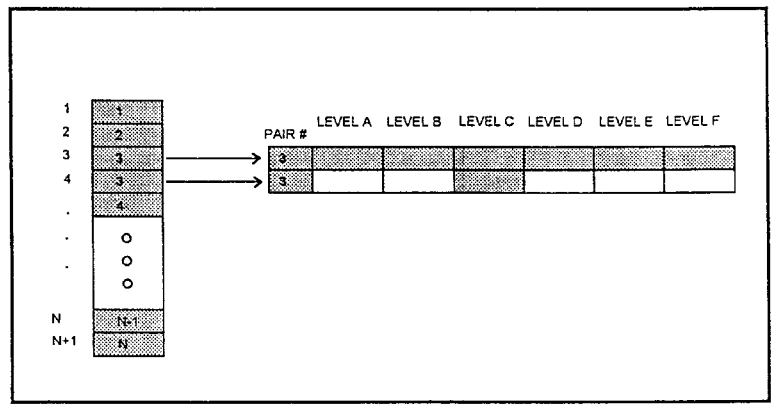

Figure 6 - Example of multiple connection representation.

This means, that accessing to individual pairs records in the matrix is not simply by the Pair #, but it's combined of two operations:

1. Go to matrix record ('line') indexed by (Pair #).

2. If the Pair # field is smaller, skip to the next record until the pair # is matched. If it is bigger, skip back until the pair # is matched.

2. The pair number in each data base record correspond to the appropriate number within each scanner. This is not necessary the number of the physical port location. The link between physical and scanner connections is determined by the control station.
   This kind of mapping will not be implemented in the prototype version.

Size calculation:
The minimum file size will be:

$$N * [2 + 6*(2 + 2)] = 26 \ N.$$

For a 630 pairs scanner, this will be: 16,380 bytes.

If multiple connections are detected, the file size will increase according to the number of them.

Building the 'BIG' data Base.

For each hierarchy level (A,B,,,) A file will be constructed from the individual scanners data base files.
The file which is constructed will contains connectivity information 'down stream' i.e. to lower levels, and which is not included already in a higher levels data base files. This concludes that each file will contains connectivity information about pairs that has connections downstream only. Also, at each file, the higher level pairs locations will be blanked (see figure 7).

The file structure will be in the same format as the individual scanners data bases files, but naturally it will be longer (larger N).

The construction process of each hierarchy level file will be as follows:

1. Copy the connectivity information of each scanner which is in the same level.
   While copying, copy only information of pairs that <u>are not</u> connected to higher levels. (A is the highest level).
   Multiple connections recorded will also be copied, with the same format.

2. For each specific pair at the current level, search all other lower levels scanners data bases to see if this specific pair is connected to any pair which belongs to them. If yes, and if this connection is not already covered in the pervious step, then add it to the specific pair record.

3. If during step 2, a <u>new</u> multiple connection is identified ( i.e. another connection on a level that already has connection to a different pair), then add it to the multiple connections records (if exist one) or insert a new record for this multiple connection, next to the current checked pair record.

At the end of the process, five new files will be constructed, and the relation of one to each other, with respect to file size is shown in figure 6.

The shadowed areas indicates location which holds valid information.
For more information of each file structure (one of the five), see figure 5.

Appendix A: Control Station Platform requirement

H/W Requirement

> 486/50 MHz IBM PC or compatible computer.
>
> 250MB hard disk.
>
> 16 MB RAM.
>
> VGA CARD and Monitor.
>
> 1.44 MB (3 1/2") floppy disk.
>
> 1.21 MB (5 1/4") floppy disk.
>
> Two RS232 serial ports.
>
> 1 Parallel port.
>
> 24 bit I/O port card.

S/W Requirement

> DOS operating system, version 5.0 or higher.
>
> Borland C++ ver 3.1.
>
> Serial Communication library for Borland C++. (GreenLeaf Comm Lib ver 4.0).

Appendix B: Synonyms and Abbreviations

MMI    - Man Machine Interface.

C.O    - Central Office

XFR    - Transfer.

H/W    - Hardware.

S/W    - Software.

Appendix C: Typical connections example
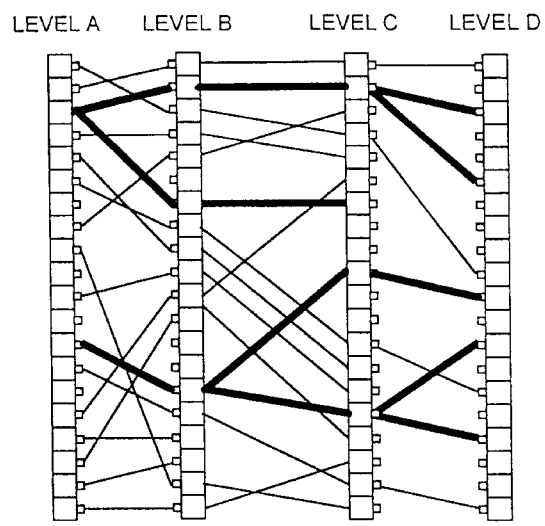

APPENDIX C

```
% Product: PV2 - HUB                              Revised:    August 25, 1994
% PV2-HUB.SCH                                     Revision: 0.0
% RIT TECHNOLOGIES LTD.
% 7 Ha-arad St. Tel-Aviv 69710, Israel
% Tel: 972-3-496504, 496513, Fax: 972-3-496505
% ================================================
% Designer: Idan Kessel
BOARD = ORCAD.PCB;

PARTS
 "              = TP1,    % "
                  TP2,    % "
                  TP3,    % "
                  TP4,    % "
                  TP5,    % "
                  TP6,    % "
                  TP7,    % "
                  TP8,    % "
                  TP9;    % "
100NF           = C3,     % 100NF
                  C6,     % 100NF
                  C9,     % 100NF
                  C12,    % 100NF
                  C15,    % 100NF
                  C18,    % 100NF
                  C21,    % 100NF
                  C24,    % 100NF
                  C25,    % 100NF
                  C26,    % 100NF
                  C27,    % 100NF
                  C28;    % 100NF
100PF           = C2,     % 100PF
                  C5,     % 100PF
                  C8,     % 100PF
                  C11,    % 100PF
                  C14,    % 100PF
                  C17,    % 100PF
                  C20,    % 100PF
                  C23;    % 100PF
10K             = R2;     % 10K
10NF            = C29,    % 10NF
                  C30,    % 10NF
                  C31,    % 10NF
                  C32,    % 10NF
                  C33;    % 10NF
2.7MH           = L1,     % 2.7MH
                  L2,     % 2.7MH
                  L3,     % 2.7MH
                  L4,     % 2.7MH
                  L5,     % 2.7MH
                  L6,     % 2.7MH
                  L7,     % 2.7MH
                  L8,     % 2.7MH
                  L9,     % 2.7MH
                  L10,    % 2.7MH
                  L11,    % 2.7MH
                  L12,    % 2.7MH
                  L13,    % 2.7MH
                  L14,    % 2.7MH
                  L15,    % 2.7MH
                  L16;    % 2.7MH
2K              = R1,     % 2K
                  R3,     % 2K
                  R4,     % 2K
                  R5;     % 2K
4.7UF           = C1,     % 4.7UF
```

```
                         C4,    % 4.7UF
                         C7,    % 4.7UF
                         C10,   % 4.7UF
                         C13,   % 4.7UF
                         C16,   % 4.7UF
                         C19,   % 4.7UF
                         C22;   % 4.7UF
600/600 SPLIT      = T1,    % 600/600 SPLIT
                         T2,    % 600/600 SPLIT
                         T3,    % 600/600 SPLIT
                         T4,    % 600/600 SPLIT
                         T5,    % 600/600 SPLIT
                         T6,    % 600/600 SPLIT
                         T7,    % 600/600 SPLIT
                         T8;    % 600/600 SPLIT
74HC240            = U4;    % 74HC240
74HCT574           = U3;    % 74HCT574
CONNECTOR DB25     = J8;    % CONNECTOR DB25
GREEN LED          = LD1,   % GREEN LED
                         LD2,   % GREEN LED
                         LD3;   % GREEN LED
HI9P0547-5         = U2;    % HI9P0547-5
JUMPER1            = JP1,   % JUMPER1
                         JP2,   % JUMPER1
                         JP3,   % JUMPER1
                         JP4,   % JUMPER1
                         JP5,   % JUMPER1
                         JP6,   % JUMPER1
                         JP7,   % JUMPER1
                         JP8,   % JUMPER1
                         JP9,   % JUMPER1
                         JP10;  % JUMPER1
MAX202CWE          = U1;    % MAX202CWE
MOLEX 5566-10      = J4,    % MOLEX 5566-10
                         J5;    % MOLEX 5566-10
MOLEX 5576-10      = J7,    % MOLEX 5576-10
                         J11,   % MOLEX 5576-10
                         J12;   % MOLEX 5576-10
MOLEX 5578-20      = J10;   % MOLEX 5578-20
MOLEX 6410-2       = J6;    % MOLEX 6410-2
MOLEX 90151-2210   = J1,    % MOLEX 90151-2210
                         J2,    % MOLEX 90151-2210
                         J3,    % MOLEX 90151-2210
                         J9;    % MOLEX 90151-2210
RED LED            = LD4;   % RED LED
T83-A350X          = G1,    % T83-A350X
                         G2,    % T83-A350X
                         G3,    % T83-A350X
                         G4,    % T83-A350X
                         G5,    % T83-A350X
                         G6,    % T83-A350X
                         G7,    % T83-A350X
                         G8;    % T83-A350X

NETS

N00001    = U1/14 J7/2 ;
RCV1      = U4/4 J1/3 U1/11 ;
N00003    = U1/13 J7/3 ;
TRN1      = U4/6 J1/7 U1/12 ;
MXA1      = U2/19 T5/9 ;
O-A1      = J10/1 T5/2 G1/1 ;
MXA5      = U2/23 T1/9 ;
O-A5      = J10/9 T1/2 G5/1 ;
N00009    = J7/1 U1/7 ;
DCD1      = J1/1 U1/10 ;
```

```
N00011    = JP1/2 J7/6 ;
N00012    = JP1/1 J7/4 ;
N00013    = T5/10 C11/1 C12/1 L1/1
            C10/1 ;
P-A1      = J5/9 L1/2 ;
N00015    = T1/10 C14/1 C15/1 C13/1
            L9/1 ;
P-A5      = J5/1 L9/2 ;
CTS       = JP2/1 J7/8 ;
N00018    = J7/7 JP2/2 ;
N00019    = C28/1 U1/4 ;
N00020    = U1/1 C25/1 ;
N00021    = J7/9 JP3/2 ;
N00022    = T5/3 C11/2 C12/2 C10/2
            L2/1 ;
P-B1      = J5/10 L2/2 ;
N00024    = T1/3 C14/2 C15/2 C13/2
            L10/1 ;
P-B5      = J5/2 L10/2 ;
N00026    = C28/2 U1/5 ;
N00027    = C25/2 U1/3 ;
O-B1      = J10/2 G1/3 T5/11 ;
O-B5      = J10/10 G5/3 T1/11 ;
MXB1      = U2/11 T5/4 ;
MXB5      = U2/7 T1/4 ;
N00032    = C27/2 U1/6 ;
N00033    = U1/2 C26/1 ;
ST        = U3/11 J8/1 ;
MXA2      = U2/20 T6/9 ;
O-A2      = J10/3 T6/2 G2/1 ;
MXA6      = U2/24 T2/9 ;
O-A6      = J10/11 T2/2 G6/1 ;
D0        = U3/2 J8/2 ;
N00040    = T6/10 C8/1 C9/1 C7/1
            L3/1 ;
P-A2      = J5/7 L3/2 ;
N00042    = T2/10 C17/1 C18/1 L11/1
            C16/1 ;
P-A6      = J4/9 L11/2 ;
D1        = U3/3 J8/3 ;
A0        = U3/19 U2/17 ;
A1        = U3/18 U2/16 ;
D2        = U3/4 J8/4 ;
A2        = U3/17 U2/15 ;
N00049    = T6/3 C8/2 C9/2 L4/1
            C7/2 ;
P-B2      = J5/8 L4/2 ;
N00051    = T2/3 C17/2 C18/2 L12/1
            C16/2 ;
P-B6      = J4/10 L12/2 ;
D3        = J8/5 U3/5 ;
O-B2      = J10/4 G2/3 T6/11 ;
O-B6      = J10/12 G6/3 T2/11 ;
D4        = J8/6 U3/6 ;
D5        = J8/7 U3/7 ;
RX_RST1   = J2/5 U3/14 ;
MXB2      = U2/10 T6/4 ;
MXB6      = U2/6 T2/4 ;
D6        = J8/8 U3/8 ;
TR_EN1    = J1/5 U3/13 ;
D7        = J8/9 U3/9 ;
EN        = U3/12 U2/18 ;
MXA3      = U2/21 T7/9 ;
O-A3      = J10/5 T7/2 G3/1 ;
MXA7      = U2/25 T3/9 ;
O-A7      = J10/13 T3/2 G7/1 ;
```

```
N00069      = T7/10 C5/1 C6/1 C4/1
              L5/1 ;
P-A3        = J5/5 L5/2 ;
N00071      = T3/10 C20/1 C21/1 L13/1
              C19/1 ;
P-A7        = J4/7 L13/2 ;
RX_INT1     = J2/1 J8/10 ;
N00074      = T7/3 C5/2 C6/2 C4/2
              L6/1 ;
P-B3        = J5/6 L6/2 ;
N00076      = T3/3 C20/2 C21/2 C19/2
              L14/1 ;
P-B7        = J4/8 L14/2 ;
MDM1A       = J2/2 U2/28 ;
O-B3        = J10/6 G3/3 T7/11 ;
O-B7        = J10/14 G7/3 T3/11 ;
BIT         = R2/2 U4/8 J6/2 J8/11 ;
MXB3        = U2/9 T7/4 ;
MXB7        = U2/5 T3/4 ;
MXA4        = T8/9 U2/22 ;
O-A4        = J10/7 T8/2 G4/1 ;
MXA8        = U2/26 T4/9 ;
O-A8        = J10/15 T4/2 G8/1 ;
N00088      = T8/10 C2/1 C3/1 C1/1
              L7/1 ;
P-A4        = J5/3 L7/2 ;
N00090      = T4/10 C23/1 C24/1 C22/1
              L15/1 ;
P-A8        = J4/5 L15/2 ;
MDM1B       = J2/4 U2/2 ;
N00093      = T8/3 C2/2 C3/2 L8/1
              C1/2 ;
P-B4        = J5/4 L8/2 ;
N00095      = T4/3 C23/2 C24/2 C22/2
              L16/1 ;
P-B8        = J4/6 L16/2 ;
MXB4        = T8/4 U2/8 ;
O-B4        = J10/8 G4/3 T8/11 ;
O-B8        = J10/16 G8/3 T4/11 ;
MXB8        = U2/4 T4/4 ;
N00101      = JP6/1 U4/11 ;
N00102      = JP7/1 U4/13 ;
N00103      = U4/18 R5/1 ;
N00104      = J11/1 R5/2 ;
N00105      = U4/15 JP8/1 ;
N00106      = R3/1 U4/16 ;
N00107      = R3/2 J11/2 ;
N00108      = JP9/1 U4/17 ;
N00109      = U4/14 R4/1 ;
N00110      = J11/3 R4/2 ;
N00111      = U4/12 R1/1 ;
N00112      = R1/2 J11/4 ;
N00113      = U4/19 JP10/1 ;
P-B10       = J4/2 J9/9 TP5/TP ;
P-A10       = J4/1 J9/10 TP6/TP ;
N00116      = LD4/CATHODE J12/1 ;
N00117      = LD3/ANODE J12/2 ;
N00118      = J12/3 LD1/ANODE ;
N00119      = J12/4 LD2/ANODE ;
VCC         = J9/3 TP8/TP J11/6 J3/1
              U4/20 R2/1 C29/1 C31/1
              C30/1 U3/20 J8/15 C26/2
              U1/16 ;
DGND        = J6/1 U4/1 U4/10 JP4/1
              TP4/TP J3/5 J11/7 U4/2
              JP6/2 JP7/2 JP8/2 JP9/2
```

```
                    JP10/2 C29/2 C31/2 C30/2
                    J8/13 J8/25 J8/12 J8/24
                    J8/23 J8/22 U3/10 J8/21
                    U3/1 J8/20 J8/19 J8/18
                    U1/15 C27/1 JP3/1 J7/10
                    J7/5 U1/8 ;
GND             =   J9/8 J9/7 TP9/TP JP4/2
                    JP5/2 G8/2 G4/2 G7/2
                    G3/2 G6/2 G2/2 G5/2
                    G1/2 ;
VDD             =   J9/2 TP1/TP J3/2 C32/1
                    U2/1 ;
VSS             =   J9/6 TP3/TP J3/4 U2/27
                    C33/1 ;
AGND            =   JP5/1 J3/8 J3/6 C32/2
                    C33/2 U2/12 ;
N00126          =   J9/4 TP2/TP J3/3 ;
12V             =   J9/1 TP7/TP J3/10 ;
VCC1            =   J12/6 LD4/ANODE ;
DGND1           =   LD2/CATHODE LD1/CATHODE J12/7 LD3/CATHODE ;
```

APPENDIX D

RIT TECHNOLOGIES

PV2 PROTOTYPE

*SETUP UNIT APPLICATION SPEC.*

30 Jun. 1994

*Rev 0.1*

Version History

| VERSION | DATE | OWNER / Change History |
|---|---|---|
| 0.1 | 30 Jun. 1994. | Avirav Yehuda.<br>First Draft, |

General

This document describes the specifications for the PV2 setup unit application.

The setup unit will be implemented on an IBM PC type Laptop computer, under DOS operating system.
See appendix A for H/W and S/W requirements.

The preliminary MMI will also be developed under DOS.

In general, the setup process is used to verify the scanner connections to the external terminals block (TAGS).

Typical setup configuration for the PV2 system is described in figure 1.

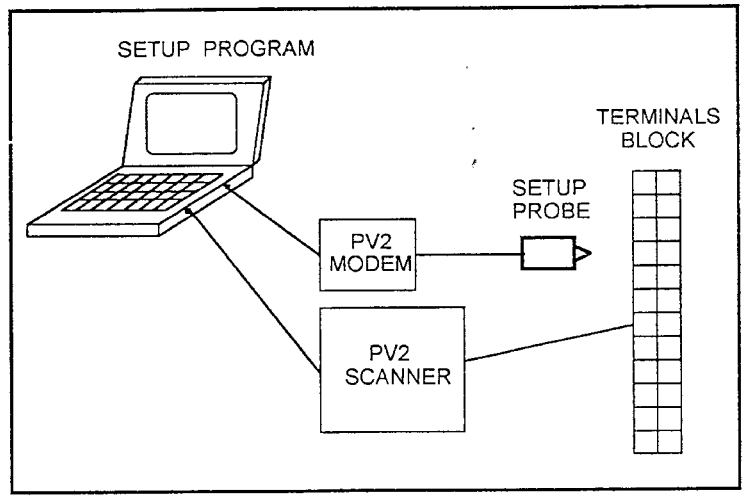

Figure 1 - Setup configuration.

A Laptop type computer controls the setup process which is in general a process of injection a setup signal via the setup probe to selected pairs and identifying the scanner port which is connected to those pairs, with the help of the scanner, which reports back at which of his ports the signal was received.

This process is done for all the terminals block pairs that the scanner is connected to them.
After the setup process is finished, the computer produce a file that
contains a table that determines for each pair of the terminals block what is the scanner port that is connected to.

Setup Protocol

The setup protocol is defined in the 'flow chart' described below:

1. Select the first pair that is not busy, and transmitting on it is enabled.

2. Commands the operator to put the probe on this pair, and wait until done.

3. Start to Inject the setup signal trough the probe.

4. Commands the scanner to start scan it's ports.

5. Wait for scanner report.

6. If the scanner reports that no signal was received, then go to 10.

7. If the scanner reports that the setup signal was received, stop injection of setup signal and transmit the setup computer I.D.
   Wait for scanner report.

8. If the scanner report that the I.D received and verified, save the scanner port i.d and the terminal block pair i.d in the setup table.

9. If the scanner reports that the did not received, then go to 3.
   (This case can be if more then one setup processes are running at the same time in the PV2 system).

10. Select next pair that is not busy and switch to 2.
    If the last pair was already handled, stop the process.

Operation

When the control station is powered on, the system comes up with the main screen, displayed in figure 2.

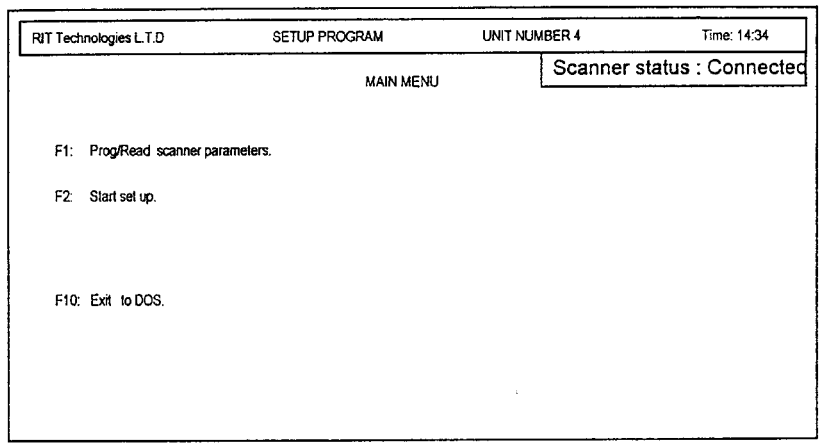

Figure 2 - Main Menu screen

From this screen the operator can select one of the following:

F1   - Pro/Read scanner parameters
           To set scanner parameters on non-volatile memory in the scanner, or to read the current parameters from the scanner.

F2   - To start setup.

F10 - Exit to DOS.

Also this screen displays:

1. UNIT NUMBER - The number of the setup station, which is a unique number.

2. Scanner Status - Display if the scanner is on line/ off line.

SCANNER PARAMETERS SCREEN

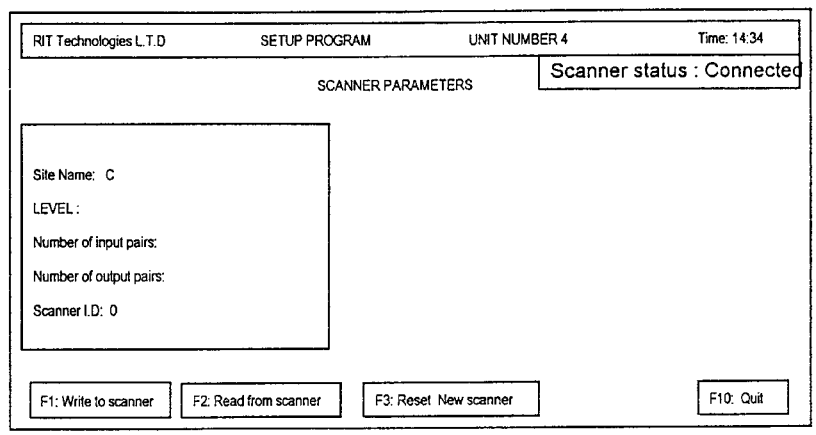

Figure 3 - Scanner parameters

This screen is used to Program/ read the scanner parameters.

The scanners parameters are saved in non volatile (EEPROM) memory.

The operator can edit the parameters on the screen and then program the scanner with the new parameters.

Those parameters are:

Site Name:
    String that identifies the scanner location.

LEVEL
    Level of hierarchy which the scanner is in it, i.e. A,B ..F.

Number of input ports:
    Number of input pairs the scanner is actually connected to then.

Number of output pairs:
    Number of output pairs the scanner is actually connected to then.

Scanner I.D:
: I.D of the scanner. If the scanner installed for the first time, then this number is zero.
: This parameter is read only, and can not be edited. The operator can change this parameter to zero, if F3 is selected.

From this screen, the operator also can do:

- F1 - Program the scanner with the parameters listed in the parameters window.

- F2 - Read the scanner parameters. After successful read, the parameters will be displayed on the parameters window.

- F3 - Reset parameters. Used for installation of new scanner.

Setup screen

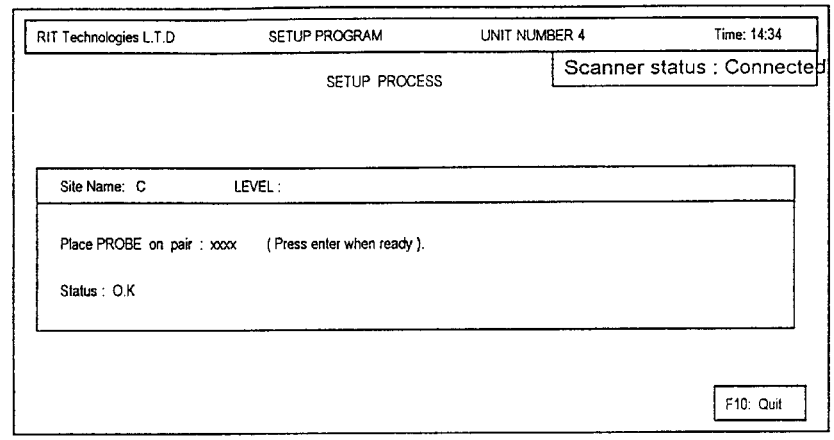

Figure 4 - Setup screen

During the setup process itself, this screen is displayed to guide the operator during the process.

The computer request from the operator where to place the probe, and after the operator confirms the request, starts the process, as described in the SETUP PROTOCOL section.
If the setup succeeded on this pair, the operator is informs, and the computer move to the next port, and so on.

Appendix A: Setup unit computer requirement

H/W REQUIREMENT

IBM PC AT or compatible portable computer (Laptop).

120B hard disk.

4 MB RAM.

1.44 MB (3 1/2 ") floppy disk.

Two RS232 serial ports.

1 Parallel port.

S/W REQUIREMENT

DOS operating system, version 5.0 or higher.

We claim:

1. An interconnection monitoring system for use with a multiple node wired network, the system comprising:
   a plurality of transmitters, each located at a node of the network for transmitting a transmission from said node;
   a plurality of receivers, each located at a node of the network, for receiving a transmission at said node; and
   a connectivity status accumulator in communication with said plurality of receivers, wherein:
   said plurality of transmitters are operative to transmit along said network a signal bearing a multiple element identification code identifying the node from which a transmission takes place,
   each of said plurality of receivers is operative to receive said transmission from a corresponding one of said plurality of transmitters bearing said multiple element identification code and thus indicating the interconnection status of said nodes, and;
   said connectivity status accumulator is operative to accumulate said interconnection status from each of said plurality of receivers and maintain an integrated connectivity status of all of said nodes.

2. An interconnection monitoring system according to claim 1 and wherein said plurality of receivers includes a plurality of memories for storing at least part of the transmissions received thereby.

3. An interconnection monitoring system according to claim 1 and wherein at least some of said plurality of transmitters and said plurality of receivers are configured as transceivers.

4. An interconnection monitoring system according to claim 1 wherein said accumulator is additionally operative to synchronize the operation of said plurality of transmitters.

5. An interconnection monitoring system according to claim 4 and wherein said accumulator is operative to synchronize the operation of said plurality of transmitters on a hierarchical basis.

6. An interconnection monitoring system according to claim 1 and wherein said network is a communications network and said plurality of transmitters are operative to transmit over said communications network in a manner which does not substantially interfere with communications thereover.

7. An interconnection monitoring system according to claim 1 and wherein said network is a non-communications network and said plurality of transmitters are operative to transmit over said non-communications network in a manner which does not substantially interfere with the operations of the non-communications network.

8. An interconnection monitoring system according to claim 1 and wherein said network is an electrical power supply network and said plurality of transmitters are operative to transmit over said power supply network in a manner which does not substantially interfere with the power supply operations of the power supply network.

9. An interconnection monitoring system according to claim 1 and wherein said network is a telephone network and said plurality of transmitters are operative to transmit over said telephone network in a manner which does not substantially interfere with telephone communications thereover.

10. An interconnection monitoring system for use with a multiple node wired network, the system comprising:
    a plurality of transmitters, each located at a node of the network for transmitting a transmission from said node; and
    a plurality of receivers, each located at a node of the network, for receiving a transmission at said node,
    said plurality of transmitters being operative to transmit along said network a signal bearing a multiple element identification code identifying the node from which a transmission takes place,
    said plurality of receivers being operative to receive transmissions from a plurality of nodes, bearing said identification codes and thus indicating the interconnection status of said nodes,
    wherein said network is a telephone network and said plurality of transmitters are operative to transmit over said telephone network in a manner which does not substantially interfere with telephone communications thereover,
    and wherein:
    said telephone network includes a main distribution frame, a plurality of cross-connect cabinets and a plurality of distribution boxes; and
    said plurality of transmitters and said plurality of receivers are located in at least one of said main distribution frame, said plurality of cross-connect cabinets and said plurality of distribution boxes.

11. An interconnection monitoring system according to claim 9 and wherein:
    said telephone network includes a main distribution frame, a plurality of cross-connect cabinets and a plurality of distribution boxes; and
    said plurality of transmitters and said plurality of receivers are located in said main distribution frame, in at least one of said plurality of cross-connect cabinets and in at least one of said plurality of distribution boxes.

12. An interconnection monitoring system for use with a multiple node wired network, the system comprising:
    a plurality of transmitters, each located at a node of the network for transmitting a transmission from said node; and
    a plurality of receivers, each located at a node of the network, for receiving a transmission at said node,
    said plurality of transmitters being operative to transmit along said network a signal bearing a multiple element identification code identifying the node from which a transmission takes place,
    said plurality of receivers being operative to receive transmissions from a plurality of nodes, bearing said identification codes and thus indicating the interconnection status of said nodes,
    wherein said network is a telephone network and said plurality of transmitters are operative to transmit over said telephone network in a manner which does not substantially interfere with telephone communications thereover,
    and wherein:
    said telephone network includes a main distribution frame, a plurality of cross-connect cabinets and a plurality of distribution boxes; and
    said plurality of transmitters and said plurality of receivers are located in said main distribution frame, in plural ones of said plurality of cross-connect cabinets and in plural ones of said plurality of distribution boxes.

13. An interconnection monitoring system according to claim 10 and wherein:
    said main distribution frame, plurality of cross-connect cabinets and plurality of distribution boxes comprise connection blocks to which network wires and patch wires are connected; and said plurality of transmitters and said plurality of receivers are connected to said connection blocks by means of auxiliary wires.

14. An interconnection monitoring system according to claim 13 and wherein said auxiliary wires are punched down on said connection blocks adjacent to said network wires.

15. An interconnection monitoring system according to claim 13 and wherein said auxiliary wires form an integral part of said connection blocks.

16. An interconnection monitoring system according to claim 12 and wherein:

said main distribution frame, plurality of cross-connect cabinets and plurality of distribution boxes comprise connection blocks to which network wires and patch wires are connected; and said plurality of transmitters and said plurality of receivers are connected to said connection blocks by means of auxiliary wires fixedly connected to shoes mounted onto said connection blocks.

17. An interconnection monitoring system according to claim 16 and wherein said shoes are permanently fixed to said connection blocks.

18. An interconnection monitoring system according to claim 16 and wherein said shoes are removably mounted onto said connection blocks.

19. An interconnection monitoring system according to claim 18 and wherein at least some of said plurality of receivers and said plurality of transmitters are portable.

20. An interconnection monitoring system according to claim 16 and wherein said shoes include visible indicators which are responsive to received signals from said plurality of transmitters.

21. An interconnection monitoring system according to claim 1 and wherein said plurality of transmitters provides in-band transmissions.

22. An interconnection monitoring system according to claim 1 and wherein said plurality of transmitters provides out-of-band transmissions.

23. An interconnection monitoring system according to claim 1 and wherein said plurality of transmitters provides information regarding the operational status of at least one of said main distribution frame, plurality of cross-connect cabinets and plurality of distribution boxes.

24. An interconnection monitoring system according to claim 1 and wherein said plurality of transmitters provides information regarding the electrical parameters of the network.

25. An interconnection monitoring system according to claim 1 and wherein said plurality of transmitters provides information regarding faults in the network.

26. A wired network comprising an interconnection monitoring system according to claim 1.

27. An interconnection monitoring method for use with a multiple node wired network, the method comprising:

providing a plurality of transmitters, each located at a node of the network for transmitting a transmission from said node;

providing a plurality of receivers, each located at a node of the network, for receiving a transmission at said node;

providing a connectivity status accumulator in communication with said plurality of receivers;

causing said plurality of transmitters to transmit along said network a signal bearing a multiple element identification code identifying the node from which a transmission takes place;

causing each of said plurality of receivers to receive said transmission from a corresponding one of said plurality of transmitters bearing said multiple element identification code and thus indicating the interconnection status of said nodes; and causing said connectivity status accumulator to accumulate said interconnection status from each of said plurality of receivers and maintain an integrated connectivity status of all of said nodes.

28. An interconnection monitoring method according to claim 27 and also comprising storing at least part of the received transmissions.

29. An interconnection monitoring method according to claim 27 and wherein at least some of said plurality of transmitters and said plurality of receivers operate as transceivers.

30. An interconnection monitoring method according to claim 27 and also comprising synchronizing the operation of said plurality of transmitters.

31. An interconnection monitoring method according to claim 30 and wherein said synchronizing operates on a hierarchical basis.

* * * * *